US009118736B2

(12) United States Patent
Miura

(10) Patent No.: US 9,118,736 B2
(45) Date of Patent: Aug. 25, 2015

(54) COMMUNICATION CONTROL SYSTEM, SERVER DEVICE, AND COMMUNICATION CONTROL METHOD

(75) Inventor: Kouji Miura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 426 days.

(21) Appl. No.: 13/809,035

(22) PCT Filed: May 7, 2012

(86) PCT No.: PCT/JP2012/002996
§ 371 (c)(1),
(2), (4) Date: Jan. 8, 2013

(87) PCT Pub. No.: WO2012/157203
PCT Pub. Date: Nov. 22, 2012

(65) Prior Publication Data
US 2013/0110936 A1 May 2, 2013

(30) Foreign Application Priority Data
May 16, 2011 (JP) .................................. 2011-109893

(51) Int. Cl.
*H04L 29/06* (2006.01)
*H04W 12/08* (2009.01)

(52) U.S. Cl.
CPC .......... *H04L 65/403* (2013.01); *H04L 63/0876* (2013.01); *H04W 12/08* (2013.01)

(58) Field of Classification Search
CPC .. H04L 63/0876; H04L 65/403; H04W 12/08
See application file for complete search history.

(56) References Cited

U.S. PATENT DOCUMENTS

| 7,783,703 B2 | 8/2010 | Rafey et al. |
| 8,224,354 B2 | 7/2012 | DeVries et al. |

(Continued)

FOREIGN PATENT DOCUMENTS

| CN | 101617304 | 12/2009 |
| CN | 101816170 | 8/2010 |
| CN | 101933338 | 12/2010 |
| JP | 2006-352319 | 12/2006 |

(Continued)

OTHER PUBLICATIONS

International Search Report issued May 29, 2012 in International (PCT) Application No. PCT/JP2012/002996.

(Continued)

*Primary Examiner* — Michael C Lai
(74) *Attorney, Agent, or Firm* — Wenderoth, Lind & Ponack, L.L.P.

(57) ABSTRACT

A pairing server includes: a second determination unit which, when a first request is received from a transmitting terminal and a second request is received from a receiving terminal, determines whether or not there is matching of pairing identifiers included in the first and second requests and whether or not there is matching of communication device information included in the first and second requests; and a pairing unit which pairs the transmitting terminal and the receiving terminal using a first device identifier included in the first request and a second device identifier included in the second request when it is determined that there is matching of the pairing identifiers included in the first and second requests and that there is matching of the communication device information included in the first and second requests.

13 Claims, 57 Drawing Sheets

(56) References Cited

U.S. PATENT DOCUMENTS

| | | | |
|---|---|---|---|
| 8,276,073 | B2 | 9/2012 | Okamoto et al. |
| 8,284,094 | B2 | 10/2012 | Hamai et al. |
| 8,634,775 | B2 * | 1/2014 | Oshiba ........................ 455/41.2 |
| 2008/0184127 | A1 | 7/2008 | Rafey et al. |
| 2009/0176505 | A1 | 7/2009 | Van Deventer et al. |
| 2010/0030868 | A1 | 2/2010 | Okamoto et al. |
| 2010/0058192 | A1 | 3/2010 | Okamoto et al. |
| 2010/0107208 | A1 | 4/2010 | Okamoto et al. |
| 2010/0154020 | A1 | 6/2010 | Okamoto et al. |
| 2010/0210287 | A1 | 8/2010 | De Vries et al. |
| 2010/0313231 | A1 | 12/2010 | Okamoto et al. |
| 2010/0315279 | A1 | 12/2010 | Hamai et al. |
| 2011/0244829 | A1 | 10/2011 | Kase |
| 2011/0281523 | A1 | 11/2011 | Oshiba |
| 2012/0284413 | A1 * | 11/2012 | Miura ........................ 709/227 |

FOREIGN PATENT DOCUMENTS

| | | | |
|---|---|---|---|
| JP | 2008-28498 | | 2/2008 |
| JP | 2008-47022 | | 2/2008 |
| JP | 2009-230649 | | 10/2009 |
| JP | 2011-015296 | * | 1/2011 |
| JP | 2011-15296 | | 1/2011 |
| JP | 2011-227882 | | 11/2011 |
| WO | 2008/093781 | | 8/2008 |
| WO | 2010/067605 | | 6/2010 |
| WO | WO 2010/067605 | * | 6/2010 |
| WO | 2012/042816 | | 4/2012 |

OTHER PUBLICATIONS

Office Action issued May 21, 2015 (with English translation) of Search Report in corresponding Chinese patent application No. 201280001969.X.

* cited by examiner

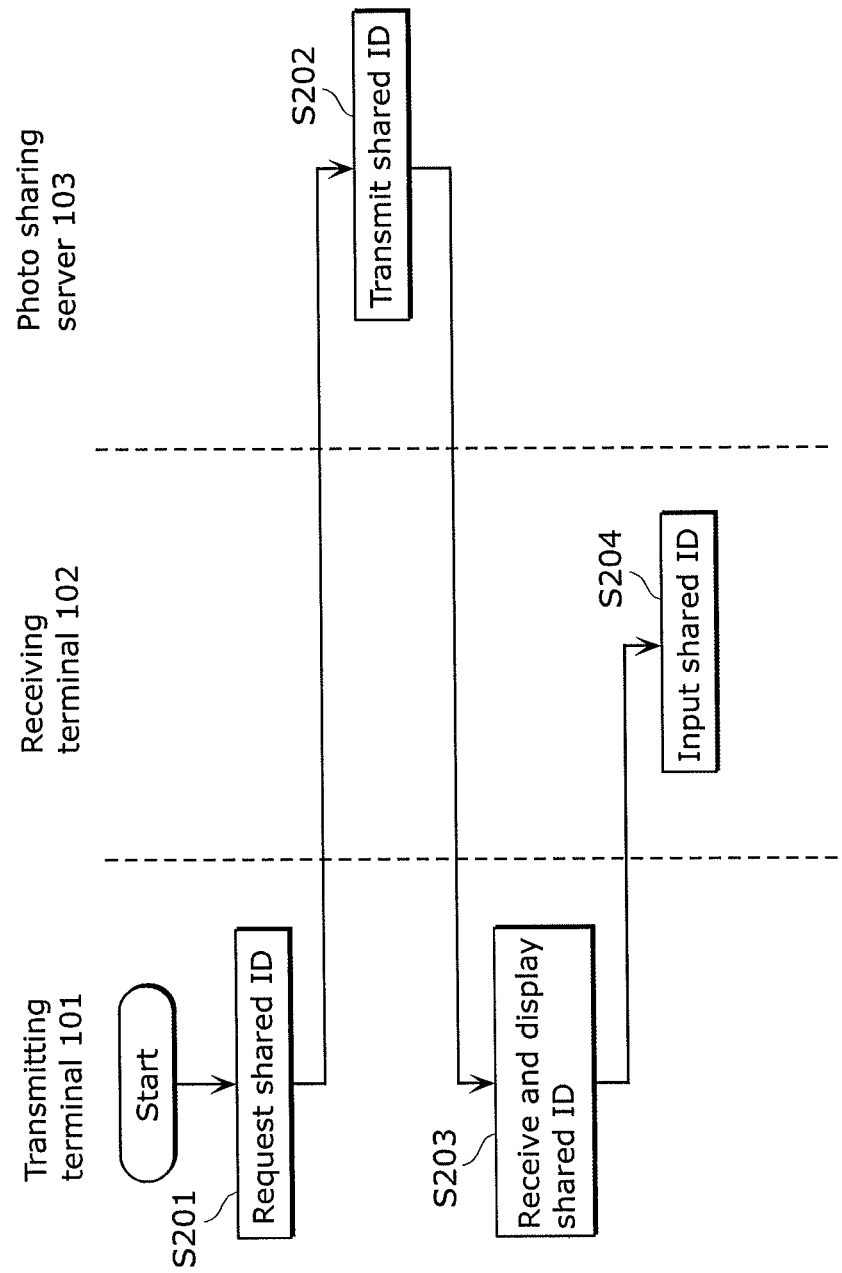

FIG. 4

| Management ID | Communication phase | Pairing value | Receiving terminal ID |
|---|---|---|---|
| 00000001 | 2 | 123456789ABCDEF0 | 778899EEFF |

| Management ID | Communication phase | Pairing value | Transmitting terminal ID |
|---|---|---|---|
| 00000001 | 2 | 123456789ABCDEF0 | 445566CCDD |

| Receiving terminal ID 601 | Transmitting terminal ID 602 | Communication phase 603 | Pairing value 604 | Converted address value 605 |
|---|---|---|---|---|
| 223344DDEE | 445566CCDD | 1 | 123456789······ | 498DF2······ |
| | 12345ABCDE | 2 | 32987AFC1······ | 49276E······ |

FIG. 6B

| Terminal ID | Converted communication device value |
|---|---|
| 778899EEFF | 876AE2 ...... |
| 223344DDEE | 43873A ...... |

606 / 607

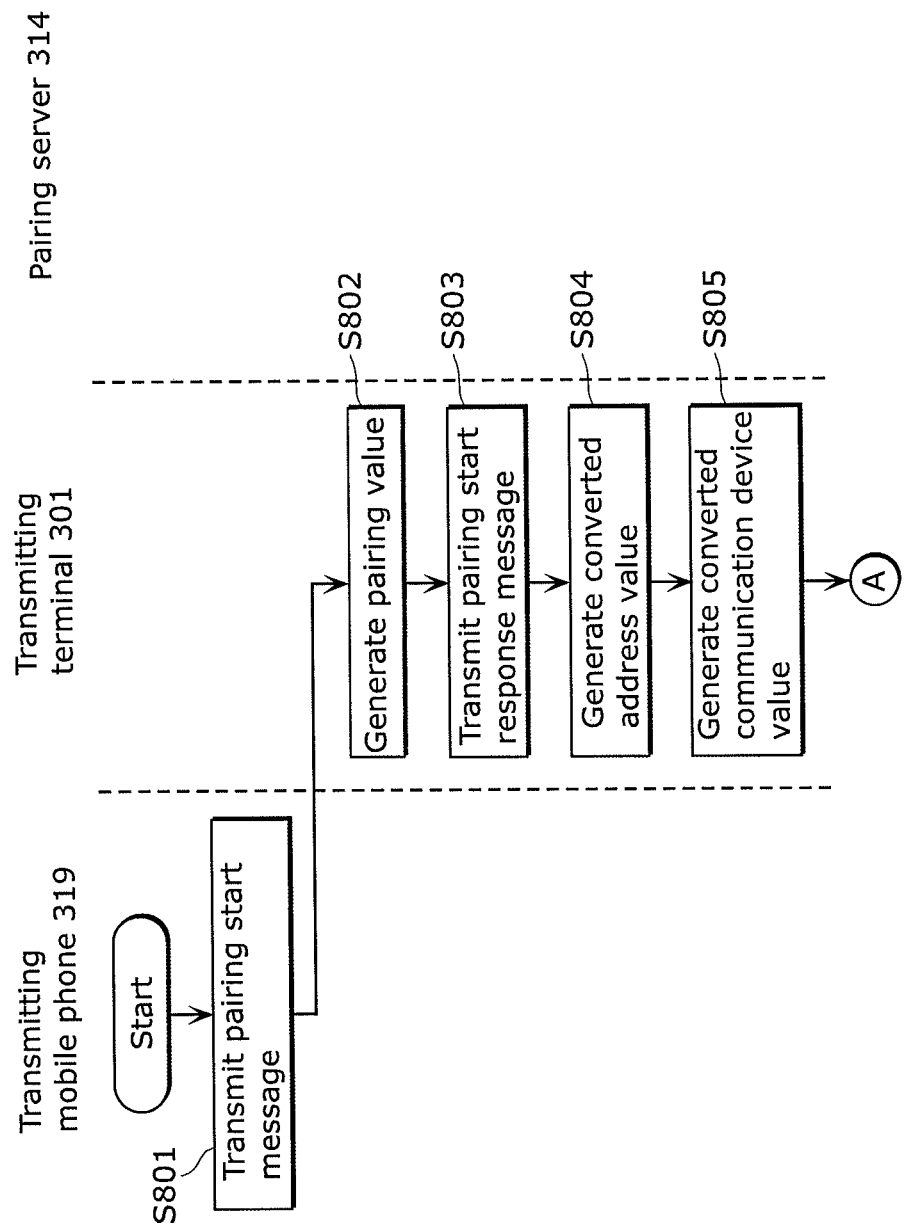

FIG. 13

| Receiving terminal ID | Transmitting terminal ID | Communication phase | Pairing value | Converted address value |
|---|---|---|---|---|
| | 445566CCDD | 1 | 123456789······ | 498DF2······ |

FIG. 14

To : yamamoto@xxx.ne.jp

Hi, Yukari, this is Suzuki.
I have 30 photos taken
in the cooking class last
week and would like you
to have them.
----------------------
Please touch the terminal.

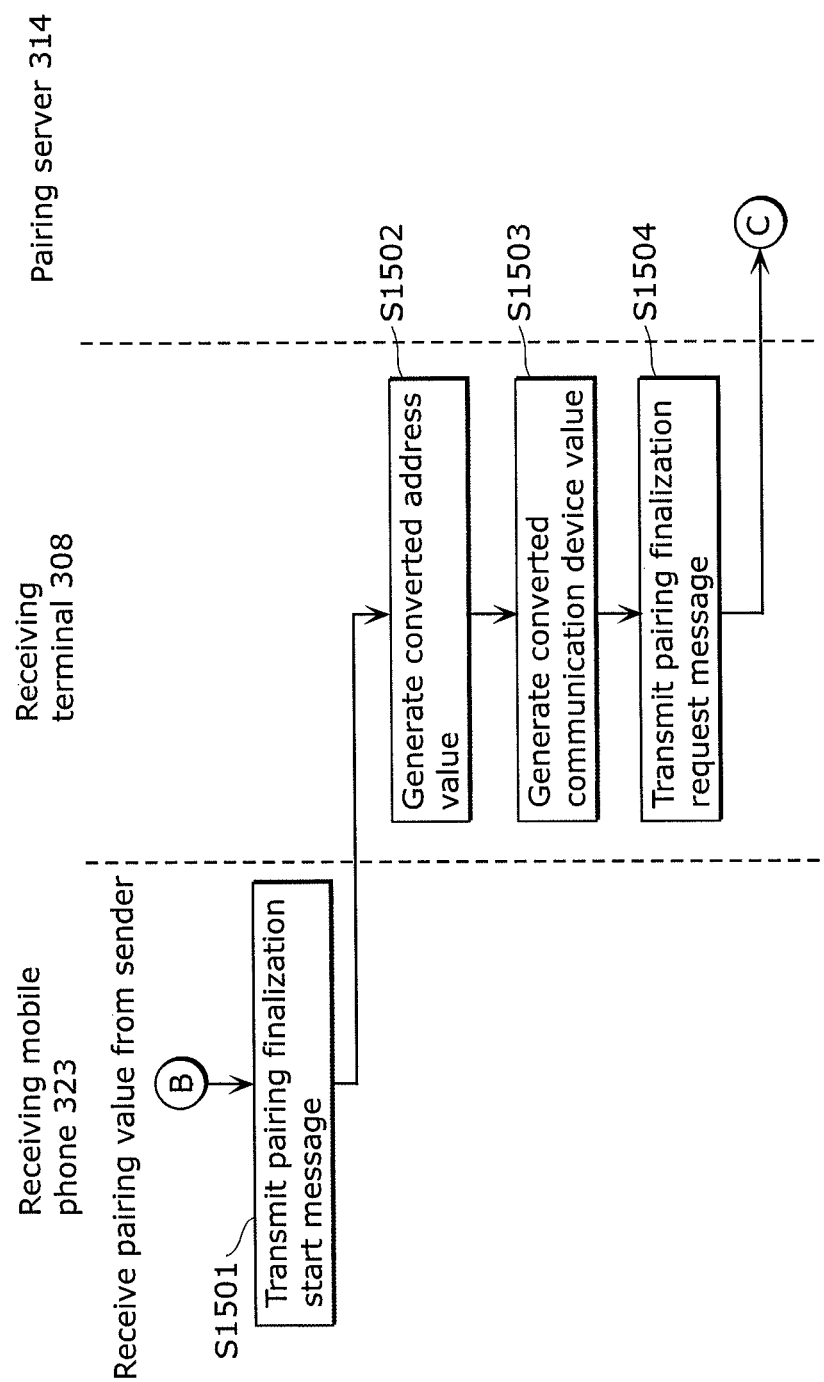

FIG. 18

| Receiving terminal ID | Transmitting terminal ID | Communication phase | Pairing value | Converted address value |
|---|---|---|---|---|
| 778899EEFF | 445566CCDD | 2 | 123456789······ | 498DF2······ |

| Management ID | Communication phase | Pairing value | Transmitting terminal ID |
|---|---|---|---|
| 00000001 | 2 | 123456789ABCDEF0 | 445566CCDD |

FIG. 22
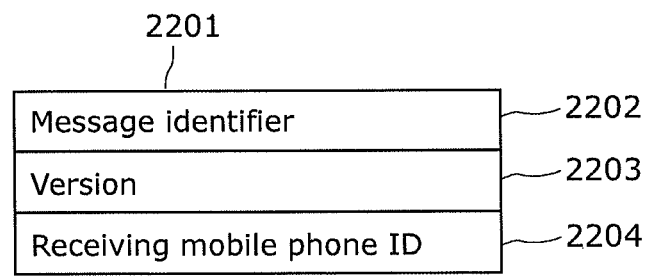
FIG. 23
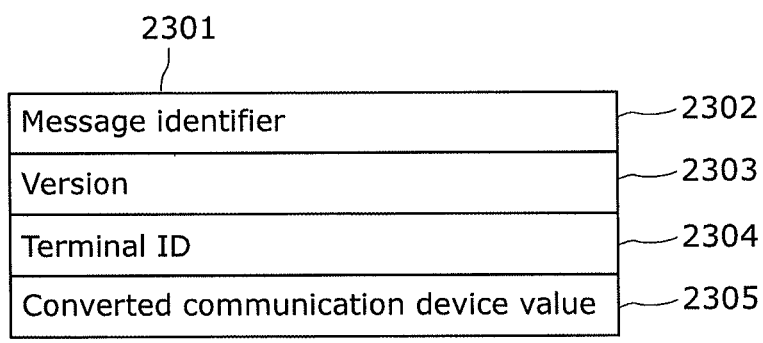
FIG. 24
| Terminal ID | Converted communication device value |
|---|---|
| 778899EEFF | 876AE2 ······ |

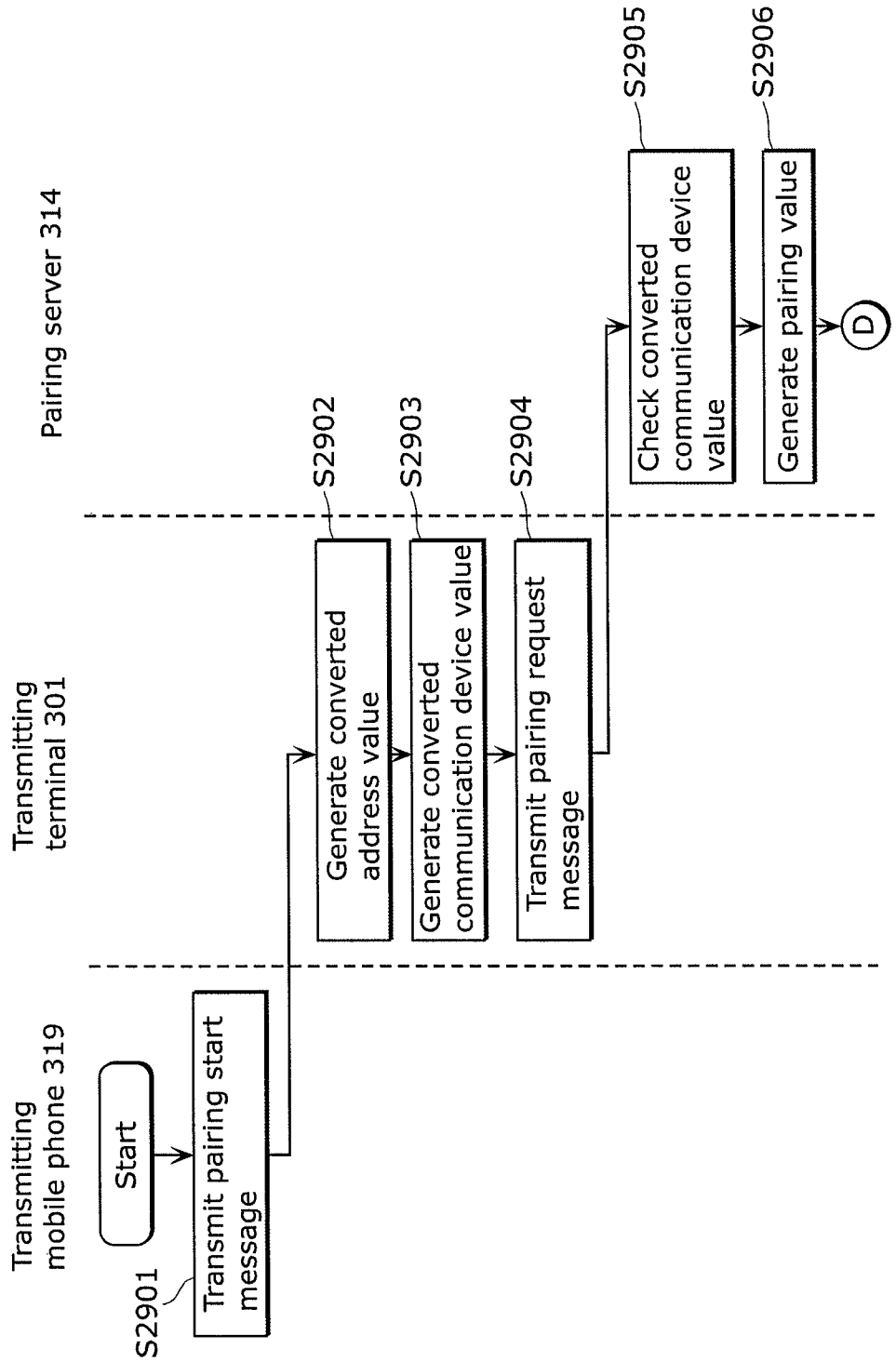

FIG. 31

| Receiving terminal ID | Transmitting terminal ID | Communication phase | Pairing value | Converted address value |
|---|---|---|---|---|
| | 445566CCDD | 1 | 123456789······ | 498DF2······ |

FIG. 42

| Receiving terminal ID | Transmitting terminal ID | Communication phase | Pairing value | Converted address value |
|---|---|---|---|---|
| | 445566CCDD | 1 | 123456789······ | |

FIG. 46

| Receiving terminal ID | Transmitting terminal ID | Communication phase | Pairing value | Converted address value |
|---|---|---|---|---|
| 778899EEFF | 445566CCDD | 2 | 123456789······ | |

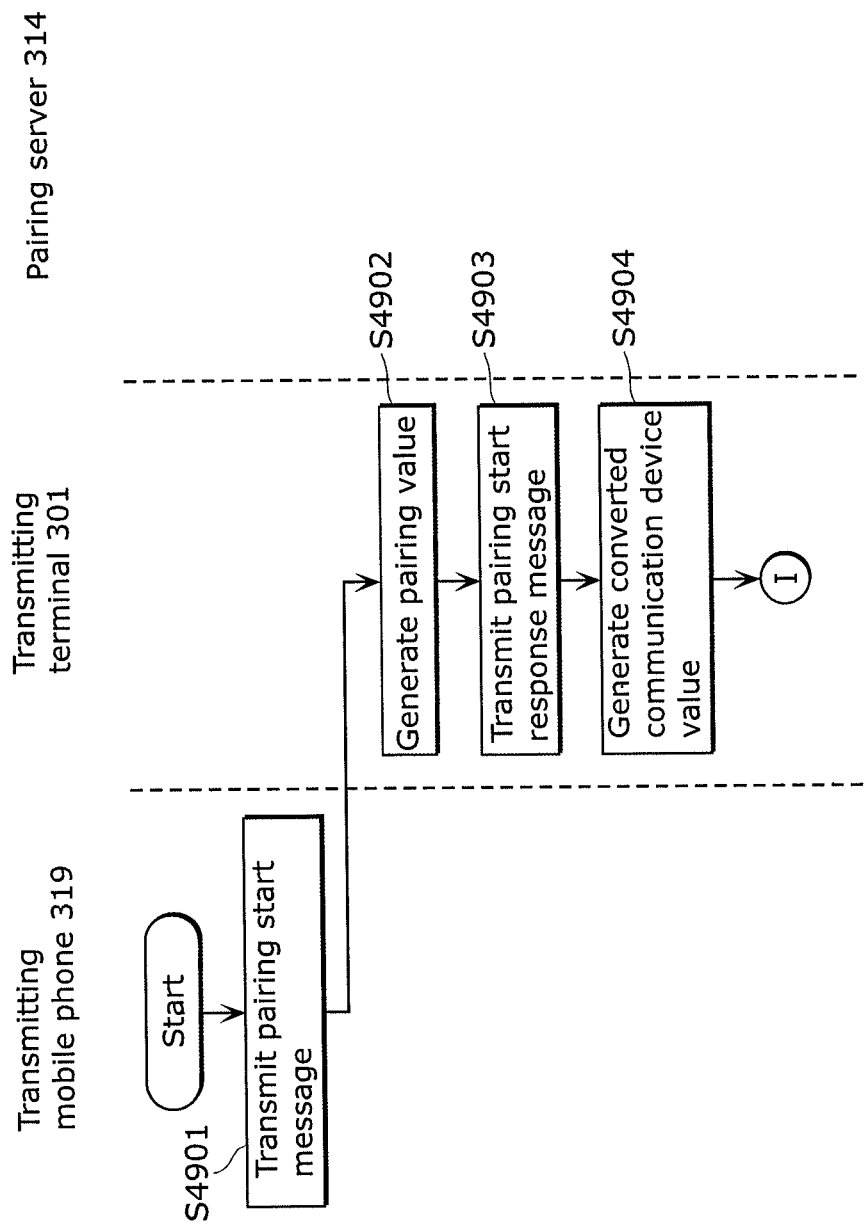

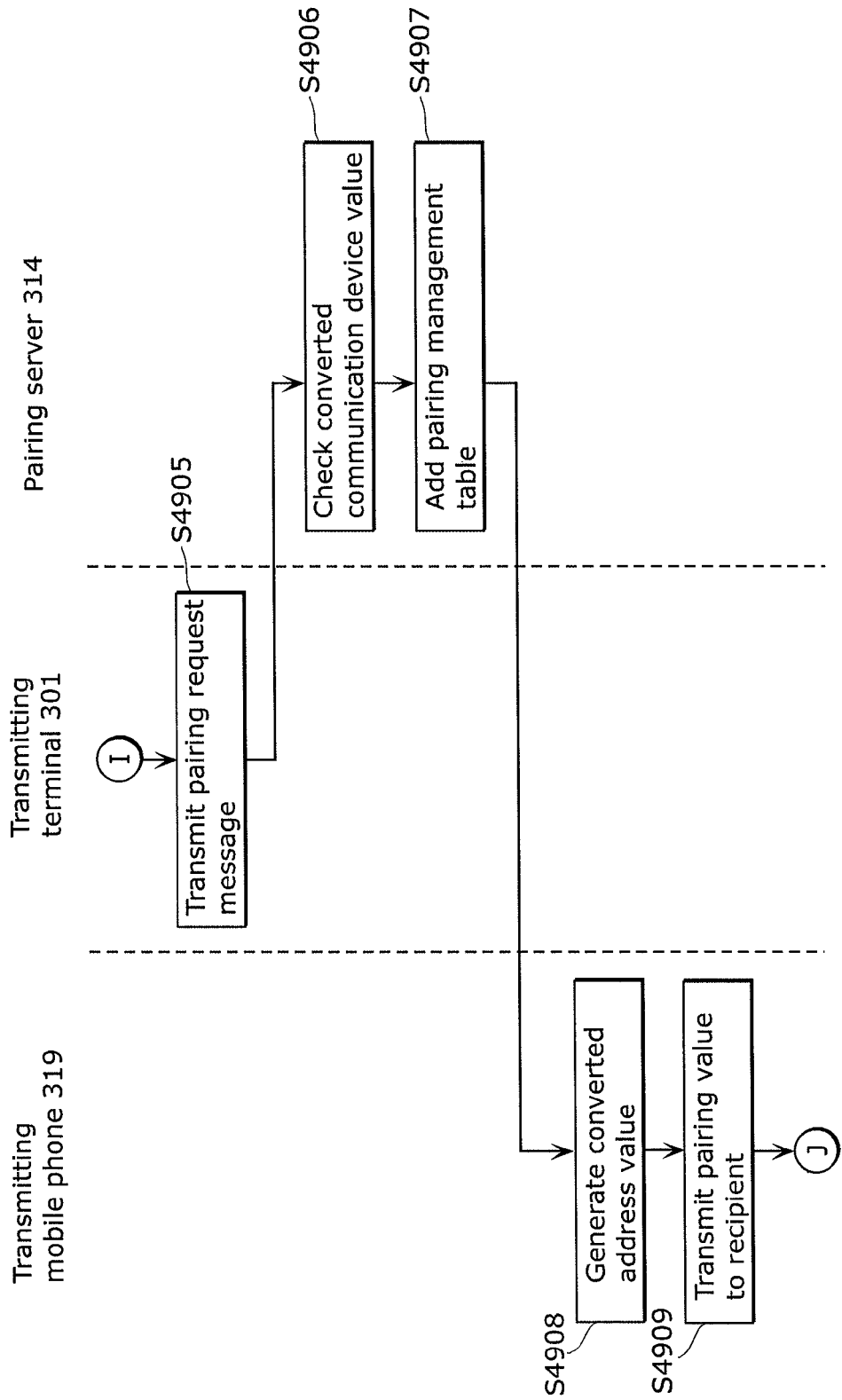

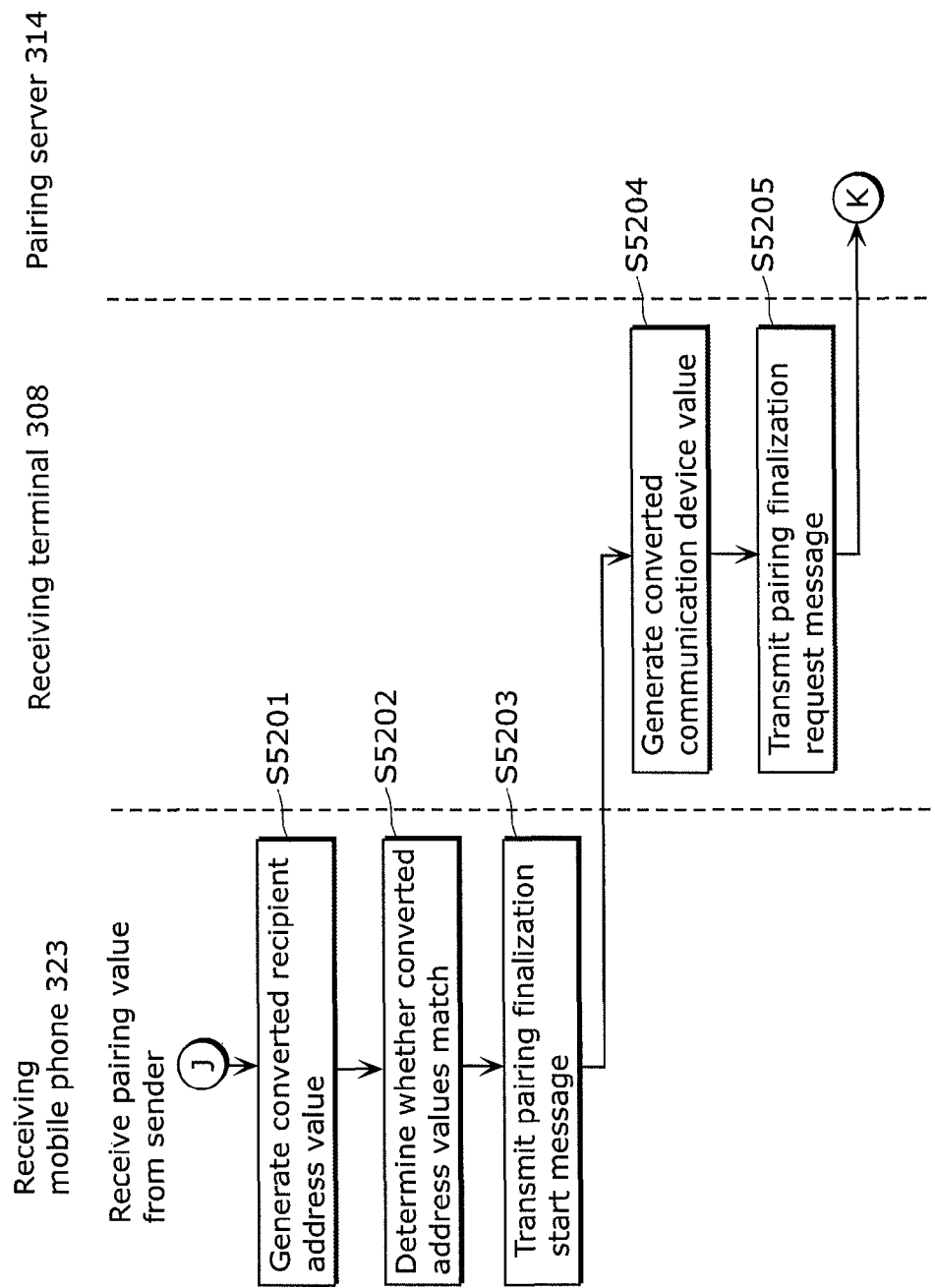

COMMUNICATION CONTROL SYSTEM, SERVER DEVICE, AND COMMUNICATION CONTROL METHOD

TECHNICAL FIELD

The present invention relates to a communication control system, a server device, and a communication control method which are adapted for pairing communication devices to control communication therebetween.

BACKGROUND ART

In recent years, digital still cameras and digital video cameras have been in widespread use, and users increasingly accumulate captured digital photo data and digital video data (hereinafter referred to as "photos" and "video") in a communication device (hereinafter referred to as "terminal") such as a personal computer (PC) to view them. Along with the widespread use of the Internet, more and more terminals are connected to the network, and content data (hereinafter referred to as "content") such as the photos and video accumulated in the terminals is exchanged via the network.

In photos and video, objects which entail privacy concerns, such as human faces and residences, often appear. When sharing photos and video with a friend, it is therefore necessary to check and set a destination in advance so as not to transmit the content to an unintended recipient.

For example, Patent Literature (PTL) 1 discloses a photo sharing system for sharing photos between television receivers. In the photo sharing system in PTL 1, photos can be shared between persons who know predetermined identification information (ID).

CITATION LIST

Patent Literature

[PTL 1]
International Publication No. 2008/093781

SUMMARY OF INVENTION

Technical Problem

However, the above conventional technique does not make it possible to reduce the occurrence of mistaken sharing of content.

Thus, the main object of the present invention is to provide a communication control system, a sever device, and a communication control method which can reduce the occurrence of mistaken sharing of content.

In order to achieve the object, a communication control system according to an aspect of the present invention comprises a first communication device; a second communication device; a third communication device capable of communicating with the first communication device; a fourth communication device capable of communicating with the second communication device and the third communication device; and a server device connected to each of the first communication device and the second communication device via a network, wherein the communication control system pairs the first communication device and the second communication device to control communication between the first communication device and the second communication device, the third communication device includes: a management unit configured to hold communication device information that is information on the fourth communication device; and a first transmitting unit configured to transmit the held communication device information to the first communication device, the first communication device includes: a pairing identifier generation unit configured to generate a pairing identifier when the communication device information is received from the third communication device; a second transmitting unit configured to transmit, to the server device, a first request including a first device identifier of the first communication device, the communication device information, and the generated pairing identifier; and a third transmitting unit configured to transmit the generated pairing identifier to the third communication device, the third communication device further includes a fourth transmitting unit configured to, when the pairing identifier is received from the first communication device, transmit the received pairing identifier to the fourth communication device, the fourth communication device includes a fifth transmitting unit configured to, when the pairing identifier is received from the third communication device, transmit communication device information and the received pairing identifier to the second communication device, the communication device information being information on the fourth communication device which is previously held in the fourth communication device, the second communication device includes a sixth transmitting unit configured to transmit a second request to the server device when the communication device information and the pairing identifier are received from the fourth communication device, the second request including a second device identifier of the second communication device, the received communication device information, and the received pairing identifier, and the server device includes: a determination unit configured to, when the first request is received from the first communication device and the second request is received from the second communication device, determine whether or not the pairing identifier included in the first request and the pairing identifier included in the second request match and whether or not the communication device information included in the first request and the communication device information included in the second request match; and a pairing unit configured to pair the first communication device and the second communication device using the first device identifier included in the first request and the second device identifier included in the second request when it is determined that the pairing identifier included in the first request and the pairing identifier included in the second request match and that the communication device information included in the first request and the communication device information included in the second request match.

It is to be noted that these general or specific aspects may be implemented using a device, a method, an integrated circuit, a computer program, or a recording medium, or any combination of devices, methods, integrated circuits, computer programs, and recording mediums.

Advantageous Effects of Invention

According to an aspect of the present invention, it is possible to reduce the occurrence of mistaken sharing of content.

BRIEF DESCRIPTION OF DRAWINGS

FIG. 2 is a flowchart for explaining the operation in the conventional communication control system.

FIG. 4 shows an example of data managed by a phase management unit of a transmitting terminal in Embodiment 1.

FIG. 5 shows an example of data managed by a phase management unit of a receiving terminal in Embodiment 1.

FIG. 6A shows an example of a pairing management table stored in a pairing management unit of the pairing server in Embodiment 1.

FIG. 6B shows an example of a communication device management table stored in a communication device management unit of the pairing server in Embodiment 1.

FIG. 8A is a flowchart showing a flow of processing at a pairing preparation phase in Embodiment 1.

FIG. 13 shows an example of data stored in the pairing management unit of the pairing server in Embodiment 1.

FIG. 14 shows a screen of a transmitting mobile phone which appears after a message input in Embodiment 1.

FIG. 15A is a flowchart showing a flow of processing at a pairing finalization phase in Embodiment 1.

FIG. 18 shows an example of the pairing management table in Embodiment 1.

FIG. 22 shows an example of message data included in a communication device registration start message in Embodiment 1.

FIG. 23 shows an example of message data included in a communication device registration request message in Embodiment 1.

FIG. 24 shows an example of the communication device management table in Embodiment 1.

FIG. 29A is a flowchart showing a flow of processing at a pairing preparation phase in Embodiment 2.

FIG. 31 shows an example of the pairing management table in Embodiment 2.

FIG. 42 shows an example of the pairing management table in Embodiment 4.

FIG. 46 shows an example of the pairing management table in Embodiment 4.

FIG. 49A is a flowchart showing a flow of processing at a pairing preparation phase in Embodiment 5.

FIG. 49B is a flowchart showing a flow of processing at the pairing preparation phase in Embodiment 5.

FIG. 52A is a flowchart showing a flow of processing at a pairing finalization phase in Embodiment 5.

DESCRIPTION OF EMBODIMENTS

Underlying Knowledge Forming Basis of the Present Invention

First, the photo sharing system in PTL 1 is described.

Figure 1:
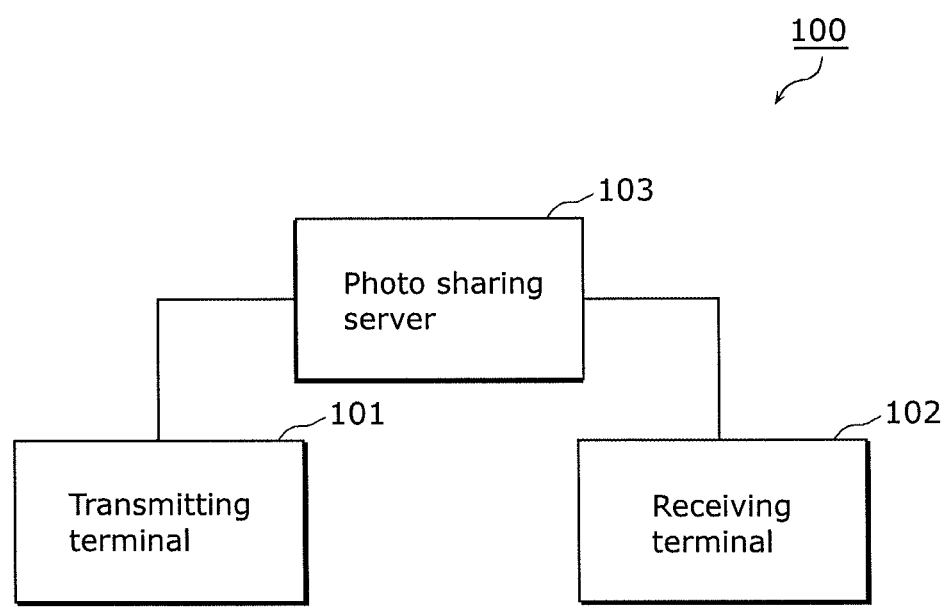
FIG. 1 is a block diagram showing a configuration of a conventional communication control system.

FIG. 1 is a block diagram showing a configuration of a conventional photo sharing system 100.

In FIG. 1, the photo sharing system 100 includes a transmitting terminal 101, a receiving terminal 102, and a photo sharing server 103. The transmitting terminal 101 is a communication device which is operated by a sender of a photo, and the receiving terminal 102 is a communication device which is operated by a recipient of the photo. The photo sharing server 103 is a server device which issues ID to the transmitting terminal 101 and in which photos to be shared are accumulated.

FIG. 2 is a flowchart for explaining the operation in the conventional photo sharing system 100. Specifically, FIG. 2 shows how to check and set a destination before photo-sharing.

In Step S201, the transmitting terminal 101 transmits, to the photo sharing server 103, a request for issuing shared ID. The photo sharing server 103 then generates shared ID and transmits the generated shared ID to the transmitting terminal 101 in Step S202.

In Step S203, the transmitting terminal 101 receives the shared ID from the photo sharing server 103 and displays the received shared ID on a screen. The sender notifies the recipient of the shared ID displayed on the screen. The notification is made using a telephone and so on. In Step S204, the receiving terminal 102 receives an input of the shared ID from the recipient who has been notified of the shared ID.

The above description is made on the conventional way to check and set a destination.

Furthermore, in the photo sharing system in PTL 1, in the case of transmitting a photo of a sender from the transmitting terminal 101 to the receiving terminal 102, the transmitting terminal 101 transmits, to the photo sharing server 103, the shared ID and the photo desired to be transmitted. The photo sharing server 103 accumulates the received shared ID and photo in such a way that the received shared ID and photo are associated with each other. Afterward, the receiving terminal 102 transmits, to the photo sharing server 103, the shared ID set in advance, and receives, from the photo sharing server 103, the photo associated with the shared ID, thereby receiving the photo of the sender.

However, in the photo sharing system in PTL 1, photos sometimes cannot be correctly shared. For example, the sender and the recipient are unable to share photos when the sender notifies the recipient of incorrect shared ID or when the recipient inputs incorrect shared ID into the receiving terminal 102.

In such a case, the recipient fails to share the photo of the sender. Furthermore, the receiving terminal 102 can receive the photo associated with the incorrectly input shared ID, which is problematic. Furthermore, when a malicious recipient inputs arbitrary shared ID into the receiving terminal 102, the receiving terminal 102 can receive the photo associated with that shared ID, which is also problematic.

In other words, the technique of PTL 1 has a problem that data transmitted from the transmitting terminal can be received by the receiving terminal which is not intended to receive the data. This means that the data is transmitted to a recipient who is not intended by a sender, which poses a significant privacy problem.

Furthermore, the recent widespread use of mobile phones allows many people to use the short message service (SMS), the multimedia messaging service (MMS), mobile phone emails, and so on as communication means for individuals. Thus, the sender presumably generally uses these communication means to notify the recipient of the shared ID in the form of electronic information such as text information. Furthermore, the mobile phones are equipped with wired transmission means, such as the universal serial buses (USB), and wireless transmission means, such as the near field communication (NFC) and Wi-Fi, and it is therefore possible to easily transmit the shared ID from the communication device to the mobile phones and from the mobile phones to the communication device.

However, since the communication means, such as SMS, easily transfers the electronic information received by the recipient to another person, a malicious recipient who receives the shared ID from the sender can transfer the shared ID to another person, and when the other person inputs the transferred shared ID into the receiving terminal 102, the receiving terminal 102 can receive the photo associated with the shared ID, which is also problematic.

Thus, a general or specific aspect of the present invention has an object to reduce, in pairing the first communication device and the second communication device, the occurrence of pairing of the first communication device or the second communication device with other communication device which is not intended.

A communication control system according to an aspect of the present invention comprises a first communication device; a second communication device; a third communication device capable of communicating with the first communication device; a fourth communication device capable of communicating with the second communication device and the third communication device; and a server device connected to each of the first communication device and the second communication device via a network, wherein the communication control system pairs the first communication device and the second communication device to control communication between the first communication device and the second communication device, the third communication device includes: a management unit configured to hold communication device information that is information on the fourth communication device; and a first transmitting unit configured to transmit the held communication device information to the first communication device, the first communication device includes: a pairing identifier generation unit configured to generate a pairing identifier when the communication device information is received from the third communication device; a second transmitting unit configured to transmit, to the server device, a first request including a first device identifier of the first communication device, the communication device information, and the generated pairing identifier; and a third transmitting unit configured to transmit the generated pairing identifier to the third communication device, the third communication device further includes a fourth transmitting unit configured to, when the pairing identifier is received from the first communication device, transmit the received pairing identifier to the fourth communication device, the fourth communication device includes a fifth transmitting unit configured to, when the pairing identifier is received from the third communication device, transmit communication device information and the received pairing identifier to the second communication device, the communication device information being information on the fourth communication device which is previously held in the fourth communication device, the second communication device includes a sixth transmitting unit configured to transmit a second request to the server device when the communication device information and the pairing identifier are received from the fourth communication device, the second request including a second device identifier of the second communication device, the received communication device information, and the received pairing identifier, and the server device includes: a determination unit configured to, when the first request is received from the first communication device and the second request is received from the second communication device, determine whether or not the pairing identifier included in the first request and the pairing identifier included in the second request match and whether or not the communication device information included in the first request and the communication device information included in the second request match; and a pairing unit configured to pair the first communication device and the second communication device using the first device identifier included in the first request and the second device identifier included in the second request when it is determined that the pairing identifier included in the first request and the pairing identifier included in the second request match and that the communication device information included in the first request and the communication device information included in the second request match.

With this structure, the first communication device and the second communication device are paired when a set of the pairing identifier and the communication device information which have been transmitted from the first communication device to the server device matches a set of the pairing identifier and the communication device information which have been transmitted from the second communication device to the server device. Thus, the occurrence of mistaken pairing of other communication devices which perform another pairing process with the first communication device or the second communication device is reduced. In other words, it is possible to reduce the occurrence of mistaken sharing of content.

Furthermore, with this structure, whether or not there is matching of not only the pairing identifiers, but also the communication device information is determined. Consequently, even when a malicious recipient receives the pairing identifier from the sender, transfers the pairing identifier to another person, and the other person inputs the transferred pairing identifier into other communication devices, the occurrence of pairing of the other communication devices with the first communication device or the second communication device can be reduced. In other words, the occurrence of mistaken sharing of content with others can be reduced.

For example, it may be that the communication device information indicates a communication address of the fourth communication device, and the fourth transmitting unit is configured to transmit the pairing identifier to the fourth communication device using the communication address indicated in the communication device information.

With this structure, the communication address of the fourth communication device can be used as the communication device information on the fourth communication device. Thus, it is possible to reduce the occurrence of overlapping of the communication device information on the fourth communication device with the communication device information on other communication devices. As a result, mistaken sharing of content with others can be further prevented.

For example, it may be that the first communication device further includes a first data conversion unit configured to convert the communication device information using a one-way function, the first request includes the communication device information resulting from the conversion, the second communication device further includes a second data conversion unit configured to convert the communication device information using the one-way function, and the second request includes the communication device information resulting from the conversion.

With this structure, the communication device information converted using a one-way function is transmitted, which makes it possible to prevent the communication device information before conversion from leaking.

For example, it may be that the first transmitting unit is configured to transmit the communication device information to the first communication device using near field communication, and the third transmitting unit is configured to transmit the pairing identifier to the third communication device using the near field communication.

With this structure, the first communication device and the third communication device communicate with each other using the near field communication, which allows for an improvement in user convenience.

Furthermore, a communication control system according to an aspect of the present invention comprises: a first communication device; a second communication device; a third communication device capable of communicating with the first communication device; a fourth communication device capable of communicating with the second communication device and the third communication device; and a server device connected to each of the first communication device and the second communication device via a network, wherein the communication control system pairs the first communication device and the second communication device to control communication between the first communication device and the second communication device, the third communication device includes: a management unit configured to hold communication device information that is information on the fourth communication device; and a first transmitting unit configured to transmit the held communication device information to the first communication device, the first communication device includes a second transmitting unit configured to transmit, to the server device, a first request including a first device identifier of the first communication device, and the communication device information received from the third communication device, the server device includes: a pairing identifier generation unit configured to generate a pairing identifier; and a third transmitting unit configured to transmit the generated pairing identifier to the first communication device, the first communication device further includes a fourth transmitting unit configured to transmit, to the third communication device, the pairing identifier received from the server device, the third communication device further includes a fifth transmitting unit configured to, when the pairing identifier is received from the first communication device, transmit the received pairing identifier to the fourth communication device, the fourth communication device includes a sixth transmitting unit configured to, when the pairing identifier is received from the third communication device, transmit communication device information and the received pairing identifier to the second communication device, the communication device information being information on the fourth communication device which is previously held in the fourth communication device, the second communication device includes a seventh transmitting unit configured to transmit a second request to the server device when the communication device information and the pairing identifier are received from the fourth communication device, the second request including a second device identifier of the second communication device, the received communication device information, and the received pairing identifier, the server device further includes: a determination unit configured to, when the first request is received from the first communication device and the second request is received from the second communication device, determine whether or not the pairing identifier generated by the pairing identifier generation unit and the pairing identifier included in the second request match and whether or not the communication device information included in the first request and the communication device information included in the second request match; and a pairing unit configured to pair the first communication device and the second communication device using the first device identifier included in the first request and the second device identifier included in the second request when it is determined that the pairing identifier generated by the pairing identifier generation unit and the pairing identifier included in the second request match and that the communication device information included in the first request and the communication device information included in the second request match.

With this structure, the server device is capable of generating the pairing identifier. Even in such a case, it is possible to produce the same effects as those in the above communication control system.

Furthermore, a communication control system according to an aspect of the present invention comprises: a first communication device; a second communication device; a third communication device capable of communicating with the first communication device; a fourth communication device capable of communicating with the second communication device and the third communication device; and a server device connected to each of the first communication device and the second communication device via a network, wherein the communication control system pairs the first communication device and the second communication device to control communication between the first communication device and the second communication device, the third communication device includes: a pairing identifier generation unit configured to generate a pairing identifier; a management unit configured to hold communication device information that is information on the fourth communication device; and a first transmitting unit configured to transmit, to the first communication device, the pairing identifier generated by the pairing identifier generation unit and the held communication device information, the first communication device includes: a second transmitting unit configured to transmit, to the server device, a first request including a first device identifier of the first communication device, and the communication device information and the pairing identifier received from the third communication device; and a third transmitting unit configured to transmit the pairing identifier to the third communication device, the third communication device further includes a fourth transmitting unit configured to transmit, to the fourth communication device, the pairing identifier generated by the pairing identifier generation unit, the fourth communication device includes a fifth transmitting unit configured to, when the pairing identifier is received from the third communication device, transmit communication device information and the received pairing identifier to the second communication device, the communication device information being information on the fourth communication device which is previously held in the fourth communication device, the second communication device includes a sixth transmitting unit configured to transmit a second request to the server device when the communication device information and the pairing identifier are received from the fourth communication device, the second request including a second device identifier of the second communication device, the received communication device information, and the received pairing identifier, the server device includes: a determination unit configured to, when the first request is received from the first communication device and the second request is received from the second communication device, determine whether or not the pairing identifier included in the first request and the pairing identifier included in the second request match and whether or not the communication device information included in the first request and the communication device information included in the second request match; and a pairing unit configured to pair the first communication device and the second communication device using the first device identifier included in the first request and the second device identifier included in the second request when it is determined that the pairing identifier included in the first request and the pairing identifier included in the second request match and that the communication device information included in the first request and the communication device information included in the second request match.

With this structure, the third communication device is capable of generating the pairing identifier. Even in such a case, it is possible to produce the same effects as those in the above communication control system.

Furthermore, a communication control system according to an aspect of the present invention comprises: a first communication device; a second communication device; a third communication device capable of communicating with the first communication device; a fourth communication device capable of communicating with the second communication device and the third communication device; and a server device connected to each of the first communication device and the second communication device via a network, wherein the communication control system pairs the first communication device and the second communication device to control communication between the first communication device and the second communication device, the third communication device includes: a management unit configured to hold communication device information that is information on the fourth communication device; and a first transmitting unit configured to transmit the held communication device information to the first communication device, the first communication device includes: a pairing identifier generation unit configured to generate a pairing identifier when the communication device information is received from the third communication device; a first conversion unit configured to convert, using a predetermined conversion method, the communication device information received from the third communication device, to generate first converted data; a second transmitting unit configured to transmit, to the server device, a first request including a first device identifier of the first communication device and the generated pairing identifier; and a third transmitting unit configured to transmit the pairing identifier and the first converted data to the third communication device, the third communication device further includes a fourth transmitting unit configured to, when the pairing identifier and the first converted data are received from the first communication device, transmit the received pairing identifier and the received first converted data to the fourth communication device, the fourth communication device includes a fifth transmitting unit configured to, when the pairing identifier and the first converted data are received from the third communication device, transmit communication device information, the received pairing identifier, and the received first converted data to the second communication device, the communication device information being information on the fourth communication device which is previously held in the fourth communication device, the second communication device includes: a second conversion unit configured to, when the communication device information, the pairing identifier, and the first converted data are received from the fourth communication device, convert the communication device information using the predetermined conversion method, to generate second converted data; a first determination unit configured to determine whether or not the first converted data and the second converted data match; and a sixth transmitting unit configured to transmit a second request to the server device when it is determined that the first converted data and the second converted data match, the second request including a second device identifier of the second communication device and the pairing identifier, and the server device includes: a second determination unit configured to, when the first request is received from the first communication device and the second request is received from the second communication device, determine whether or not the pairing identifier included in the first request and the pairing identifier included in the second request match; and a pairing unit configured to pair the first communication device and the second communication device using the first device identifier included in the first request and the second device identifier included in the second request when it is determined that the pairing identifier included in the first request and the pairing identifier included in the second request match.

With this structure, the second communication device is capable of determining whether or not the conversed data based on the communication device information match. Even in such a case, it is possible to produce the same effects as those in the above communication control system.

Furthermore, a communication control system according to an aspect of the present invention comprises: a first communication device; a second communication device; a third communication device capable of communicating with the first communication device; a fourth communication device capable of communicating with the second communication device and the third communication device; and a server device connected to each of the first communication device and the second communication device via a network, wherein the communication control system pairs the first communication device and the second communication device to control communication between the first communication device and the second communication device, the first communication device includes: a pairing identifier generation unit configured to generate a pairing identifier; a first transmitting unit configured to transmit, to the server device, a first request including a first device identifier of the first communication device and the generated pairing identifier; and a second transmitting unit configured to transmit the pairing identifier to the third communication device, the third communication device includes: a management unit configured to hold communication device information that is information on the fourth communication device; a first conversion unit configured to convert the held communication device information using a predetermined conversion method, to generate first converted data; and a third transmitting unit configured to, when the pairing identifier is received from the first communication device, transmit the received pairing identifier and the first converted data to the fourth communication device, the fourth communication device includes: a second conversion unit configured to convert communication device information using the predetermined conversion method, to generate second converted data, when the pairing identifier and the first converted data are received from the third communication device, the communication device information being information on the fourth communication device which is previously held in the fourth communication device; a first determination unit configured to determine whether or not the first converted data and the second converted data match; and a fourth transmitting unit configured to transmit the received pairing identifier to the second communication device when it is determined that the first converted data and the second converted data match, the second communication device includes a fifth transmitting unit configured to transmit a second request to the server device when the pairing identifier is received from the fourth communication device, the second request including a second device identifier of the second communication device and the received pairing identifier, and the server device includes: a second determination unit configured to, when the first request is received from the first communication device and the second request is received from the second communication device, determine whether or not the pairing identifier included in the first request and the pairing identifier included in the second request match; and a pairing unit configured to pair the first communication device and the second communication device using the first device identifier included in the first request and the second device identifier included in the second request when it is determined that the pairing identifier included in the first request and the pairing identifier included in the second request match.

With this structure, the fourth communication device is capable of determining whether or not the conversed data based on the communication device information match. Even in such a case, it is possible to produce the same effects as those in the above communication control system.

Furthermore, a server device according to an aspect of the present invention is a server device connected to each of a first communication device and a second communication device via a network, for pairing the first communication device and the second communication device to control communication between the first communication device and the second communication device, the server device comprising: a determination unit configured to, when a first request which requests pairing is received from the first communication device and a second request which requests pairing is received from the second communication device, determine whether or not a pairing identifier included in the first request and a pairing identifier included in the second request match and whether or not communication device information included in the first request and communication device information included in the second request match, the communication device information being information on a device capable of communicating with the second communication device; and a pairing unit configured to pair the first communication device and the second communication device using the first device identifier included in the first request and the second device identifier included in the second request when it is determined that the pairing identifier included in the first request and the pairing identifier included in the second request match and that the communication device information included in the first request and the communication device information included in the second request match.

This structure can provide the same effects as the above communication control system.

It is to be noted that these general or specific aspects may be implemented using a system, a device, a method, an integrated circuit, a computer program, or a recording medium, or any combination of systems, devices, methods, integrated circuits, computer programs, and recording media.

Embodiments of the present invention are described below with reference to the drawings.

It is to be noted that each of Embodiments described below illustrates one specific example of the present invention. Numeric values, shapes, materials, constituents, positions and topologies of the constituents, steps, an order of the steps, and the like in the following Embodiments are an example, and it should therefore not be construed that the present invention is limited to each of these Embodiments. Furthermore, out of the constituents in the following Embodiments, the constituents not stated in the independent claims describing the broadest concept of the present invention are described as arbitrary constituents.

Embodiment 1

Figure 3A:
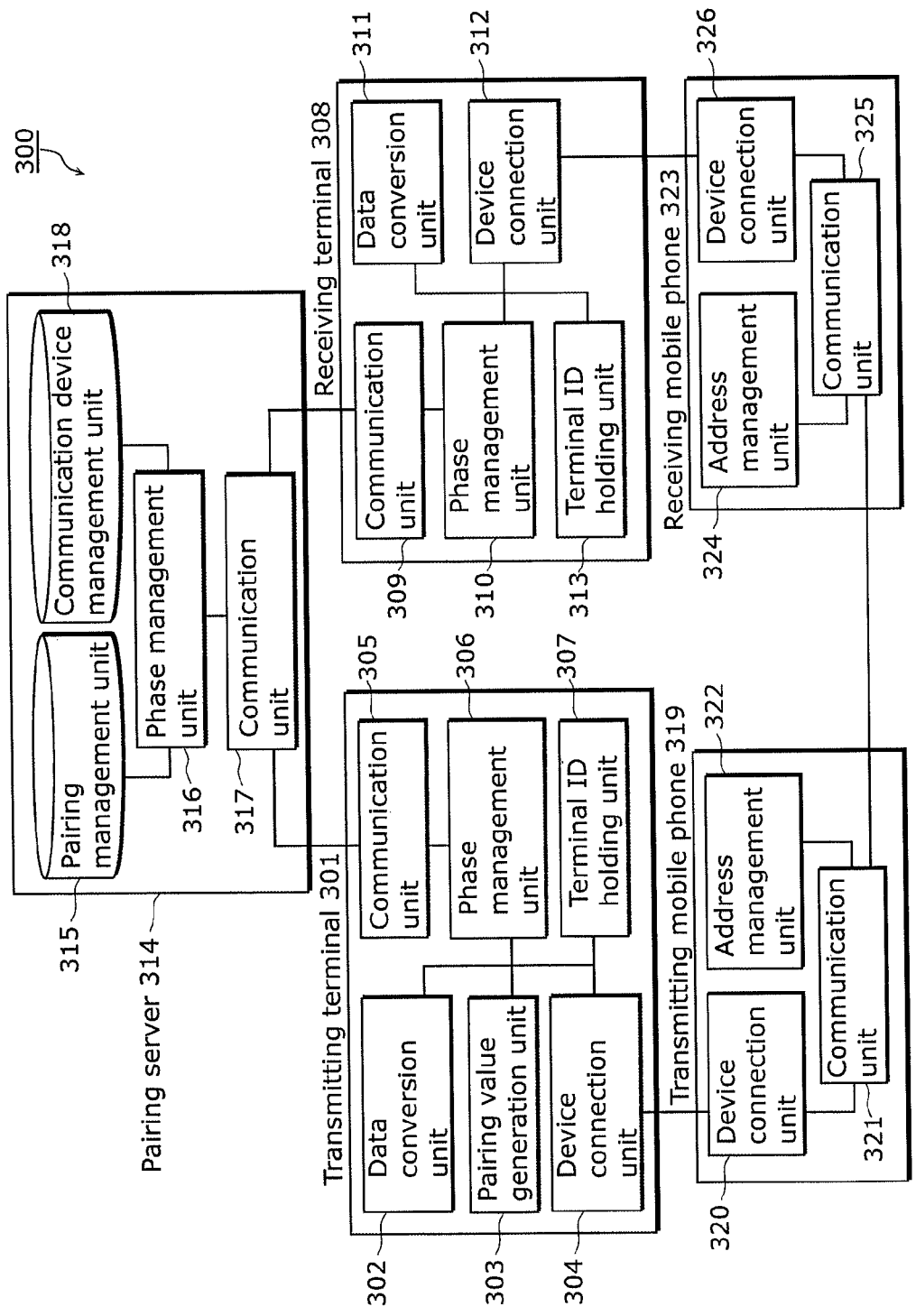
FIG. 3A is a block diagram showing a configuration of a communication control system in Embodiment 1.
Figure 3B:
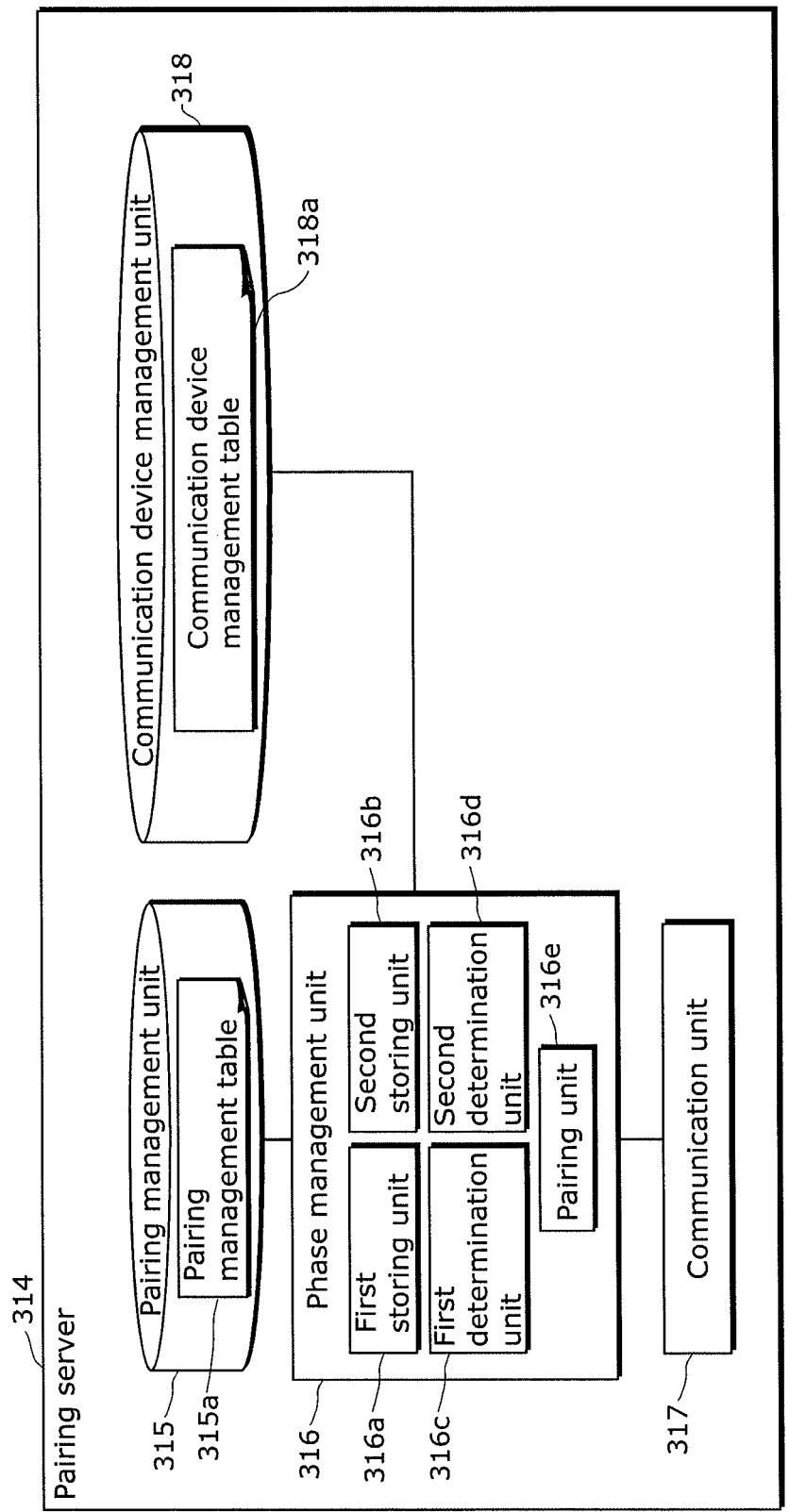
FIG. 3B is a block diagram showing a detailed configuration of a pairing server in Embodiment 1.

FIG. 3A is a block diagram showing a configuration of a communication control system 300 in Embodiment 1. FIG. 3B is a block diagram showing a detailed configuration of a pairing server 314 in Embodiment 1.

As shown in FIG. 3A, the communication control system 300 includes a transmitting terminal 301, a receiving terminal 308, the pairing server 314 connected to each of the transmitting terminal 301 and the receiving terminal 308 via the network, for example, a transmitting mobile phone 319, and a receiving mobile phone 323.

The transmitting terminal 301 corresponds to the first communication device and holds content such as photos. The transmitting terminal 301 includes a data conversion unit 302, a device connection unit 304, a terminal ID holding unit 307, a communication unit 305, and a phase management unit 306.

The receiving unit 308 corresponds to the second communication device and receives content such as photos from the transmitting terminal 301 and displays it. The receiving terminal 308 includes a communication 309, a phase management unit 310, a data conversion unit 311, a device connection unit 312, and a terminal ID holding unit 313.

The pairing server 314 corresponds to the server device and pairs the transmitting terminal 301 and the receiving terminal 308 permitted to receive the content transmitted from the transmitting terminal 301. The pairing server 314 includes a pairing management unit 315, a phase management unit 316, and a communication unit 317.

The transmitting mobile phone 319 corresponds to the third communication device and provides wired or wireless connection with the transmitting terminal 301 to exchange data therebetween. Furthermore, the transmitting mobile phone 319 communicates with the receiving mobile phone 323 by using a communication means such as SMS. The transmitting mobile phone 319 includes a device connection unit 320, a communication unit 321, and an address management unit 322.

The receiving mobile phone 323 corresponds to the fourth communication device and provides wired or wireless connection with the receiving terminal 308 to exchange data therebetween. Furthermore, the receiving mobile phone 323 communicates with the transmitting mobile phone 319 by using a communication means such as SMS. The receiving mobile phone 323 includes an address management unit 324, a communication unit 325, and a device connection unit 326.

Each of the constituent units of the transmitting terminal 301 is described.

The data conversion unit 302 is an operational circuit which converts data, such as addresses of mobile phone emails, using a one-way function to generate converted data. As the one-way function, the hash function SHA-256 is used, for example. It is to be noted that a conversion method using the one-way function is an example of a predetermined conversion method. This means that the data conversion unit 302 does not always need to use the one-way function to convert the addresses.

A pairing value generation unit 303 is an operational circuit which generates a pairing value that is used for pairing. In this embodiment, the pairing value generation unit 303 corresponds to the pairing identifier generation unit.

Pairing means associating the transmitting terminal 301 that transmits content such as photos, with the receiving terminal 308 that receives the content, in order to control communication between the two terminals, i.e., the transmitting terminal 301 and the receiving terminal 308. In this embodiment, pairing also means limiting the transmission and receiving of the content only to the two terminals which are associated with each other. In other words, two terminals share content as a result of pairing in this embodiment.

Furthermore, the pairing value is an example of a pairing identifier and is a number sequence in this embodiment. The pairing identifier does not always need to be a number sequence and may include a character or a symbol, for example.

The device connection unit 304 is a communication circuit which communicates with the transmitting mobile phone 319 to exchange email addresses or pairing values for use in pairing and which is implemented as a communication interface such as USB or NFC. For example, the device connection unit 304 communicates with the transmitting mobile phone 319 using the near field communication. In this embodiment, the device connection unit 304 corresponds to the third transmitting unit which transmits various data to the transmitting mobile phone 319.

The communication unit 305 is a communication circuit implemented as a network interface which provides communication of the pairing value, the terminal ID, and so on, with the pairing server 314. In this embodiment, the communication unit 305 corresponds to the second transmitting unit which transmits various data to the pairing server 314.

The phase management unit 306 manages communication phases. The communication phases include a pairing preparation phase at which the transmitting terminal 301 transmits pairing information to the pairing server 314 and a pairing finalization phase at which such an association is finalized.

FIG. 4 shows an example of data managed by the phase management unit 306 of the transmitting terminal 301. In FIG. 4, management ID 401 is an identifier for identifying a set of a communication phase, a pairing value, and receiving terminal ID.

A communication phase 402 indicates which one of the pairing preparation phase and the pairing finalization phase is the current communication phase. Here, "1" is stored in the communication phase 402 when the current communication phase is the pairing preparation phase, and "2" is stored in the communication phase 402 when the current communication phase is the pairing finalization phase. It is to be noted that the above values are an example and any value may be used as long as they can identify the two phases.

In a pairing value 403, a pairing value generated by the transmitting terminal 301 using the pairing value generation unit 303 is stored In receiving terminal ID 404, terminal ID of the receiving terminal 308 paired with the transmitting terminal 301 is stored when the pairing is finalized.

The terminal ID holding unit 307 is a memory circuit implemented as a flash memory which holds identification information unique to the terminal. The terminal ID is written in the terminal ID holding unit 307 at the factory before shipment or is written in the terminal ID holding unit 307 through the communication unit 305 via the network after shipment from the factory, depending on the case.

Subsequently, each of the constituent units of the receiving terminal 308 is described.

The communication unit 309 is a communication circuit implemented as a network interface which provides communication of the pairing value, the terminal ID, and so on, with the pairing server 314. In this embodiment, the communication unit 309 corresponds to the sixth transmitting unit which transmits various data to the server device.

The phase management unit 310 manages communication phases. The communication phases include a pairing preparation phase at which the receiving terminal 308 transmits pairing information to the pairing server 314 and a pairing finalization phase at which such an association is finalized.

FIG. 5 shows an example of data managed by the phase management unit 310 of the receiving terminal 308. In FIG. 5, management ID 501 is an identifier for identifying a set of a communication phase, a pairing value, and transmitting terminal ID.

A communication phase 502 indicates which one of the pairing preparation phase and the pairing finalization phase is the current communication phase. Here, "1" is stored in the communication phase 502 when the current communication phase is the pairing preparation phase, and "2" is stored in the communication phase 502 when the current communication phase is the pairing finalization phase. It is to be noted that the above values are an example and any value may be used as long as they can identify the two phases.

In a pairing value 503, the pairing value received from the receiving mobile phone 323 is stored.

In transmitting terminal ID 504, terminal ID of the transmitting terminal 301 paired with the receiving terminal 308 is stored when the pairing is finalized.

The data conversion unit 311 is an operational circuit which converts data, such as addresses of mobile phone emails, using a one-way function. As the one-way function, the hash function SHA-256 is used, for example. The data conversion unit 311 converts data using the same conversion method as the data conversion unit 302 of the transmitting terminal 301.

The device connection unit 312 is a communication circuit which communicates with the receiving mobile phone 323 to exchange email addresses or pairing values for use in pairing and which is implemented as a communication interface such as USB or NFC.

The terminal ID holding unit 313 is a memory circuit implemented as a flash memory which holds identification information unique to the terminal. The terminal ID is written in the terminal ID holding unit 313 at the factory before shipment or is written in the terminal ID holding unit 313 through the communication unit 309 via the network after shipment from the factory, depending on the case.

Next, each of the constituent units of the pairing server 314 is described.

The pairing management unit 315 corresponds to the storage unit for storing the pairing value and is, for example, a memory device such as hard disk drive (HDD). The pairing management unit 315 stores a pairing management table 315a that is used to pair the transmitting terminal 301 and the receiving terminal 308 permitted to receive the content transmitted from the transmitting terminal 301.

FIG. 6A shows an example of the pairing management table 315a stored in the pairing management unit 315. As shown in FIG. 6A, the pairing management table 315a includes receiving terminal ID 601, transmitting terminal ID 602, a communication phase 603, a pairing value 604, and a converted address value 605.

In the receiving terminal ID 601, the terminal ID of the receiving terminal 308 received from the receiving terminal 308 via the communication unit 317 is stored. In the transmitting terminal ID 602, the terminal ID of the transmitting terminal 301 received from the transmitting terminal 301 via the communication unit 317 is stored. The communication phase 603 indicates which one of the pairing preparation phase and the pairing finalization phase is the current communication phase. Here, "1" is stored in the communication phase 603 when the current communication phase is the pairing preparation phase, and "2" is stored in the communication phase 603 when the current communication phase is the pairing finalization phase. In the pairing value 604, the pairing value received from the transmitting terminal 301 via the communication unit 317 is stored. In the converted address value 605, a converted receiving-side address value received from the transmitting terminal 301 via the communication unit 317 is stored. In FIG. 6A, a blank column indicates that no value is stored yet.

It is to be noted that the pairing management unit 315 does not always need to store the pairing value and the converted address value into a table like the pairing management table 315a. In other words, the pairing management unit 315 may store the pairing value and the converted address value in any form as long as the pairing value and the converted address value can be stored in association with each other.

The phase management unit 316 is an electronic circuit for managing communication phases. As shown in FIG. 3B, the phase management unit 316 includes a first storing unit 316a, a second storing unit 316b, a first determination unit 316c, a second determination unit 316d, and a pairing unit 316e. A detail of each of the constituent units will be described later.

The communication unit 317 is a communication circuit implemented as a network interface which provides communication of the pairing value and the terminal ID with the transmitting terminal 301 and the receiving terminal 308.

A communication device management unit 318 is a memory device such as HDD, for example. The communication device management unit 318 stores information on the transmitting mobile phone 319 registered in the transmitting terminal 301. As shown in FIG. 6B, a communication device management table 318a includes terminal ID 606 and a converted communication device value 607.

In the terminal ID 606, the terminal ID received from the transmitting terminal 301 and the receiving terminal 308 via the communication unit 317 is stored. In the converted communication device value 607, the converted communication device value received from the transmitting terminal 301 and the receiving terminal 308 via the communication unit 317. In FIG. 6B, a blank column indicates that no value is stored yet.

Furthermore, each of the constituent units of the transmitting mobile phone 319 is described.

The device connection unit 320 is a communication circuit which communicates with the transmitting terminal 301 to exchange email addresses or pairing values for use in pairing and which is implemented as a communication interface such as USB or NFC. For example, the device connection unit 320 communicates with the transmitting terminal 301 using the near field communication. In this embodiment, the device connection unit 320 corresponds to the first transmitting unit which transmits communication device information to the first communication device.

A communication unit 321 is a communication circuit which is implemented as a communication interface that transmits information by way of SMS, MMS, or the like. For example, the communication unit 321 transmits data to the receiving mobile phone 323 using a communication address of the receiving mobile phone 323 which is held in the address management unit 322. In this embodiment, the communication unit 321 corresponds to the fourth transmitting unit which transmits the pairing identifier to the fourth communication device.

The address management unit 322 holds and manages a communication address of a user of the transmitting mobile phone 319 and a communication address of an information recipient which are used to transmit information from the user by way of SMS, MMS, or the like. In this embodiment, this communication address corresponds to the communication device information. This means that the address management unit 322 corresponds to the management unit which holds the communication device information that is information on the fourth communication device. The address management unit 322 is a storage device or a memory circuit, such as HDD or a flash memory. In the following, the communication address is referred to also simply as an address or as address data.

Lastly, each of the constituent units of the receiving mobile phone 323 is described.

The address management unit 324 holds and manages an address of a user of the receiving mobile phone 323 and an address of an information recipient which are used to transmit information from the user by way of SMS, MMS, or the like. This means that the address management unit 324 previously holds the communication device information that is information on the receiving mobile phone 323. The address management unit 324 is a storage device or a memory circuit such as HDD or a flash memory.

The communication unit 325 is a communication circuit which is implemented as a communication interface that transmits information by way of SMS, MMS, or the like.

The device connection unit 326 is a communication circuit which communicates with the receiving terminal 308 to exchange email addresses or pairing values for use in pairing and which is implemented as a communication interface such as USB or NFC. In this embodiment, the device connection unit 326 corresponds to the fifth transmitting unit.

Next, various operations in the communication control system 300 configured as above are specifically described.

Figure 7:
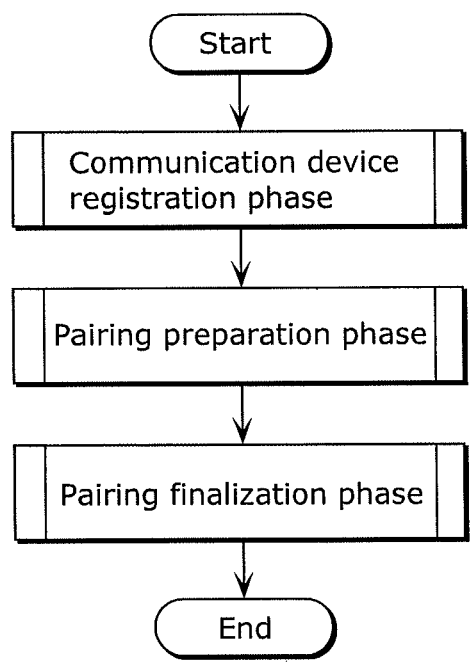
FIG. 7 is a flowchart for explaining an outline of processing of the communication control system in Embodiment 1.

FIG. 7 is a flowchart for explaining an outline of processing of the communication control system 300 in Embodiment 1. The processing of the communication control system 300 includes three phases: a communication device registration phase; a pairing preparation phase; and a pairing finalization phase.

The communication device registration phase is processing which is performed first. At this communication device registration phase, a set of a mobile phone and a terminal which are used for pairing is registered in the pairing server.

The pairing preparation phase is processing which is performed following the communication device registration phase. At this pairing preparation phase, a sender transmits information necessary for pairing to a recipient by using a communication means such as SMS or MMS.

The pairing finalization phase is processing which is performed following the pairing preparation phase. At this pairing finalization phase, pairing is finalized using the information necessary for pairing which the recipient received from the sender.

The following describes the pairing preparation phase, the pairing finalization phase, and the communication device registration phase in this order with reference to the drawings.

Figure 8B:
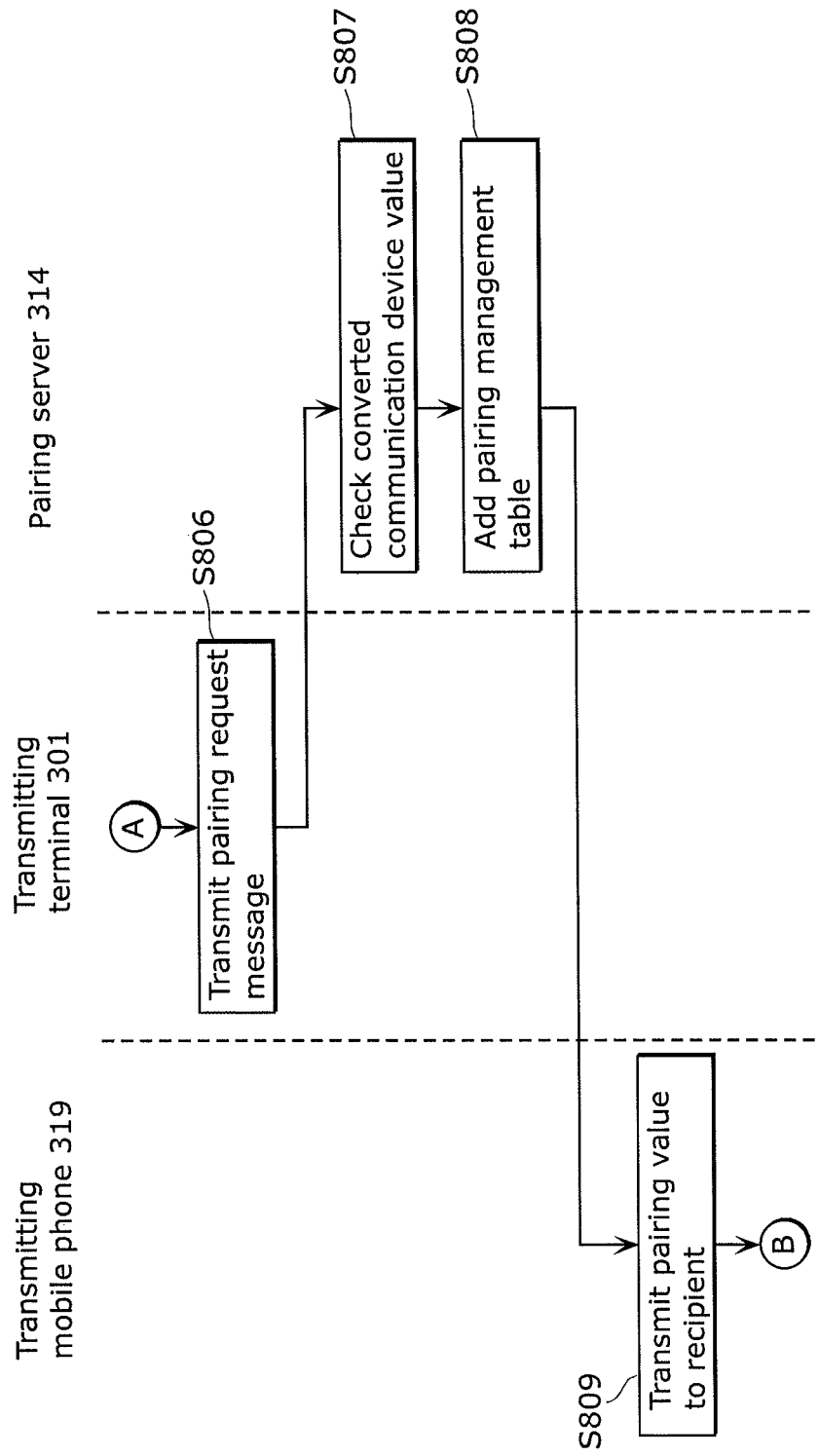
FIG. 8B is a flowchart showing a flow of processing at the pairing preparation phase in Embodiment 1.

FIGS. 8A and 8B are a flowchart showing a flow of processing at the pairing preparation phase. With reference to FIGS. 8A and 8B, various processing at the pairing phase is described.

(Step S801)

According to an instruction of a sender, the transmitting mobile phone 319 transmits a pairing start message to the transmitting terminal 301. Here, a specific example of the pairing start message is described.

Figure 9:
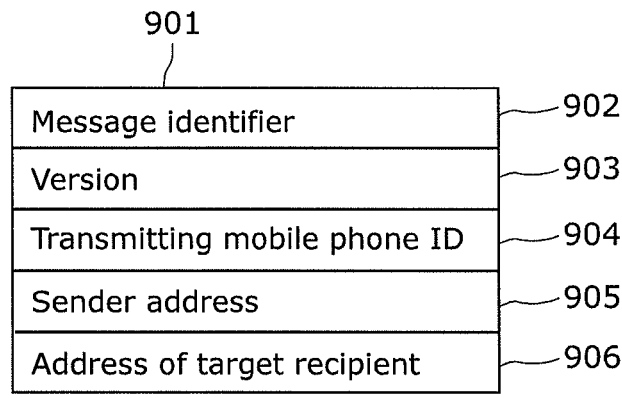
FIG. 9 shows an example of message data included in a pairing start message in Embodiment 1.

FIG. 9 shows an example of message data included in the pairing start message. A pairing start message 901 includes, as the message data, a message identifier 902, a version 903, transmitting mobile phone ID 904, a sender address 905, and an address of target recipient 906.

The message identifier 902 is message data for identifying the message which is exchanged between the transmitting mobile phone 319 and the transmitting terminal 301.

The version 903 is message data for identifying a version number of the pairing start message. When the message data included in the message have any change such as addition or deletion due to system expansion, the version number is increased. Each of the mobile phone and the terminal compares a value of the version number included in the message with the version number which the device itself supports, to thereby determine whether to be able to handle the message.

The transmitting mobile phone ID 904 is message data indicating the terminal ID of the transmitting mobile phone 319 which transmits the pairing start message. The terminal ID of the mobile phone is a unique identifier assigned by a mobile-phone operator.

The sender address 905 is address data which the sender uses in SMS, MMS, or the like, and is stored in the address management unit 322 of the transmitting mobile phone 319.

The address of target recipient 906 is address data of SMS, MMS, or the like which indicate a recipient with whom the sender wishes to share photos, etc., and is stored in the address management unit 322 of the transmitting mobile phone 319.

Figure 10:
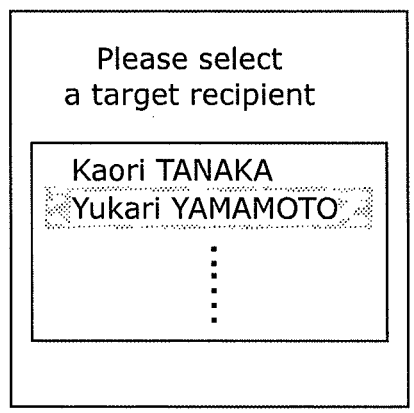
FIG. 10 shows an example of an address data display in Embodiment 1.

The sender selects a menu "sharing setting (send)" on the menu screen of the transmitting mobile phone 319. Upon selection of the menu "sharing setting (send)", the transmitting mobile phone 319 displays, on the screen, the address data stored in the address management unit 322. FIG. 10 shows a display example of the address data. The sender selects the target recipient with whom the sender wishes to share photos, etc., from among the addresses displayed on the screen.

Upon selection of the target recipient, the transmitting mobile phone 319 generates the pairing start message 901. The transmitting mobile phone 319 sets, for example, "1001" indicating the pairing start message, "0100" indicating a default version, unique ID "FFEEDDCCBBAA . . . " assigned by an operator, an MMS address of the sender "suzuki@xxx.ne.jp", and an MMS address of the target recipient "yamamoto@xxx.ne.jp", for the message identifier 902, the version 903, the transmitting mobile phone ID 904, the sender address 905, and the address of target recipient 906, respectively. Afterward, the transmitting mobile phone 319 transmits the generated pairing start message 901 to the transmitting terminal 301.

The transmission of the pairing start message 901 to the transmitting terminal 301 is performed through the device connection unit 320 of the transmitting mobile phone 319 and the device connection unit 304 of the transmitting terminal 301.

(Step S802)

The pairing value generation unit 303 of the transmitting terminal 301 generates a pairing value. The pairing value is a random number value which is sufficiently large, and is set as "123456789ABCDEF0" in this embodiment. The pairing value may be generated after the pairing start message 901 is received and may alternatively have been generated in advance.

The phase management unit 306 stores the generated pairing value in association with a phase number. For the phase number, "1" indicating the pairing preparation phase is stored.
(Step S803)

The phase management unit 306 of the transmitting terminal 301 transmits a pairing start response message to the transmitting mobile phone 319. Here, a specific example of the pairing start response message is described.

Figure 11:
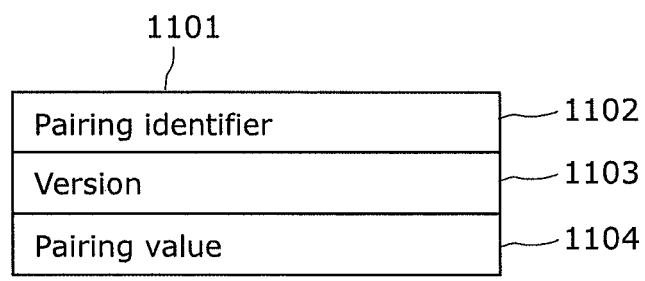
FIG. 11 shows an example of message data included in a pairing start response message in Embodiment 1.

FIG. 11 shows an example of message data included in the pairing start response message. A pairing start response message 1101 includes, as the message data, a message identifier 1102, a version 1103, and a pairing value 1104.

The message identifier 1102 is message data for identifying the message which is exchanged between the transmitting mobile phone 319 and the transmitting terminal 301. The version 1103 is message data for identifying a version number of the pairing start response message. The pairing value 1104 is message data indicating the pairing value generated in Step S802.

The phase management unit 316 generates such pairing start response message 1101. In generating the pairing start response message 1101, the phase management unit 316 sets, for example, "1002" indicating the pairing start response message, "0100" indicating a default version, and the pairing value "123456789ABCDEF0" generated in Step S802, for the message identifier 1102, the version 1103, and the pairing value 1104, respectively.

The transmission of the pairing start response message 1101 to the transmitting mobile phone 319 is performed through the device connection unit 304 of the transmitting terminal 301 and the device connection unit 320 of the transmitting mobile phone 319.
(Step S804)

The data conversion unit 302 of the transmitting terminal 301 generates a converted address value (converted data) based on the address of target recipient included in the pairing start message 901 received from the transmitting mobile phone 319. In this embodiment, the converted address value is an output value which results from input of the address of target recipient to an SHA-256 operational circuit in the data conversion unit 302.
(Step S805)

The data conversion unit 302 of the transmitting terminal 301 generates a converted communication device value based on the terminal ID of the transmitting terminal 301 which is held in the terminal ID holding unit 307, and the transmitting mobile phone ID received from the transmitting mobile phone 319. In this embodiment, the converted communication device value is an output value which results from input of a combined value generated by combining the terminal ID of the transmitting terminal 301 and the transmitting mobile phone ID, to the SHA-256 operational circuit in the data conversion unit 302.
(Step S806)

The phase management unit 306 of the transmitting terminal 301 transmits a pairing request message to the pairing server 314. This pairing request message corresponds to the first request. Here, a specific example of the pairing request message is described.

Figure 12:
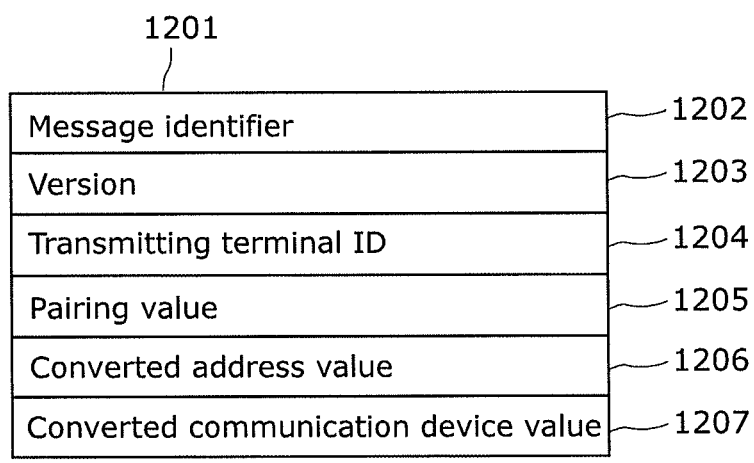
FIG. 12 shows an example of message data included in a pairing request message in Embodiment 1.

FIG. 12 shows an example of message data included in the pairing request message. A pairing request message 1201 includes, as the message data, a message identifier 1202, a version 1203, transmitting terminal ID 1204, a pairing value 1205, a converted address value 1206, and a converted communication device value 1207.

The message identifier 1202 is message data for identifying the message which is exchanged between the transmitting terminal 301 and the pairing server 314. The version 1203 is message data for identifying a version number of the pairing request message. The transmitting terminal ID 1204 is message data indicating the terminal ID of the transmitting terminal 301 that is a terminal which transmits the pairing request message. The pairing value 1205 is message data indicating the pairing value generated in Step S802. The converted address value 1206 is message data indicating the converted address value generated in Step S804. The converted communication device value 1207 is message data indicating the converted communication device value generated in Step S805.

The phase management unit 306 generates such pairing request message 1201. In generating the pairing request message 1201, the phase management unit 306 sets, for example, "0001" indicating the pairing request message, "0100" indicating a default version, the terminal ID to be held in the terminal ID holding unit 307, the pairing value generated in Step S802, the converted address value generated in Step S804, and the converted communication device value generated in Step S805, for the message identifier 1202, the version 1203, the transmitting terminal ID 1204, the pairing value 1205, the converted address value 1206, and the converted communication device value 1207, respectively. Afterward, the phase management unit 306 transmits the generated pairing request message 1201 to the pairing server 314 via the communication unit 305.
(Step S807)

The first determination unit 316c of the pairing server 314 determines whether or not a set of the transmitting terminal ID and the converted communication device value which are included in the received pairing request message 1201 has been stored in the communication device management table 318a. When the set of the transmitting terminal ID and the converted communication device value has been stored, the processing in Step S808 is performed next. When the set of the transmitting terminal ID and the converted communication device value has not been stored, the pairing server 314 transmits an error message to the transmitting terminal 301, thereby ending the processing.
(Step S808)

When receiving the pairing request message 1201 from the transmitting terminal 301 via the communication unit 317, the second storing unit 316b of the pairing server 314 stores, into the pairing management table 315a, the phase number, the transmitting terminal ID included in the received pairing request message 1201, the pairing value, and the converted address value in association with one another. The second storing unit 316b stores, for the phase number, "1" indicating the pairing preparation phase.

FIG. 13 shows an example of the pairing management table 315a at the end of Step S808. In FIG. 13, the column for the receiving terminal ID is blank as no value has been set yet.
(Step S809)

After receiving the pairing start response message 1101 from the transmitting terminal 301 in Step S803, the transmitting mobile phone 319 displays a send screen for an MMS message which is directed to the target recipient designated in Step S801 by the sender on the menu "sharing setting (send)", and accepts a message input from the sender. FIG. 14 shows a screen example which appears after the message input.

After completion of the message input from the sender, the transmitting mobile phone 319 transmits an MMS message to the target recipient designated in Step S801 by the sender. At this time, the pairing value included in the pairing start response message received from the transmitting terminal 301 in Step S803 is attached to the MMS message to be transmitted.

The description on processing at the pairing preparation phase ends here.

Subsequently, processing at the pairing finalization phase is described with reference to FIGS. 15A and 15B.

Figure 15B:
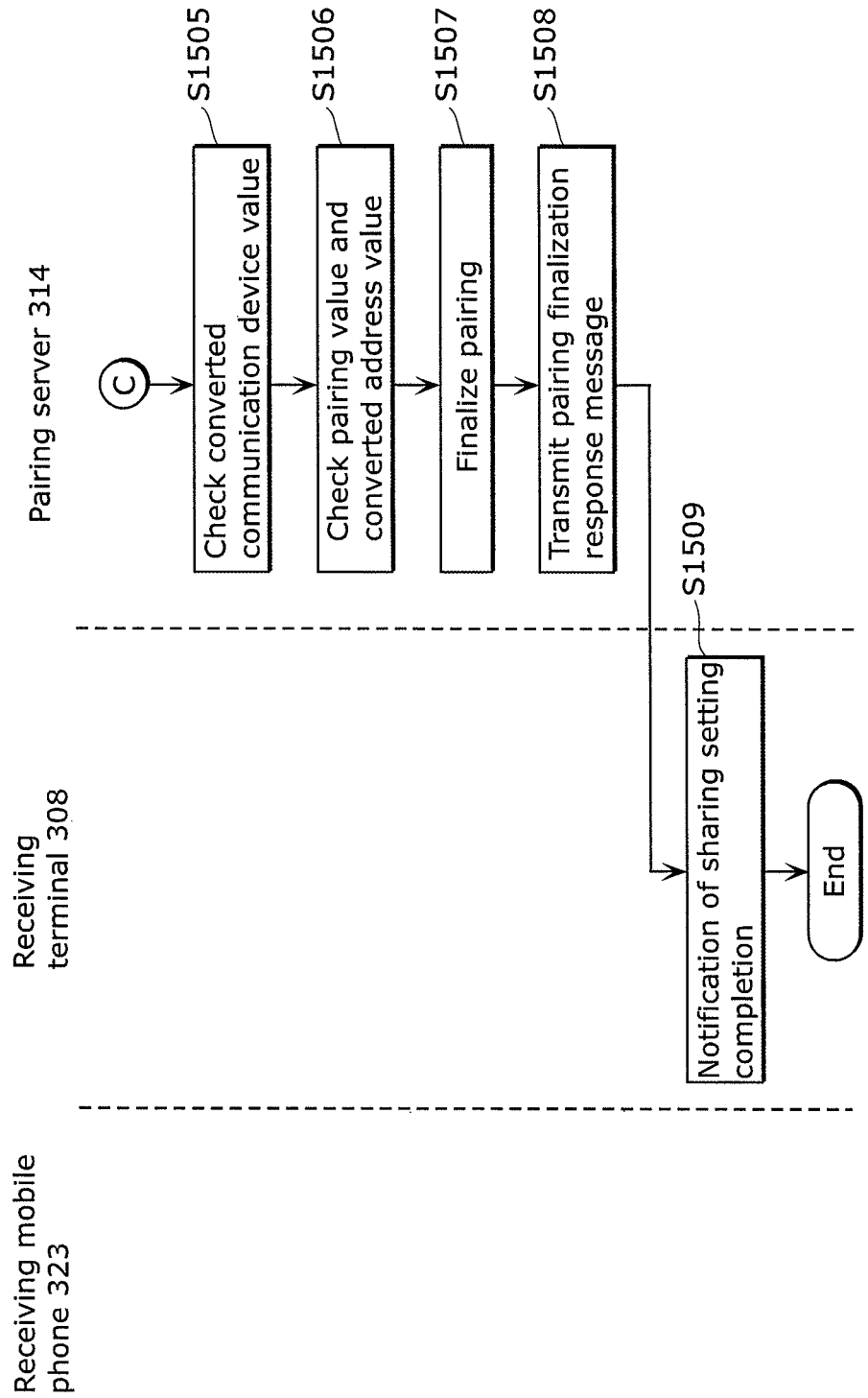
FIG. 15B is a flowchart showing a flow of processing at a pairing finalization phase in Embodiment 1.

FIGS. 15A and 15B are a flowchart showing a flow of processing at the pairing finalization phase.

(Step S1501)

The recipient receives the MMS message from the sender. Afterward, the receiving mobile phone 323 transmits a pairing finalization start message to the receiving terminal 308 according to an instruction of the recipient. Here, a specific example of the pairing finalization start message is described.

Figure 16:
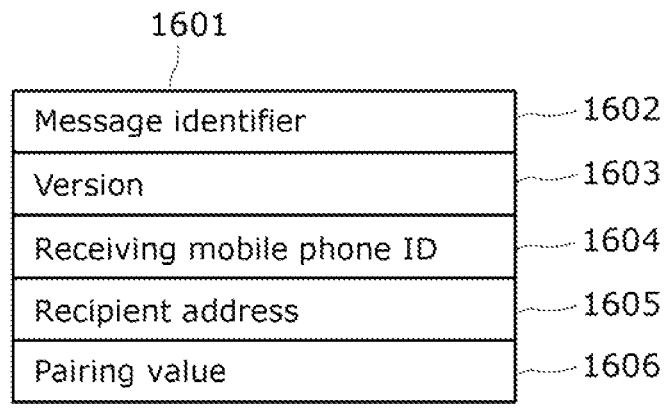
FIG. 16 shows an example of message data included in a pairing finalization start message in Embodiment 1.

FIG. 16 shows an example of message data included in the pairing finalization start message. A pairing finalization start message 1601 includes, as the message data, a message identifier 1602, a version 1603, receiving mobile phone ID 1604, a recipient address 1605, and a pairing value 1606.

The message identifier 1602 is message data for identifying the message which is exchanged between the receiving mobile phone 323 and the receiving terminal 308.

The version 1603 is message data for identifying a version number of the pairing finalization start message.

The receiving mobile phone ID 1604 is message data indicating the terminal ID of the receiving mobile phone 323 which transmits the pairing finalization start message. The terminal ID of the mobile phone is a unique identifier assigned by a mobile-phone operator.

The recipient address 1605 is address data which the recipient uses in SMS, MMS, or the like, and is stored in the address management unit 324 of the receiving mobile phone 323.

The pairing value 1606 is message data indicating the pairing value received from the transmitting mobile phone 319.

The receiving mobile phone 323 generates the pairing finalization start message 1601 according to an instruction of the recipient. The receiving mobile phone 323 sets, for example, "1003" indicating the pairing finalization start message, "0100" indicating a default version, unique ID "EED-DCCBBAA99 . . . " assigned by an operator, an MMS address of the recipient "yamamoto@xxx.ne.jp", and the pairing value attached to the MMS message received from the sender, for the message identifier 1602, the version 1603, the receiving mobile phone ID 1604, the recipient address 1605, and the pairing value 1606, respectively. Afterward, the receiving mobile phone 323 transmits the generated pairing finalization start message 1601 to the receiving terminal 308.

The transmission of the pairing finalization start message 1601 to the receiving terminal 308 is performed through the device connection unit 326 of the receiving mobile phone 323 and the device connection unit 312 of the receiving terminal 308.

(Step S1502)

The data conversion unit 311 of the receiving terminal 308 generates a converted address value (converted data) based on the recipient address included in the pairing finalization start message 1601 received from the receiving mobile phone 323. In this embodiment, the converted address value is an output value which results from input of the recipient address to an SHA-256 operational circuit in the data conversion unit 311.

(Step S1503)

The data conversion unit 311 of the receiving terminal 308 generates a converted communication device value based on the terminal ID of the receiving terminal 308 which is held in the terminal ID holding unit 313, and the receiving mobile phone ID received from the receiving mobile phone 323. In this embodiment, the converted communication device value is an output value which results from input of a combined value generated by combining the terminal ID of the receiving terminal 308 and the receiving mobile phone ID, to the SHA-256 operational circuit in the data conversion unit 311.

(Step S1504)

The phase management unit 310 of the receiving terminal 308 stores, in association with the phase number, the pairing value included in a received pairing finalization start message 1401. As the phase number, "1" indicating the pairing preparation phase is stored, for example. Afterward, the phase management unit 310 transmits a pairing finalization request message to the pairing server 314. This pairing finalization request message corresponds to the second request. Here, a specific example of the pairing finalization request message is described.

Figure 17:
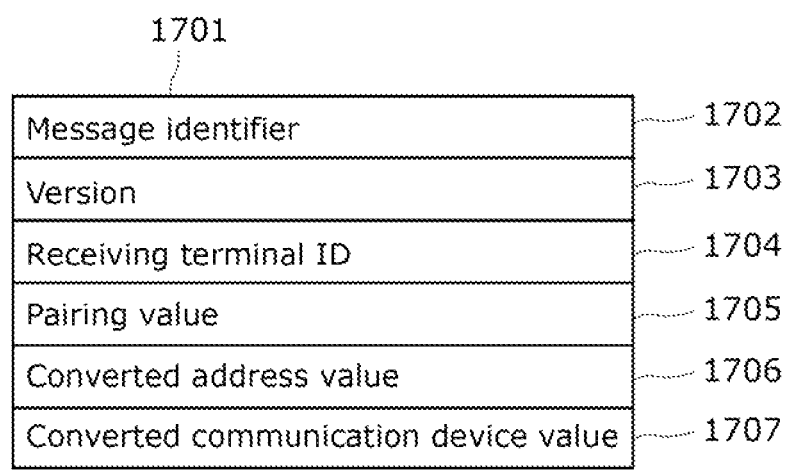
FIG. 17 shows an example of message data included in a pairing finalization request message in Embodiment 1.

FIG. 17 shows an example of message data included in the pairing finalization request message. A pairing finalization request message 1701 includes, as the message data, a message identifier 1702, a version 1703, receiving terminal ID 1704, a pairing value 1705, a converted address value 1706, and a converted communication device value 1707.

The message identifier 1702 is message data for identifying the message which is exchanged between the receiving terminal 308 and the pairing server 314. The version 1703 is message data for identifying a version number of the pairing finalization request message. The receiving terminal ID 1704 is message data indicating the terminal ID of the receiving terminal 308 that is a terminal which transmits the pairing finalization request message. The pairing value 1705 is message data indicating the pairing value received from the receiving mobile phone 323. The converted address value 1706 is message data indicating the converted address value generated in Step S1502. The converted communication device value 1707 is message data indicating the converted communication device value generated in Step S1503.

The phase management unit 310 generates such pairing finalization request message 1701. In generating the pairing finalization request message 1701, the phase management unit 310 sets, for example, "0003" indicating the pairing finalization request message, "0100" indicating a default version, the terminal ID to be held in the terminal ID holding unit 313, the pairing value received from the receiving mobile phone 323, the converted address value generated in Step S1502, and the converted communication device value generated in Step S1503, for the message identifier 1702, the version 1703, the receiving terminal ID 1704, the pairing value 1705, the converted address value 1706, and the converted communication device value 1707, respectively. Afterward, the phase management unit 310 transmits the generated pairing finalization request message 1701 to the pairing server 314 via the communication unit 309.

(Step S1505)

The first determination unit 316c of the pairing server 314 determines whether or not a set of the receiving terminal ID and the converted communication device value which are included in the received pairing finalization request message 1701 has been stored in the communication device management table 318a. When the set of the receiving terminal ID and the converted communication device value has been stored, the processing in Step S1507 is performed next. When the set of the receiving terminal ID and the converted communication device value has not been stored, the pairing server 314 transmits an error message to the receiving terminal 308, thereby ending the processing.
(Step S1506)

When receiving the pairing finalization request message 1701 from the receiving terminal 308 via the communication unit 317, the second determination unit 316d of the pairing server 314 determines whether or not a set of the pairing value and the converted address value which are included in the received pairing finalization request message 1701 has been stored in the pairing management table 315a. Specifically, the second determination unit 316d determines whether or not the pairing value included in the pairing request message 1201 and the pairing value included in the pairing finalization request message 1701 match, and whether or not the communication address included in the pairing request message 1201 and the communication address included in the pairing finalization request message 1701 match.

Here, when the set of the pairing value and the converted address value has been stored, the processing in Step S1507 is performed next. When the set of the pairing value and the converted address value has not been stored, the pairing server 314 transmits an error message to the receiving terminal 308, thereby ending the processing.
(Step S1507)

The second storing unit 316b of the pairing server 314 stores, into the pairing management table 315a, the receiving terminal ID included in the received pairing finalization request message 1701, in association with the set of the pairing value and the converted address value on which the determination in Step S1506 has been performed. The second storing unit 316b further stores, for the phase number, "2" indicating the pairing finalization phase.

FIG. 18 shows an example of the pairing management table 315a at the end of Step S1507. FIG. 18 represents that the transmitting terminal 301 having the transmitting terminal ID "445566CCDD" and the receiving terminal 308 having the receiving terminal ID "778899EEFF" have been paired.
(Step S1508)

The pairing unit 316e of the pairing server 314 transmits the pairing finalization response message to the receiving terminal 308 using the communication unit 317. Here, a specific example of the pairing finalization response message is described.

Figures 19, 20:
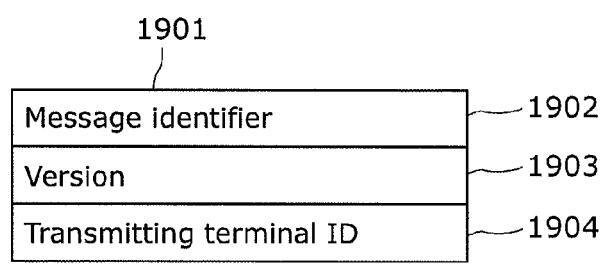
FIG. 19 shows an example of message data included in a pairing finalization response message in Embodiment 1.
FIG. 20 shows an example of the data stored in the phase management unit of the receiving terminal in Embodiment 1.

FIG. 19 shows an example of message data included in the pairing finalization response message. A pairing finalization response message 1901 includes, as the message data, a message identifier 1902, a version 1903, and transmitting terminal ID 1904.

The message identifier 1902 is message data for identifying the message which is exchanged between the pairing server 314 and the receiving terminal 308. The version 1903 is message data for identifying a version number of the pairing finalization response message. The transmitting terminal ID 1904 is message data indicating the terminal ID of the transmitting terminal 301 paired with the receiving terminal 308.

The pairing unit 316e generates such pairing finalization response message 1901. In generating the pairing finalization response message 1901, the pairing unit 316e sets "0004" indicating the pairing finalization response message, "0100" indicating a default version, and the terminal ID (that is "67890ABCDE" in the example of FIG. 18) of the transmitting terminal 301 paired with the receiving terminal 308, for the message identifier 1902, the version 1903, and the transmitting terminal ID 1904, respectively. Afterward, the communication unit 317 transmits the generated pairing finalization response message 1901 to the receiving terminal 308.
(Step S1509)

When receiving the pairing finalization response message 1901 via the communication unit 309, the phase management unit 310 of the receiving terminal 308 holds the transmitting terminal ID included in the received pairing finalization response message 1901. FIG. 20 shows an example of data stored in the phase management unit 310. Afterward, the phase management unit 310 displays on the screen that the sharing setup has been completed.

The description on processing at the pairing finalization phase ends here.

Subsequently, processing at the communication device registration phase is described with reference to FIG. 21. The communication device registration phase is performed before the pairing preparation phase and the pairing finalization phase. The pairing preparation phase is performed by each of (i) the transmitting mobile phone 319 and the transmitting terminal 301 and (ii) the receiving mobile phone 323 and the receiving terminal 308, at both of which the flow of processing is the same. Thus, in this embodiment, the case of the receiving mobile phone 323 and the receiving terminal 308 is described as a representative example.

Figure 21:
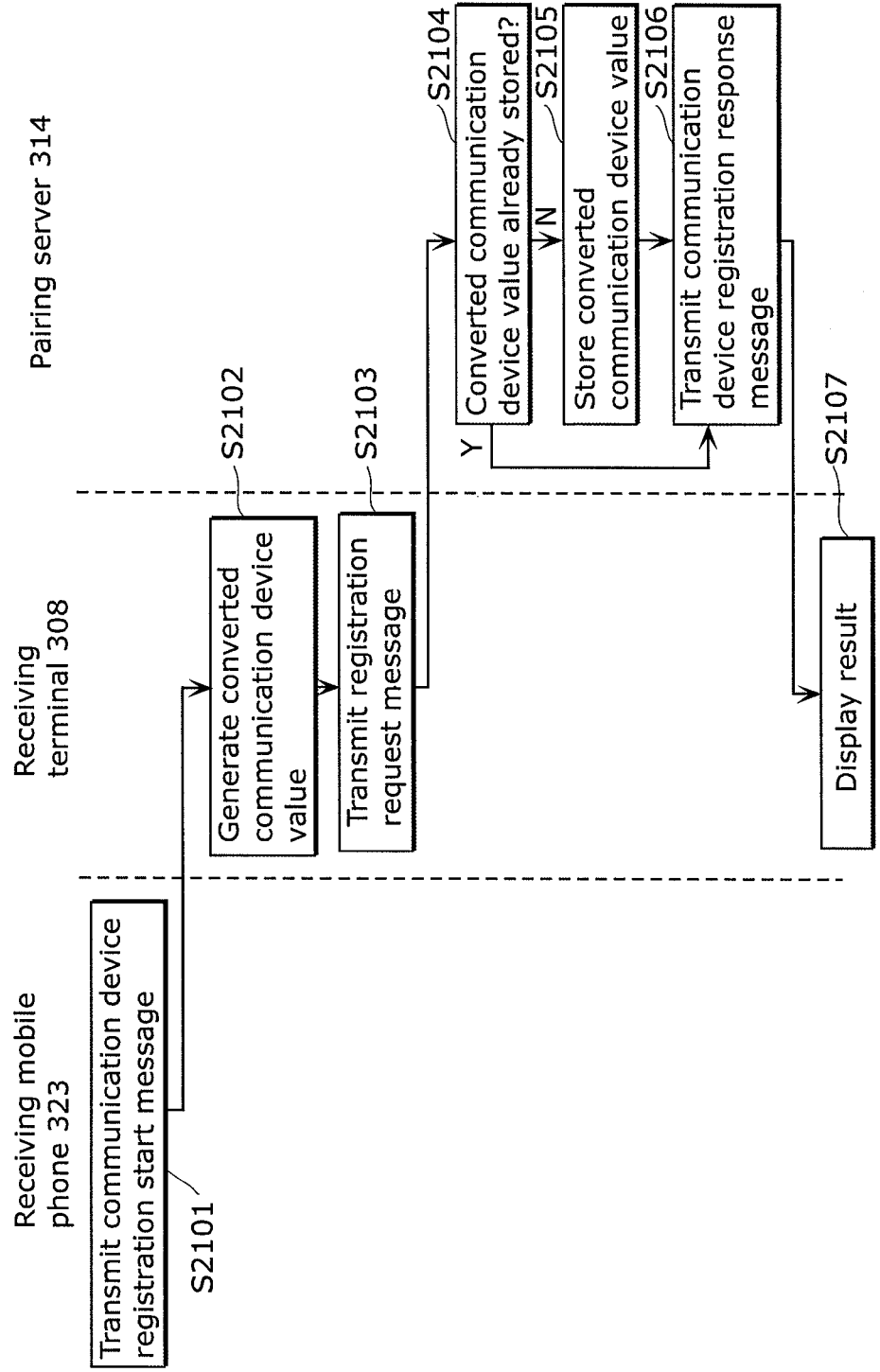
FIG. 21 is a flowchart showing a flow of processing at a communication device registration phase in Embodiment 1.

FIG. 21 is a flowchart showing a flow of processing at the communication device registration phase.
(Step S2101)

The receiving mobile phone 323 transmits a communication device registration start message to the receiving terminal 308 according to an instruction of the recipient. Here, a specific example of the communication device registration start message is described.

FIG. 22 shows an example of message data included in the communication device registration start message. A communication device registration start message 2201 includes, as the message data, a message identifier 2202, a version 2203, and receiving mobile phone ID 2204.

The message identifier 2202 is message data for identifying the message which is exchanged between the receiving mobile phone 323 and the receiving terminal 308.

The version 2203 is message data for identifying a version number of the communication device registration start message.

The receiving mobile phone ID 2204 is message data indicating the terminal ID of the receiving mobile phone 323 which transmits the communication device registration start message. The terminal ID of the mobile phone is a unique identifier assigned by a mobile-phone operator.

The receiving mobile phone 323 generates the communication device registration start message 2201. The receiving mobile phone 323 sets, for example, "F001" indicating the pairing finalization start message, "0100" indicating a default version, and unique ID "EEDDCCBBAA99 . . . " assigned by an operator, for the message identifier 2202, the version 2203, and the receiving mobile phone ID 2204, respectively. Afterward, the receiving mobile phone 323 transmits the generated communication device registration start message 2201 to the receiving terminal 308.

The transmission of the communication device registration start message 2201 to the receiving terminal 308 is performed through the device connection unit 326 of the receiving mobile phone 323 and the device connection unit 312 of the receiving terminal 308.
(Step S2102)

The data conversion unit 311 of the receiving terminal 308 generates a converted communication device value based on the terminal ID of the receiving terminal 308 which is held in the terminal ID holding unit 313, and the receiving mobile phone ID received from the receiving mobile phone 323. The converted communication device value is an output value which results from input of a combined value generated by combining the terminal ID of the receiving terminal 308 and the receiving mobile phone ID, to the SHA-256 operational circuit in the data conversion unit 311.

(Step S2103)

The phase management unit 310 of the receiving terminal 308 transmits a communication device registration request message to the pairing server 314. Here, a specific example of the communication device registration request message is described.

FIG. 23 shows an example of message data included in the communication device registration request message. A communication device registration request message 2301 includes, as the message data, a message identifier 2302, a version 2303, terminal ID 2304, and a converted communication device value 2305.

The message identifier 2302 is message data for identifying the message which is exchanged between the receiving terminal 308 and the pairing server 314. The version 2303 is message data for identifying a version number of the communication device registration request message. The terminal ID 2304 is message data indicating the terminal ID of the terminal which transmits the communication device registration request message. The converted communication device value 2305 is message data indicating the converted communication device value generated in Step S2102.

The phase management unit 310 generates such communication device registration request message 2301. In generating the communication device registration request message 2301, the phase management unit 310 sets, for example, "E001" indicating the communication device registration request message, "0100" indicating a default version, the terminal ID to be held in the terminal ID holding unit 313, and the converted communication device value generated in Step S2102, for the message identifier 2302, the version 2303, the terminal ID 2304, and the converted communication device value 2305, respectively. Afterward, the phase management unit 310 transmits the generated communication device registration request message 2301 to the pairing server 314 via the communication unit 309.

(Step S2104)

The first determination unit 316c of the pairing server 314 determines whether or not a set of the terminal ID and the converted communication device value which are included in the received communication device request message 2301 has been stored in the communication device management table 318a. When the set of the terminal ID and the converted communication device value has not been stored, the processing in Step S2105 is performed next. When the set of the terminal ID and the converted communication device value has been stored, the processing in Step S2106 is performed next.

(Step S2105)

The first storing unit 316a of the pairing server 314 stores, into the communication device management table 318a, a set of the terminal ID and the converted communication device value which are included in the received communication device registration request message 2301.

FIG. 24 shows an example of the communication device management table 318a at the end of Step S2105.

(Step S2106)

The pairing unit 316e of the pairing server 314 transmits a communication device registration response message to the receiving terminal 308 using the communication unit 317. Here, a specific example of the communication device registration response message is described.

Figure 25:
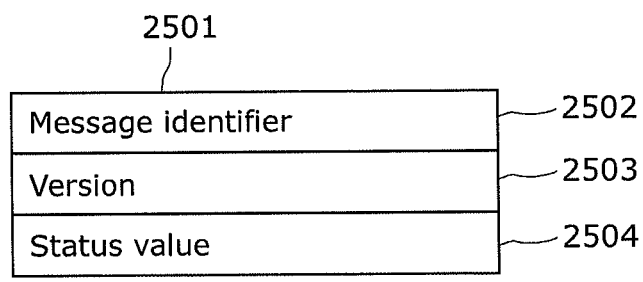
FIG. 25 shows an example of message data included in a communication device registration response message in Embodiment 1.

FIG. 25 shows an example of message data included in the communication device registration response message. A communication device registration response message 2501 includes, as the message data, a message identifier 2502, a version 2503, and a status value 2504.

The message identifier 2502 is message data for identifying the message which is exchanged between the pairing server 314 and the receiving terminal 308. The version 2503 is message data for identifying a version number of the communication device registration response message. The status value 2504 is message data indicating a communication device registration status.

The pairing unit 316e generates such communication device registration response message 2501. In generating the communication device registration response message 2501, the pairing unit 316e sets, for example, "E002" indicating the communication device registration response message, "0100" indicating a default version, and "1" indicating that the communication device has already been registered when the terminal ID and the converted communication device value have already been stored in the communication device management table 318a, or otherwise "2" indicating that the registration of the communication device has been completed, for the message identifier 2502, the version 2503, and the status value 2504, respectively. Afterward, the communication unit 317 transmits the generated communication device registration response message 2501 to the receiving terminal 308.

(Step S2107)

Figure 26:
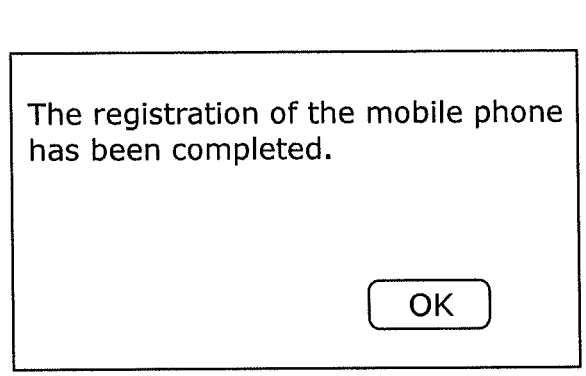
FIG. 26 is a block diagram showing an example of a registration completion display in Embodiment 1.

When receiving the communication device registration response message via the communication unit 309, the phase management unit 310 of the receiving terminal 308 determines the status value included in the received communication device registration response message, and displays a result of the determination on the screen. FIG. 26 shows an example of a display which appears upon a registration completion.

Through the above processing, the transmitting terminal 301 and the receiving terminal 308 are paired. In this embodiment, the receiving terminal 308 is capable of obtaining the terminal ID of the transmitting terminal 301 (the transmitting terminal ID). Thus, afterward, using the transmitting terminal ID, the receiving terminal 308 is allowed to share, with the transmitting terminal 301, content such as photos and video held by the transmitting terminal 301.

It is to be noted that the transmitting terminal 301 and the receiving terminal 308 may share content in any way as long as they use the result of pairing. For example, the pairing server 314 may control the communication between the transmitting terminal 301 and the receiving terminal 308 by referring to the pairing management table 315a so as to transfer, to the receiving terminal 308, content such as photos received from the transmitting terminal 301. Furthermore, the pairing server 314 may control the communication between the transmitting terminal 301 and the receiving terminal 308 by referring to the pairing management table 315a so that content such as photos uploaded by the transmitting terminal 301 is downloadable by the receiving terminal 308.

As above, in the communication control system 300 according to this embodiment, the transmitting terminal 301 and the receiving terminal 308 are paired when the set of the pairing value and the converted address value which have been transmitted from the transmitting terminal 301 to the pairing server 314 matches, in the pairing server 314, the set of the pairing value and the converted address value which have been transmitted from the receiving terminal 308 to the pairing server 314. Since a sufficiently large random number is used as the pairing value, it will not happen that the transmitting terminal is paired with another receiving terminal which performs different pairing processing. In other words, the data transmitted from the transmitting terminal will not be received by a receiving terminal which is not supposed to receive the data.

Furthermore, in the communication control system 300 according to this embodiment, the pairing server 314 determines whether or not there is matching of not only the pairing identifiers, but also the converted address values, and therefore, it will not happen that when a malicious recipient who receives the shared ID from the sender transfers the shared ID to another person, and the other person inputs the transferred shared ID into the receiving terminal, the photo associated with the shared ID can be received. It is to be noted that the converted address values are generated in the transmitting terminal 301 and the receiving terminal 308, but may be generated in the transmitting mobile phone 319 and the receiving mobile phone 323. Furthermore, although the converted address value generated by converting the address of target recipient is transmitted to the pairing server 314 in this embodiment from the perspective of privacy protection, the address of target recipient may be transmitted to the pairing server 314 without such conversion in the case where it can be assured that there is no privacy problem. In this case, the pairing server 314 determines whether or not, instead of the converted address values, the addresses of target recipient match.

Furthermore, in the communication control system 300 according to this embodiment, since the pairing server 314 uses the communication device management table to manage the sets of the terminal and the mobile phone, it will not happen that when a malicious recipient inputs shared ID into a receiving terminal of another person, the photo associated with that shared ID can be received.

Furthermore, in the communication control system 300 according to this embodiment, the pairing value is generated by the transmitting terminal 301. Thus, the transmitting terminal 301 can obtain the pairing value immediately when receiving the pairing start message from the transmitting mobile phone 319. This allows the transmitting mobile phone 319 to receive the pairing value in one-time communication (in one approaching operation) when the transmitting terminal 301 and the transmitting mobile phone 319 communicate with each other using NFC, with the result that the convenience of the sender can improve.

Furthermore, since the pairing value is transmitted from the transmitting terminal 301 to the receiving terminal 308 by way of the mobile phones, the possibility that the receiving terminal 308 receives an incorrect pairing value can be reduced as compared to, for example, the case where the sender tells the recipient the pairing value.

Furthermore, in the communication control system 300 according to this embodiment, the communication address is used as the communication device information that is information on the receiving mobile phone 323. Thus, it is possible to reduce the occurrence of overlapping of the communication device information on the receiving mobile phone 323 with the communication device information on another communication device.

Although the pairing unit 316e transmits the pairing finalization response message to the receiving terminal 308 in Step S1508 in this embodiment, the pairing finalization response message may be transmitted to the transmitting terminal 301 or may alternatively be transmitted to both the receiving terminal 308 and the transmitting terminal 301. By doing so, one or both of the transmitting terminal 301 and the receiving terminal 308 can be notified of the result of pairing.

Embodiment 2

Next, Embodiment 2 is described.

A communication control system in this embodiment is different from the communication control system in Embodiment 1 in the device which generates the pairing value. Specifically, although the transmitting terminal 301 generates the pairing value in Embodiment 1, the pairing server 314 generates the pairing value in this embodiment.

Figure 27A:
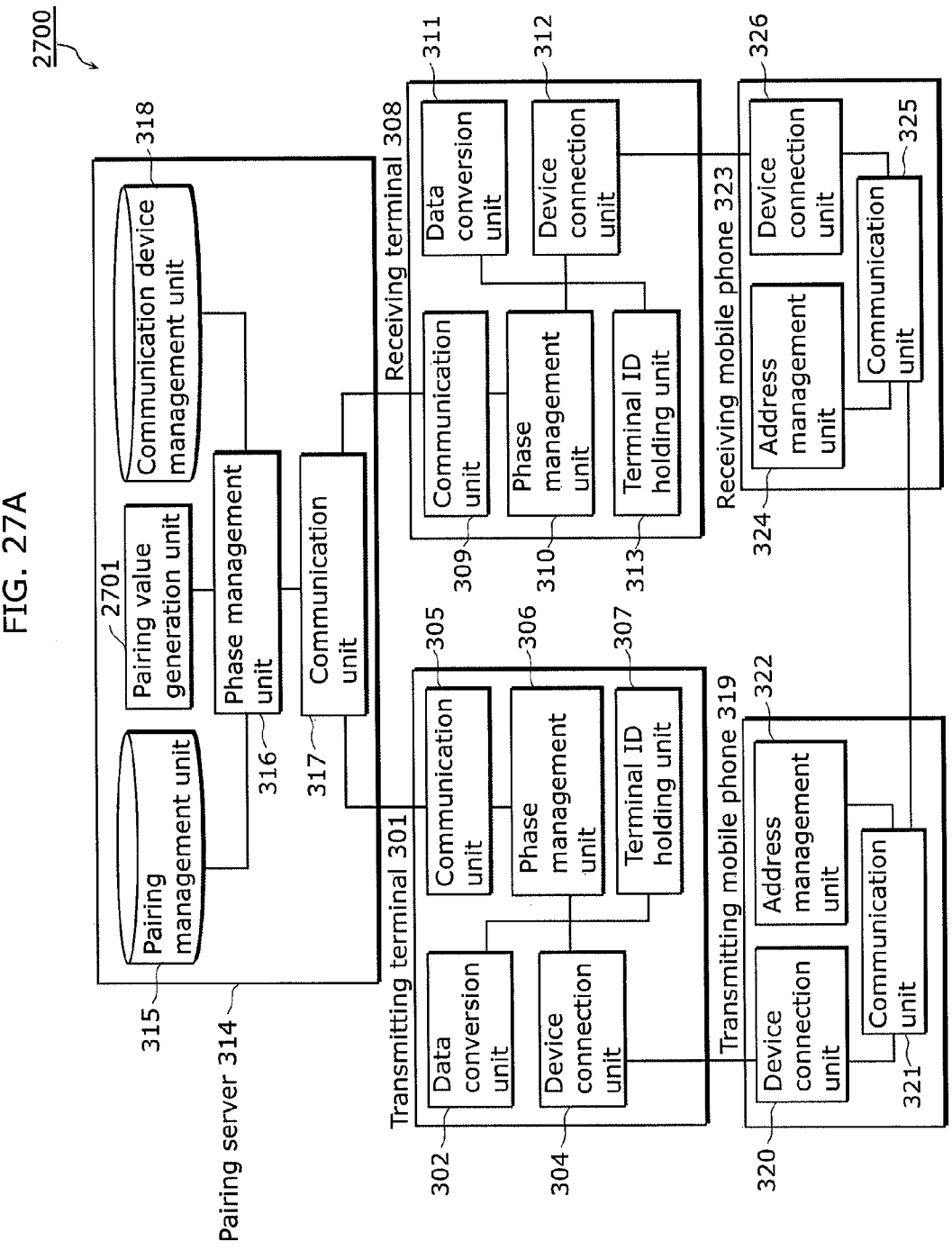
FIG. 27A is a block diagram showing a configuration of a communication control system in Embodiment 2.
Figure 27B:
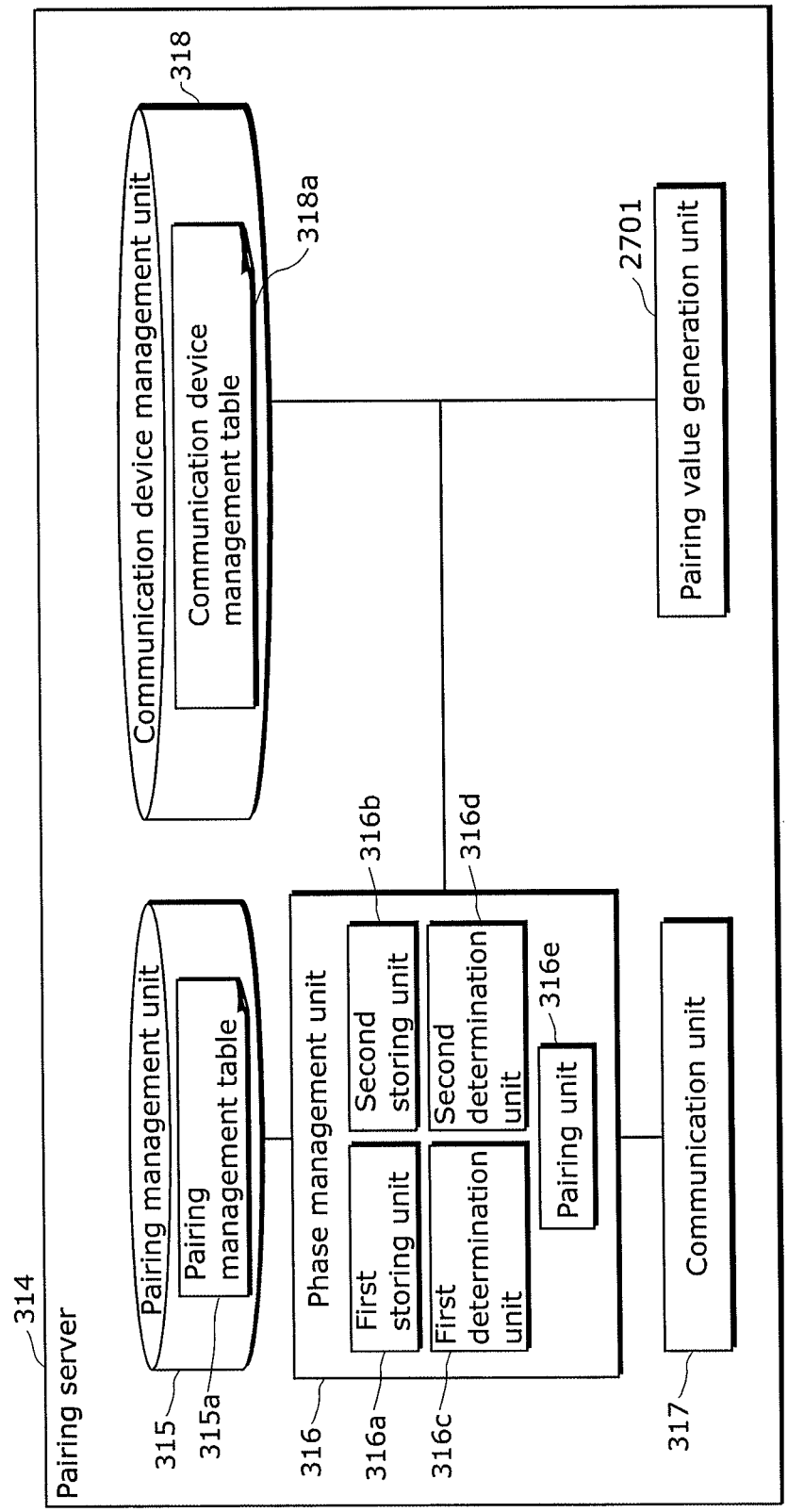
FIG. 27B is a block diagram showing a detailed configuration of a pairing server in Embodiment 2.

FIG. 27A is a block diagram showing a configuration of a communication control system 2700 in Embodiment 2. FIG. 27B is a block diagram showing a detailed configuration of the pairing server 314 in Embodiment 2. In FIGS. 27A and 27B, constituents the same as those shown in FIGS. 3A and 3B in Embodiment 1 are denoted by the same numerals and are not described. The block diagrams shown in FIGS. 27A and 27B are different from the block diagrams shown in Embodiment 1 in that the pairing value generation unit is included in the pairing server 314.

A pairing value generation unit 2701 is an operational circuit which generates a pairing value that is used for pairing. In this embodiment, the pairing value generation unit 2701 corresponds to the pairing identifier generation unit.

In this embodiment, the address management unit 322 corresponds to the management unit. The device connection unit 320 corresponds to the first transmitting unit. The communication unit 305 corresponds to the second transmitting unit. The communication unit 317 corresponds to the third transmitting unit. The device connection unit 304 corresponds to the fourth transmitting unit. The communication unit 321 corresponds to the fifth transmitting unit. The device connection unit 326 corresponds to the sixth transmitting unit. The communication unit 309 corresponds to the seventh transmitting unit. The second determination unit 316d corresponds to the determination unit.

Next, various operations in the communication control system 2700 configured as above are specifically described.

Figure 28:
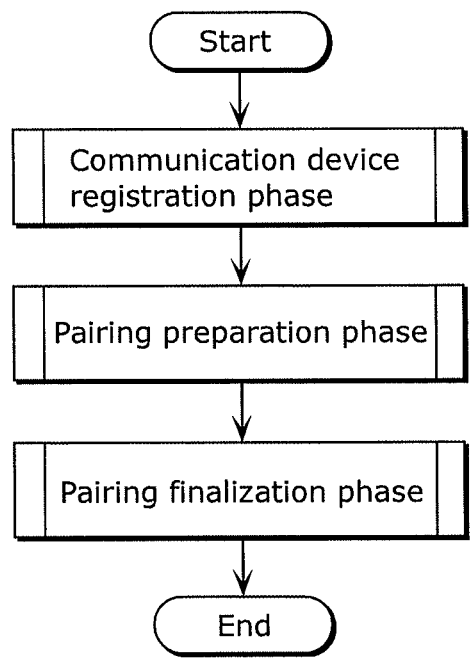
FIG. 28 is a flowchart for explaining an outline of processing of the communication control system in Embodiment 2.

FIG. 28 is a flowchart for explaining an outline of processing of the communication control system 2700 in Embodiment 2. The processing of the communication control system 2700 includes three phases: a communication device registration phase; a pairing preparation phase; and a pairing finalization phase. As the communication device registration phase, processing the same as that described in Embodiment 1 is performed. Therefore, the description is not repeated.

The pairing preparation phase is processing which is performed following the communication device registration phase. At this pairing preparation phase, a sender transmits information necessary for pairing to a recipient by using a communication means such as SMS or MMS. Although the pairing value is generated in the transmitting terminal 301 in Embodiment 1, the pairing value is generated in the pairing server 314 in this embodiment. With this, it is possible to produce the effects described in Embodiment 1 and reduce the processing load on the transmitting terminal 301.

As the pairing finalization phase, processing the same as that described in Embodiment 1 is performed. Therefore, the description is not repeated.

The following describes the pairing preparation phase with reference to the drawings.

Figure 29B:
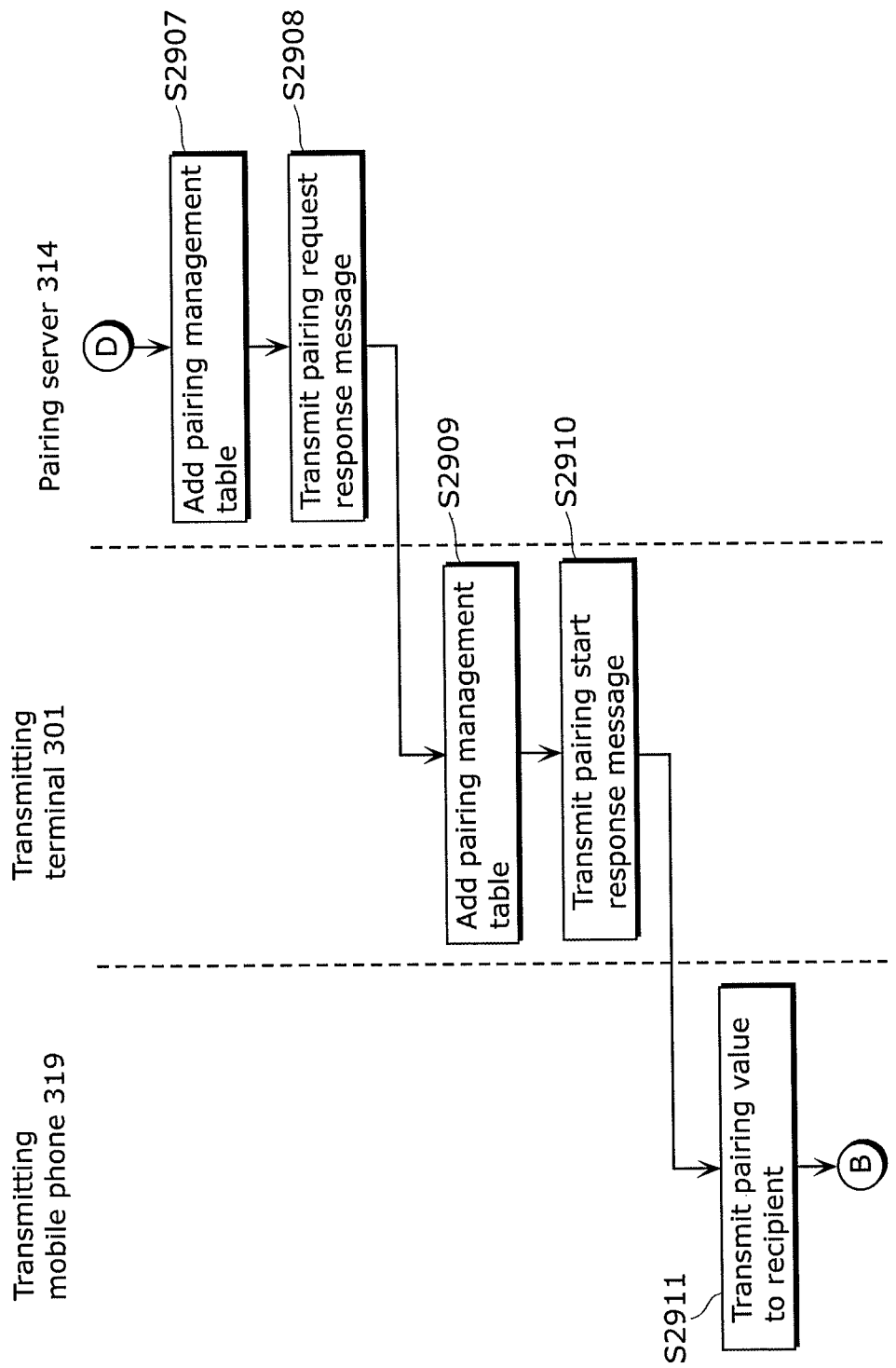
FIG. 29B is a flowchart showing a flow of processing at the pairing preparation phase in Embodiment 2.

FIGS. 29A and 29B are a flowchart showing a flow of processing at the pairing preparation phase.

(Step S2901)

Processing the same as in Step S801 in Embodiment 1 is performed.

(Steps S2902 and S2903)

Processing the same as in Steps S804 and S805 in Embodiment 1 is performed.

(Step S2904)

The phase management unit 306 of the transmitting terminal 301 transmits a pairing request message to the pairing server 314. Here, a specific example of the pairing request message is described.

Figure 30:
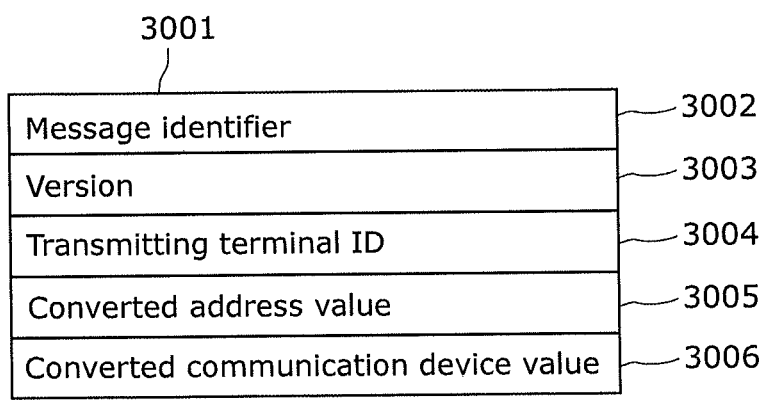
FIG. 30 shows an example of message data included in a pairing request message in Embodiment 2.

FIG. 30 shows an example of message data included in the pairing request message. A pairing request message 3001 includes, as the message data, a message identifier 3002, a version 3003, transmitting terminal ID 3004, a converted address value 3005, and a converted communication device value 3006.

The message identifier 3002 is message data for identifying the message which is exchanged between the transmitting terminal 301 and the pairing server 314. The version 3003 is message data for identifying a version number of the pairing request message. The transmitting terminal ID 3004 is message data indicating the terminal ID of the transmitting terminal 301 that is a terminal which transmits the pairing request message. The converted address value 3005 is message data indicating the converted address value generated in Step S2902. The converted communication device value 3006 is message data indicating the converted communication device value generated in Step S2903.

The phase management unit 306 generates such pairing request message 3001. In generating the pairing request message 3001, the phase management unit 306 sets, for example, "0001" indicating the pairing request message, "0100" indicating a default version, the terminal ID to be held in the terminal ID holding unit 307, the converted address value generated in Step S2902, and the converted communication device value generated in Step S2903, for the message identifier 3002, the version 3003, the transmitting terminal ID 3004, the converted address value 3005, and the converted communication device value 3006, respectively. Afterward, the phase management unit 306 transmits the generated pairing request message 3001 to the pairing server 314 via the communication unit 305.

(Step S2905)

The first determination unit 316c of the pairing server 314 determines whether or not a set of the transmitting terminal ID and the converted communication device value which are included in the received pairing request message 3001 has been stored in the communication device management table 318a. When the set has been stored, the processing proceeds to Step S2906, and when the set has not been stored, an error message is transmitted to the transmitting terminal, which ends the processing.

(Step S2906)

The pairing value generation unit 2701 of the pairing server 314 generates a pairing value. The pairing value is a random number value which is sufficiently large, and is set as "123456789ABCDEF0" in this embodiment. The pairing value may be generated after the pairing request message 3001 is received and may alternatively have been generated in advance.

(Step S2907)

The second storing unit 316b of the pairing server 314 stores, into the pairing management table 315a, the phase number, the pairing value generated in Step S2906, the transmitting terminal ID included in the received pairing request message 3001, and the converted address value in association with one another. The second storing unit 316b stores, for the phase number, "1" indicating the pairing preparation phase.

FIG. 31 shows an example of the pairing management table 315a at the end of Step S2907. In FIG. 31, the column for the receiving terminal ID is blank as no value has been set yet.

(Step S2908)

The pairing unit 316e of the pairing server 314 transmits a pairing request response message to the transmitting terminal 301 using the communication unit 317. Here, a specific example of the pairing request response message is described.

Figure 32:
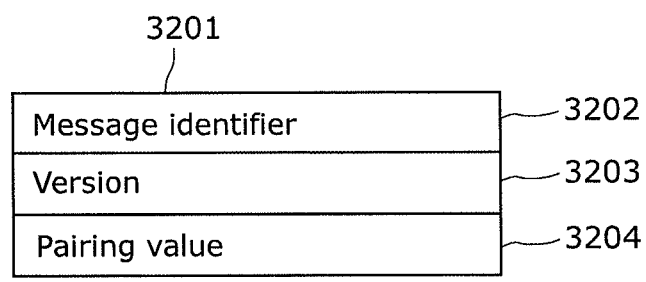
FIG. 32 shows an example of message data included in a pairing request response message in Embodiment 2.

FIG. 32 shows an example of message data included in the pairing request response message. A pairing request response message 3201 includes, as the message data, a message identifier 3202, a version 3203, and a pairing value 3204.

The message identifier 3202 is message data for identifying the message which is exchanged between the pairing server 314 and the transmitting terminal 301. The version 3203 is message data for identifying a version number of the pairing request response message. The pairing value 3204 is message data indicating the pairing value generated in the pairing server 314.

The pairing unit 316e generates such pairing request response message 3201. In generating the pairing request response message 3201, the pairing unit 316e sets, for example, "0002" indicating the pairing finalization response message, "0100" indicating a default version, and the pairing value generated in Step S2906, for the message identifier 3202, the version 3203, and the pairing value 3204, respectively. Afterward, the communication unit 317 transmits the generated pairing request response message 3201 to the transmitting terminal 301.

(Step S2909)

When receiving the pairing request response message 3201 via the communication unit 305, the phase management unit 306 of the transmitting terminal 301 stores, in association with the phase number, the pairing value included in the received pairing request response message. The phase management unit 306 stores, for the phase number, "1" indicating the pairing preparation phase.

(Step S2910)

A step the same as Step S803 in Embodiment 1 is performed. However, for the pairing value 1104 that is message data in the pairing start response message, the pairing value included in the pairing request response message received in Step S2909 is set.

(Step S2911)

After receiving the pairing start response message 1101 from the transmitting terminal 301 in Step S2910, the transmitting mobile phone 319 performs processing the same as Step S809 described in Embodiment 1.

The description on processing at the pairing preparation phase and the description on Embodiment 2 end here.

Through the above processing, the transmitting terminal 301 and the receiving terminal 308 are paired. In this embodiment, the receiving terminal 308 is capable of obtaining the terminal ID of the transmitting terminal 301 (the transmitting terminal ID). Thus, afterward, using the transmitting terminal ID, the receiving terminal 308 is allowed to share, with the transmitting terminal 301, content such as photos and video held by the transmitting terminal 301.

It is to be noted that the transmitting terminal 301 and the receiving terminal 308 may share content in any way as long as they use the result of pairing. For example, the pairing server 314 may control the communication between the transmitting terminal 301 and the receiving terminal 308 by referring to the pairing management table 315a so as to transfer, to the receiving terminal 308, content such as photos received from the transmitting terminal 301. Furthermore, the pairing server 314 may control the communication between the transmitting terminal 301 and the receiving terminal 308 by referring to the pairing management table 315a so that content such as photos uploaded by the transmitting terminal 301 is downloadable by the receiving terminal 308.

As above, in the communication control system 2700 according to this embodiment, the transmitting terminal 301 and the receiving terminal 308 are paired when the set of the converted address value transmitted from the transmitting terminal 301 to the pairing server 314 and the pairing value generated in the pairing server 314 matches, in the pairing server 314, the set of the pairing value and the converted address value which have been transmitted from the receiving terminal 308 to the pairing server 314. Since a sufficiently large random number is used as the pairing value, it will not happen that the transmitting terminal is paired with another receiving terminal which performs different pairing processing. In other words, the data transmitted from the transmitting terminal will not be received by a receiving terminal which is not supposed to receive the data.

Furthermore, in the communication control system 2700 according to this embodiment, the pairing server 314 determines whether or not there is matching of not only the pairing identifiers, but also the converted address values, and therefore, it will not happen that when a malicious recipient who receives the shared ID from the sender transfers the shared ID to another person, and the other person inputs the transferred shared ID into the receiving terminal, the photo associated with the shared ID can be received. It is to be noted that the converted address values are generated in the transmitting terminal 301 and the receiving terminal 308, but may be generated in the transmitting mobile phone 319 and the receiving mobile phone 323. Furthermore, although the converted address value generated by converting the address of target recipient is transmitted to the pairing server 314 in this embodiment from the perspective of privacy protection, the address of target recipient may be transmitted to the pairing server 314 without such conversion in the case where it can be assured that there is no privacy problem. In this case, the pairing server 314 determines whether or not, instead of the converted address values, the addresses of target recipient match.

Furthermore, in the communication control system 2700 according to this embodiment, since the pairing server 314 uses the communication device management table to manage the sets of the terminal and the mobile phone, it will not happen that when a malicious recipient inputs shared ID into a receiving terminal of another person, the photo associated with that shared ID can be received.

Embodiment 3

Next, Embodiment 3 is described.

A communication control system in this embodiment is different from the communication control system in Embodiment 1 in the device which generates the pairing value. Specifically, although the transmitting terminal 301 generates the pairing value in Embodiment 1, the transmitting mobile phone 319 generates the pairing value in this embodiment.

Figure 33A:
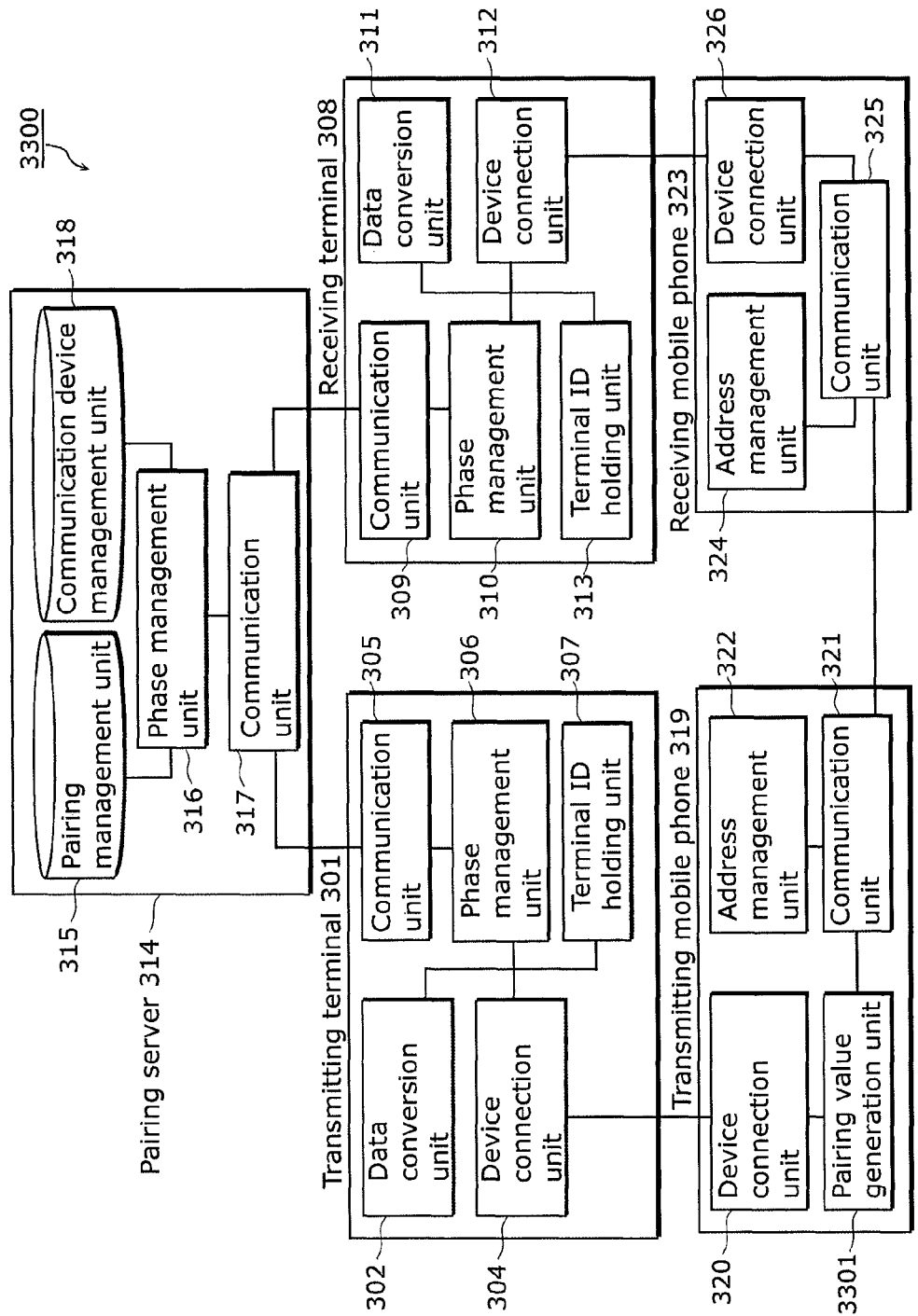
FIG. 33A is a block diagram showing a configuration of a communication control system in Embodiment 3.
Figure 33B:
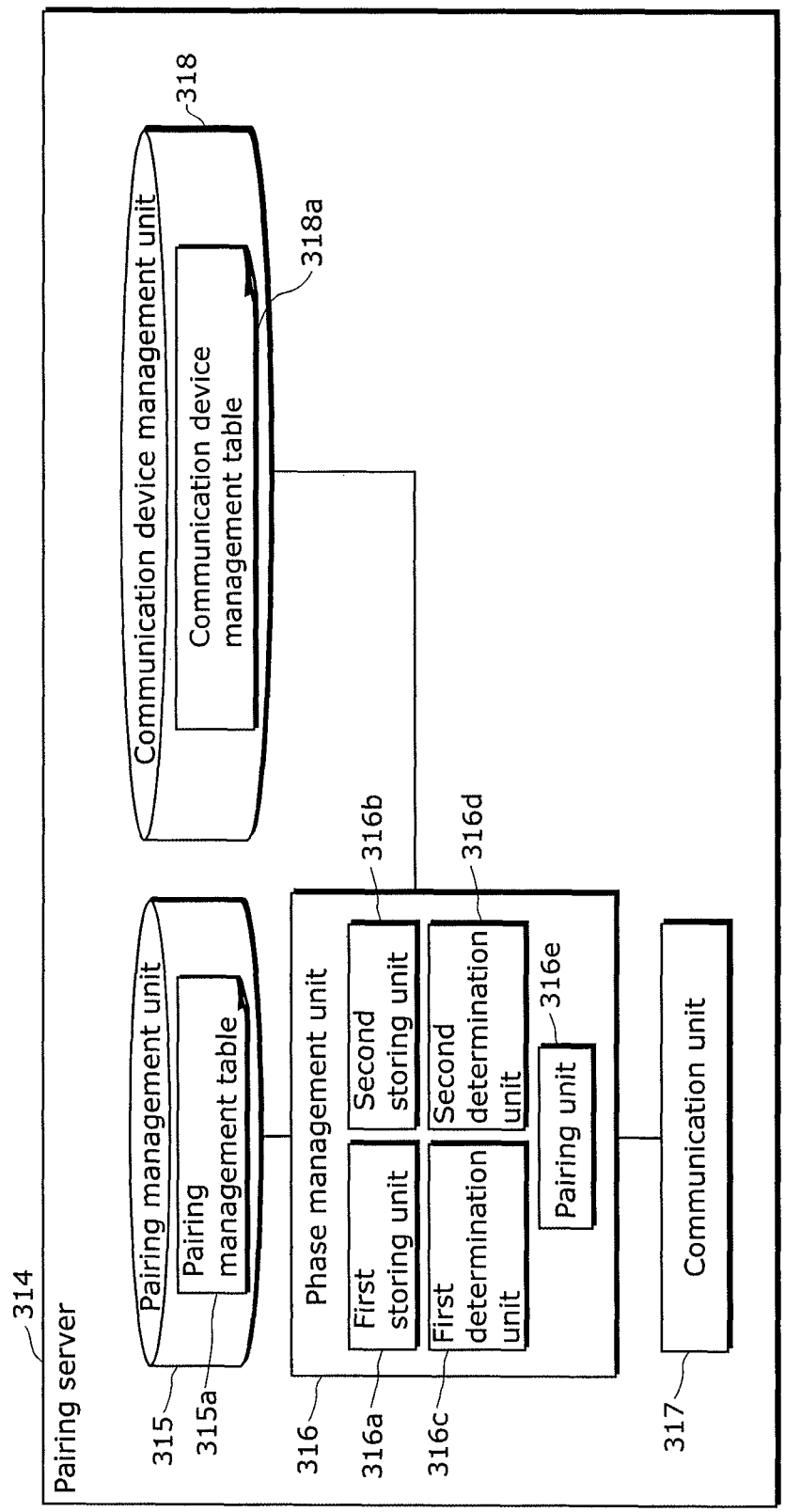
FIG. 33B is a block diagram showing a detailed configuration of a pairing server in Embodiment 3.

FIG. 33A is a block diagram showing a configuration of a communication control system 3300 in Embodiment 3. FIG. 33B is a block diagram showing a detailed configuration of the pairing server 314 in Embodiment 3. In FIGS. 33A and 33B, constituents the same as those shown in FIGS. 3A and 3B in Embodiment 1 are denoted by the same numerals and are not described. The block diagrams shown in FIGS. 33A and 33B are different from the block diagrams shown in Embodiment 1 in that the pairing value generation unit is included in the transmitting mobile phone 319.

A pairing value generation unit 3301 is an operational circuit which generates a pairing value that is used for pairing. In this embodiment, the pairing value generation unit 3301 corresponds to the pairing identifier generation unit.

In this embodiment, the address management unit 322 corresponds to the management unit. The device connection unit 320 corresponds to the first transmitting unit. The communication unit 305 corresponds to the second transmitting unit. The device connection unit 304 corresponds to the third transmitting unit. The communication unit 321 corresponds to the fourth transmitting unit. The device connection unit 326 corresponds to the fifth transmitting unit. The communication unit 309 corresponds to the sixth transmitting unit. The second determination unit 316d corresponds to the determination unit.

Next, various operations in the communication control system 3300 configured as above are specifically described.

Figure 34:
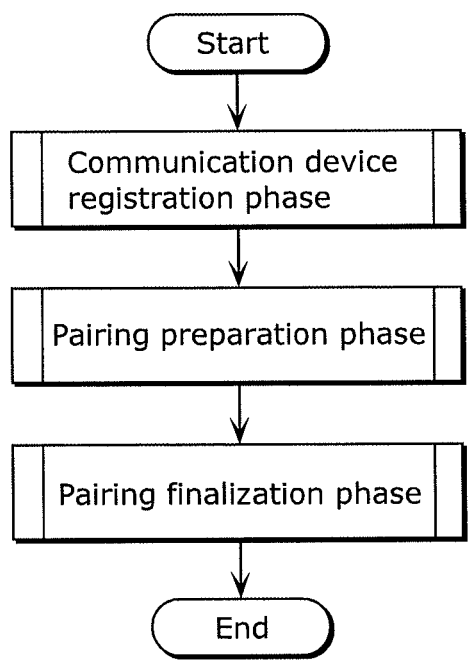
FIG. 34 is a flowchart for explaining an outline of processing of the communication control system in Embodiment 3.

FIG. 34 is a flowchart for explaining an outline of processing of the communication control system 3300 in Embodiment 3. The processing of the communication control system 3300 includes three phases: a communication device registration phase; a pairing preparation phase; and a pairing finalization phase. As the communication device registration phase, processing the same as that described in Embodiment 1 is performed. Therefore, the description is not repeated.

The pairing preparation phase is processing which is performed following the communication device registration phase. At this pairing preparation phase, a sender transmits information necessary for pairing to a recipient by using a communication means such as SMS or MMS. Although the pairing value is generated in the transmitting terminal 301 in Embodiment 1, the pairing value is generated in the transmitting mobile phone 319 in this embodiment. With this, it is possible to produce the effects described in Embodiment 1 and reduce the processing load on the transmitting terminal 301.

As the pairing finalization phase, processing the same as that described in Embodiment 1 is performed. Therefore, the description is not repeated.

The following describes the pairing preparation phase with reference to the drawings.

Figure 35A:
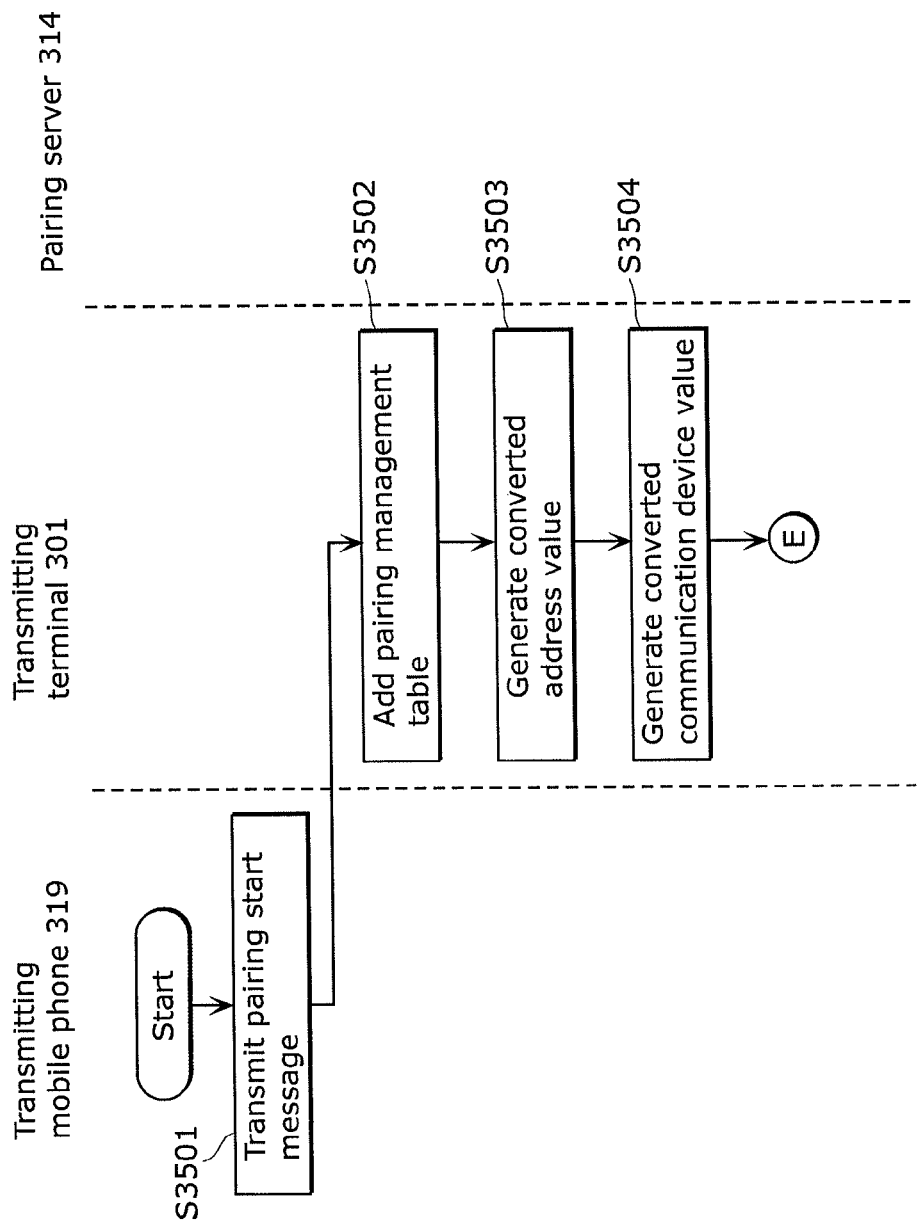
FIG. 35A is a flowchart showing a flow of processing at a pairing preparation phase in Embodiment 3.
Figure 35B:
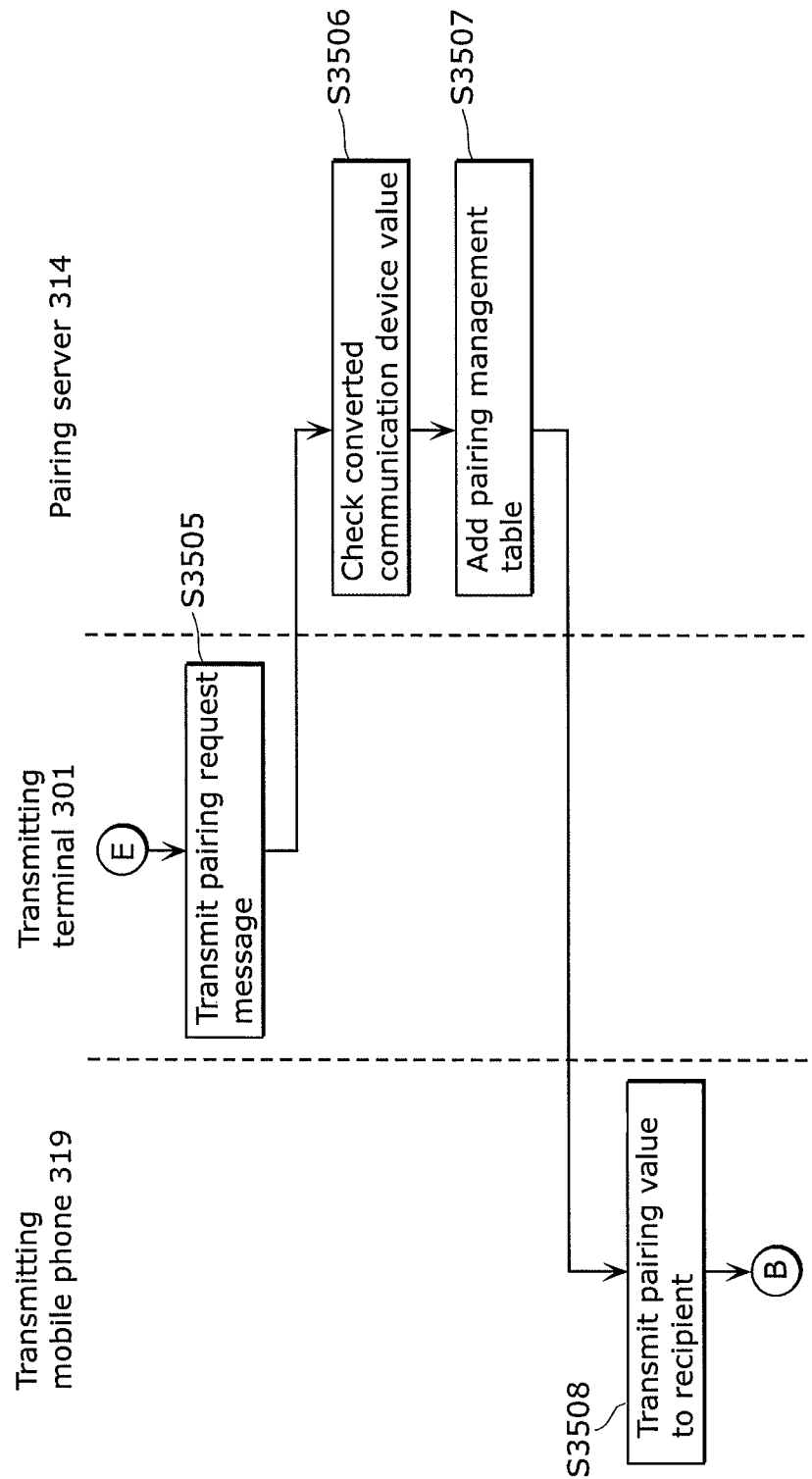
FIG. 35B is a flowchart showing a flow of processing at the pairing preparation phase in Embodiment 3.

FIGS. 35A and 35B are a flowchart showing a flow of processing at the pairing preparation phase.
(Step S3501)

According to an instruction of a sender, the transmitting mobile phone 319 transmits a pairing start message to the transmitting terminal 301. Here, a specific example of the pairing start message is described.

Figure 36:
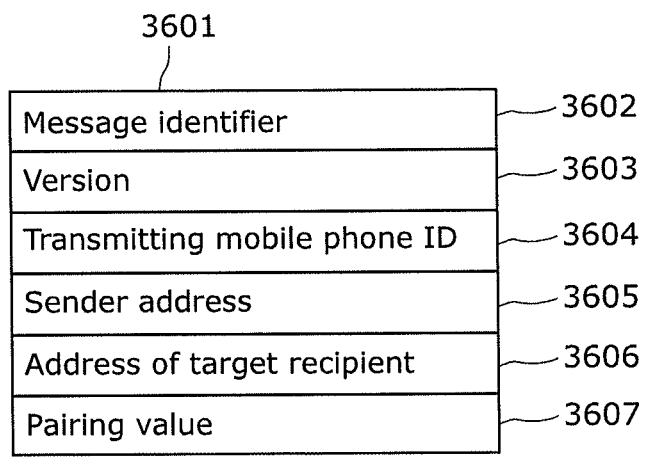
FIG. 36 shows an example of message data included in a pairing start message in Embodiment 3.

FIG. 36 shows an example of message data included in the pairing start message. A pairing start message 3601 includes, as the message data, a message identifier 3602, a version 3603, transmitting mobile phone ID 3604, a sender address 3605, an address of target recipient 3606, and a pairing value 3607.

The message identifier 3602 is message data for identifying the message which is exchanged between the transmitting mobile phone 319 and the transmitting terminal 301.

The version 3603 is message data for identifying a version number of the pairing start message. When the message data included in the message have any change such as addition or deletion due to system expansion, the version number is increased. Each of the mobile phone and the terminal compares a value of the version number included in the message with the version number which the device itself supports, to thereby determine whether or not to be able to handle the message.

The transmitting mobile phone ID 3604 is message data indicating the terminal ID of the transmitting mobile phone 319 which transmits the pairing start message. The terminal ID of the mobile phone is a unique identifier assigned by a mobile-phone operator.

The sender address 3605 is address data which the sender uses in SMS, MMS, or the like, and is stored in the address management unit 322 of the transmitting mobile phone 319.

The address of target recipient 3606 is address data of SMS, MMS, or the like which indicate a recipient with whom the sender wishes to share photos, etc., and is stored in the address management unit 322 of the transmitting mobile phone 319.

The pairing value 3607 is message data indicating the pairing value which is generated in the transmitting mobile phone 319.

The sender selects a menu "sharing setting (send)" on the menu screen of the transmitting mobile phone 319. Upon selection of the menu "sharing setting (send)", the transmitting mobile phone 319 displays, on the screen, the address data stored in the address management unit 322. FIG. 10 shows a display example of the address data. The sender selects the target recipient with whom the sender wishes to share photos, etc., from among the addresses displayed on the screen.

Upon selection of the target recipient, the pairing value generation unit 3301 of the transmitting mobile phone 319 generates a pairing value. The pairing value is a random number value which is sufficiently large, and is set as "123456789ABCDEF0" in this embodiment. The pairing value may be generated after the pairing start message 3601 is received and may alternatively have been generated in advance.

Afterward, the transmitting mobile phone 319 generates the pairing start message 3601. The transmitting mobile phone 319 sets, for example, "1001" indicating the pairing start message, "0100" indicating a default version, unique ID "FFEEDDCCBBAA . . . " assigned by an operator, an MMS address of the sender "suzuki@xxx.ne.jp", an MMS address of the target recipient "yamamoto@xxx.ne.jp", and the pairing value "123456789ABCDEF0" generated in the pairing value generation unit 3301, for the message identifier 3602, the version 3603, the transmitting mobile phone ID 3604, the sender address 3605, the address of target recipient 3606, and the pairing value 3607, respectively. Afterward, the transmitting mobile phone 319 transmits the generated pairing start message 3601 to the transmitting terminal 301.

The transmission of the pairing start message 3601 to the transmitting terminal 301 is performed through the device connection unit 320 of the transmitting mobile phone 319 and the device connection unit 304 of the transmitting terminal 301.

(Step S3502)

The phase management unit 306 of the transmitting terminal 301 stores, in association with the phase number, the pairing value included in the pairing start message 3601 received from the transmitting mobile phone 319. The phase management unit 306 stores, for the phase number, "1" indicating the pairing preparation phase.

(Steps S3503 and S3504)

Processing the same as in Steps S804 and S805 in Embodiment 1 is performed.

(Step S3505)

Processing the same as in Step S806 in Embodiment 1 is performed. However, for the pairing value 1205 that is message data in the pairing request message, the pairing value included in the pairing start message received in Step S3502 is set.

(Steps S3506 and S3507)

Processing the same as in Steps S807 and S808 in Embodiment 1 is performed.

(Step S3508)

After transmitting the pairing start message 3601 to the transmitting terminal 301 in Step S3501, the transmitting mobile phone 319 displays a send screen for an MMS message which is directed to the target recipient designated in Step S3501 by the sender on the menu "sharing setting (send)", and accepts a message input from the sender. FIG. 14 shows a screen example which appears after the message input.

After completion of the message input from the sender, the transmitting mobile phone 319 transmits an MMS message to the target recipient designated in Step S3501 by the sender. At this time, the pairing value generated in Step S3501 is attached to the MMS message to be transmitted.

The description on processing at the pairing preparation phase and the description on Embodiment 3 end here.

Through the above processing, the transmitting terminal 301 and the receiving terminal 308 are paired. In this embodiment, the receiving terminal 308 is capable of obtaining the terminal ID of the transmitting terminal 301 (the transmitting terminal ID). Thus, afterward, using the transmitting terminal ID, the receiving terminal 308 is allowed to share, with the transmitting terminal 301, content such as photos and video held by the transmitting terminal 301.

It is to be noted that the transmitting terminal 301 and the receiving terminal 308 may share content in any way as long as they use the result of pairing. For example, the pairing server 314 may control the communication between the transmitting terminal 301 and the receiving terminal 308 by referring to the pairing management table 315a so as to transfer, to the receiving terminal 308, content such as photos received from the transmitting terminal 301. Furthermore, the pairing server 314 may control the communication between the transmitting terminal 301 and the receiving terminal 308 by referring to the pairing management table 315a so that content such as photos uploaded by the transmitting terminal 301 is downloadable by the receiving terminal 308.

As above, in the communication control system 3300 according to this embodiment, the transmitting terminal 301 and the receiving terminal 308 are paired when the set of the converted address value transmitted from the transmitting terminal 301 to the pairing server 314 and the pairing value generated in the transmitting mobile phone 319 matches, in the pairing server 314, the set of the pairing value and the converted address value which have been transmitted from the receiving terminal 308 to the pairing server 314. Since a sufficiently large random number is used as the pairing value, it will not happen that the transmitting terminal is paired with another receiving terminal which performs different pairing processing. In other words, the data transmitted from the transmitting terminal will not be received by a receiving terminal which is not supposed to receive the data.

Furthermore, in the communication control system 3300 according to this embodiment, the pairing server 314 determines whether or not there is matching of not only the pairing identifiers, but also the converted address values, and therefore, it will not happen that when a malicious recipient who receives the shared ID from the sender transfers the shared ID to another person, and the other person inputs the transferred shared ID into the receiving terminal, the photo associated with the shared ID can be received. It is to be noted that the converted address values are generated in the transmitting terminal 301 and the receiving terminal 308, but may be generated in the transmitting mobile phone 319 and the receiving mobile phone 323. Furthermore, although the converted address value generated by converting the address of target recipient is transmitted to the pairing server 314 in this embodiment from the perspective of privacy protection, the address of target recipient may be transmitted to the pairing server 314 without such conversion in the case where it can be assured that there is no privacy problem. In this case, the pairing server 314 determines whether or not, instead of the converted address values, the addresses of target recipient match.

Furthermore, in the communication control system 3300 according to this embodiment, since the pairing server 314 uses the communication device management table to manage the sets of the terminal and the mobile phone, it will not happen that when a malicious recipient inputs shared ID into a receiving terminal of another person, the photo associated with that shared ID can be received.

Embodiment 4

Next, Embodiment 4 is described.

A communication control system in this embodiment is different from the communication control system in Embodiment 1 in the device which determines whether or not the addresses match. Specifically, although the pairing server 314 determines whether or not the addresses match in Embodiment 1, the receiving terminal 308 determines whether or not the addresses match in this embodiment.

Figure 37A:
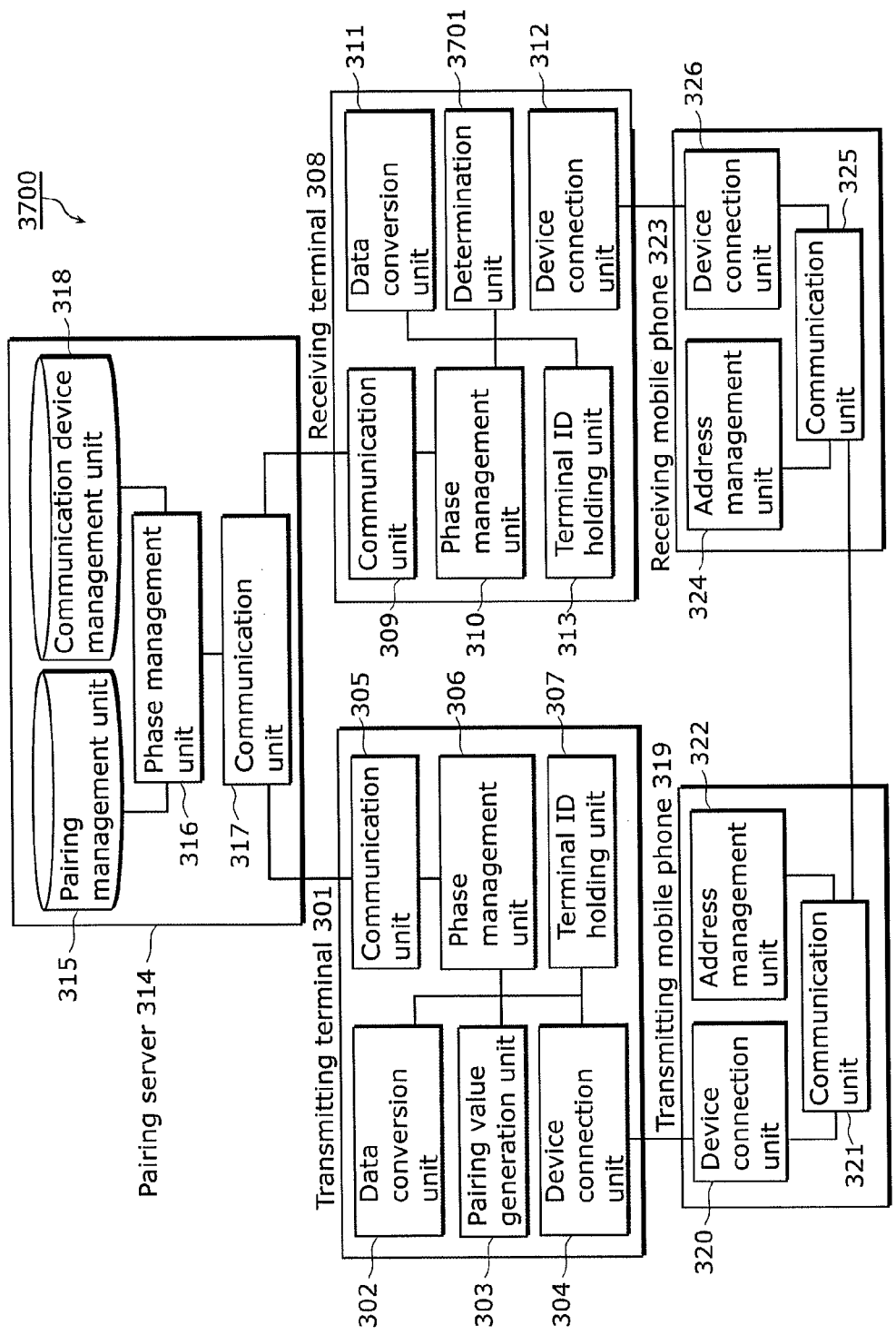
FIG. 37A is a block diagram showing a configuration of a communication control system in Embodiment 4.
Figure 37B:
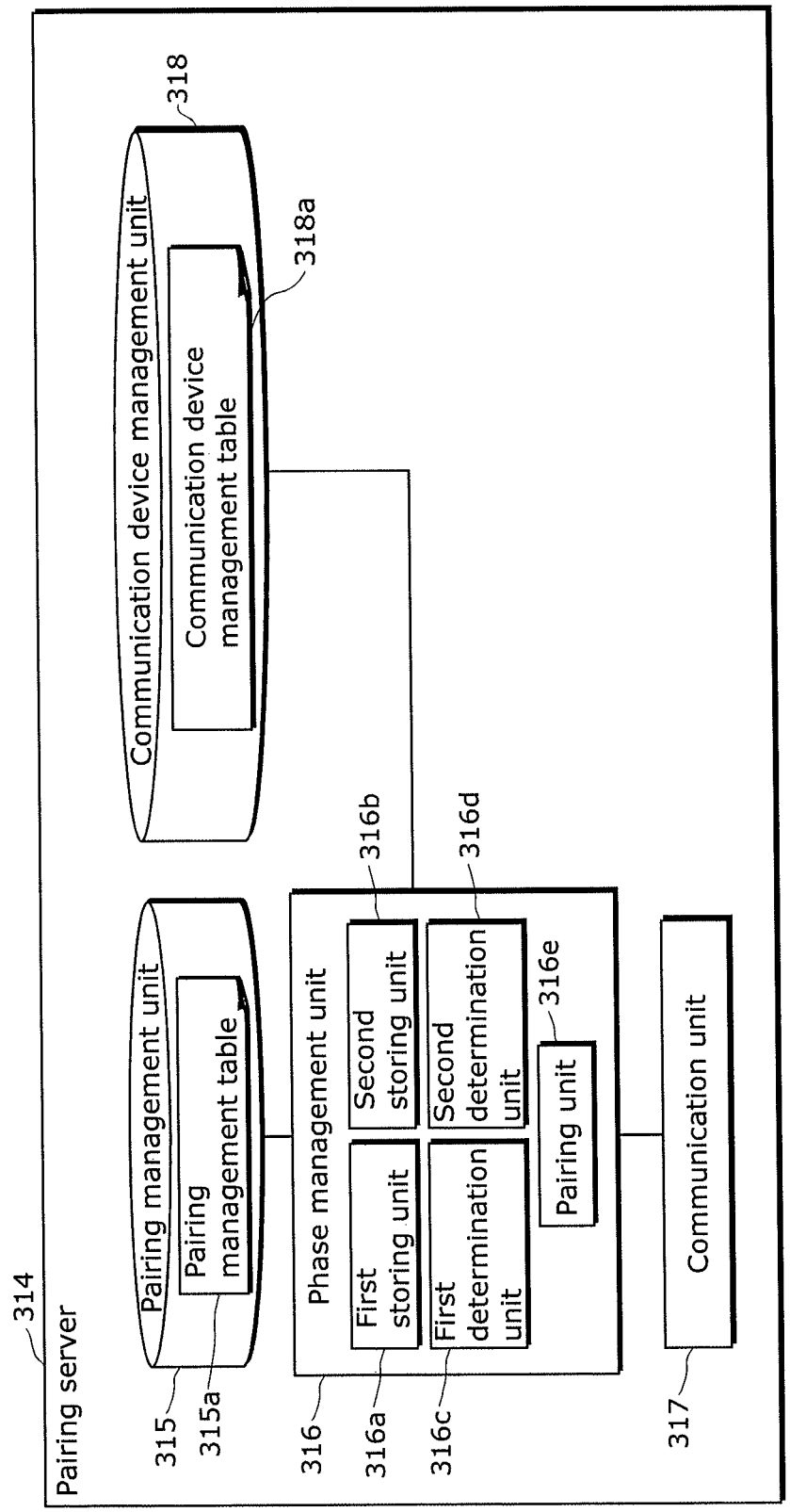
FIG. 37B is a block diagram showing a detailed configuration of a pairing server in Embodiment 4.

FIG. 37A is a block diagram showing a configuration of a communication control system 3700 in Embodiment 4. FIG. 37B is a block diagram showing a detailed configuration of the pairing server 314 in Embodiment 4. In FIGS. 37A and 37B, constituents the same as those shown in FIGS. 3A and 3B in Embodiment 1 are denoted by the same numerals and are not described. The block diagrams in FIGS. 37A and 37B are different from the block diagrams in Embodiment 1 in that the receiving terminal 308 includes a determination unit 3701 which performs comparison and determination on the converted address values.

The determination unit 3701 is an operational circuit which performs comparison and determination on the converted address values. Details will be described later. In this embodiment, the determination unit 3701 corresponds to the first determination unit.

In this embodiment, the address management unit 322 corresponds to the management unit. The device connection unit 320 corresponds to the first transmitting unit. The pairing value generation unit 303 corresponds to the pairing identifier generation unit. The data conversion unit 302 corresponds to the first conversion unit. The communication unit 305 corresponds to the second transmitting unit. The device connection unit 304 corresponds to the third transmitting unit. The communication unit 321 corresponds to the fourth transmitting unit. The device connection unit 326 corresponds to the fifth transmitting unit. The data conversion unit 311 corresponds to the second conversion unit. The communication unit 309 corresponds to the sixth transmitting unit.

Next, various operations in the communication control system 3700 configured as above are specifically described.

Figure 38:
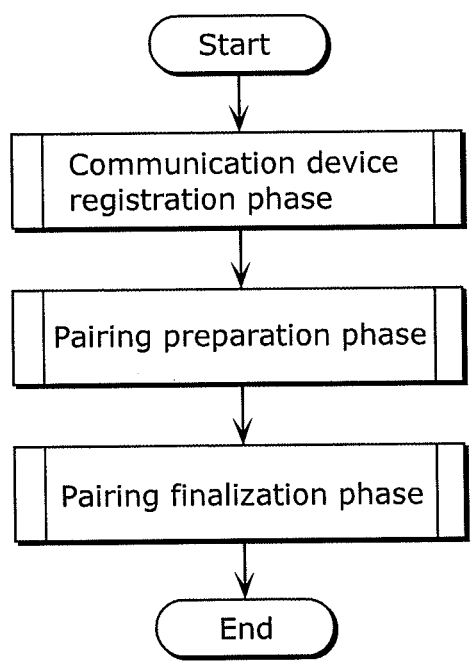
FIG. 38 is a flowchart for explaining an outline of processing of the communication control system in Embodiment 4.

FIG. 38 is a flowchart for explaining an outline of processing of the communication control system 3700 in Embodiment 4. The processing of the communication control system 3700 includes three phases: a communication device registration phase; a pairing preparation phase; and a pairing finalization phase. As the communication device registration phase, processing the same as that described in Embodiment 1 is performed. Therefore, the description is not repeated.

The pairing preparation phase is processing which is performed following the communication device registration phase. At this pairing preparation phase, a sender transmits information necessary for pairing to a recipient by using a communication means such as SMS or MMS.

The pairing finalization phase is processing which is performed following the pairing preparation phase. At this pairing finalization phase, pairing is finalized using the information necessary for pairing which the recipient received from the sender.

Although the pairing server performs comparison and determination on the converted address value received from the transmitting terminal and the converted address value received from the receiving terminal in Embodiment 1, the receiving terminal performs comparison and determination on the converted address value resulting from conversion in the transmitting terminal and the converted address value resulting from conversion in the receiving mobile phone in this embodiment. With this, it is possible to produce the effects described in Embodiment 1 and reduce the processing load on the pairing server.

The following describes the pairing preparation phase and the pairing finalization phase in this order with reference to the drawings.

Figure 39A:
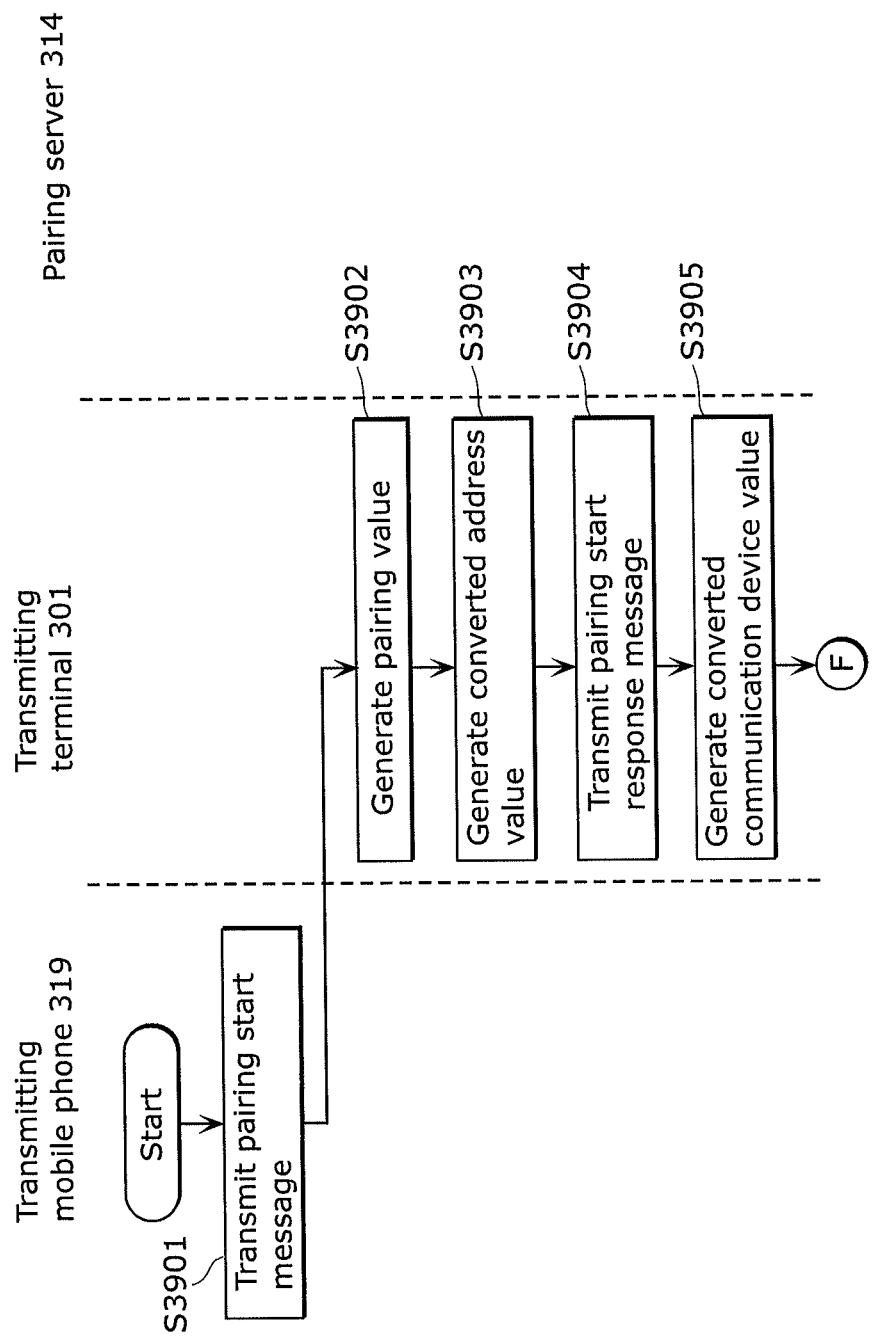
FIG. 39A is a flowchart showing a flow of processing at a pairing preparation phase in Embodiment 4.
Figure 39B:
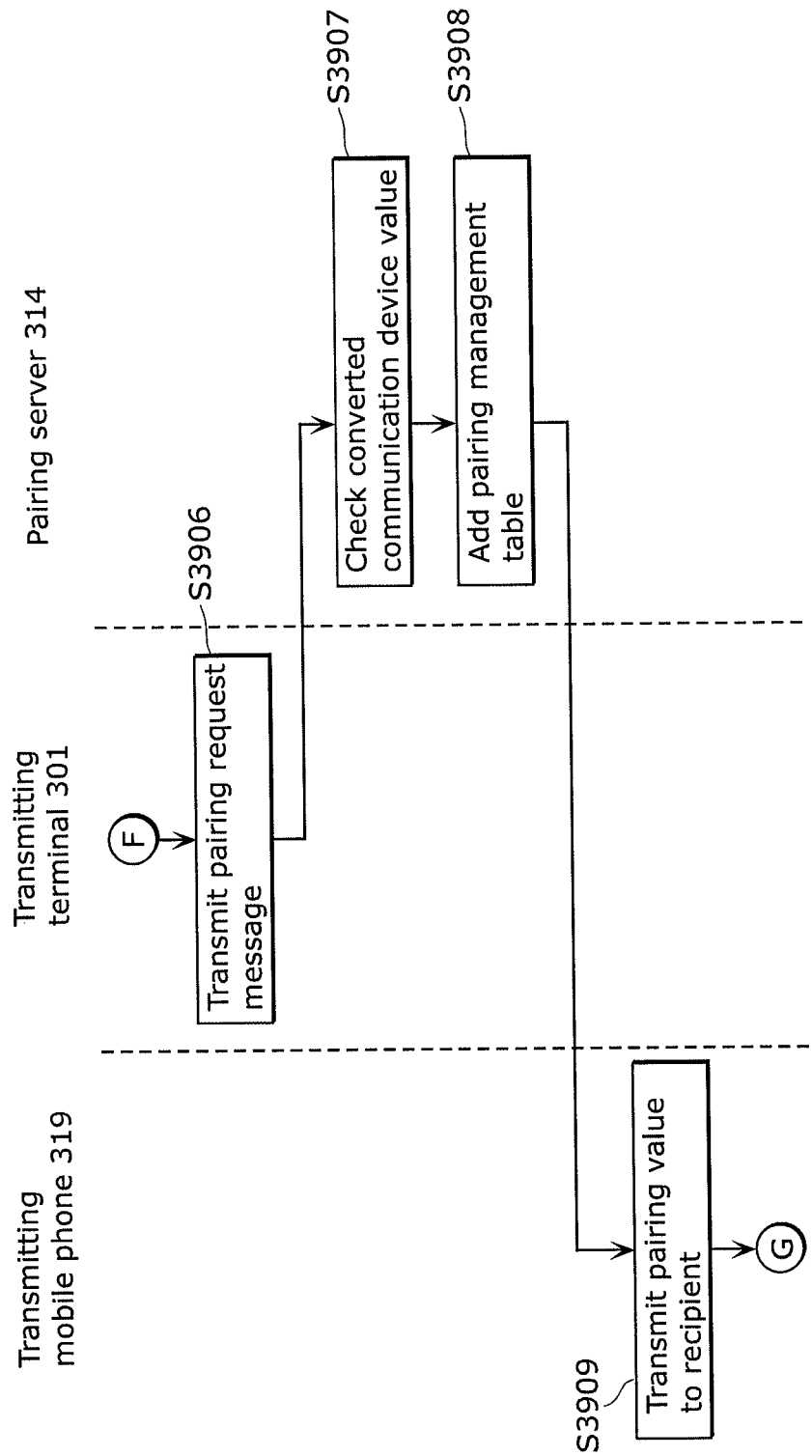
FIG. 39B is a flowchart showing a flow of processing at the pairing preparation phase in Embodiment 4.

FIGS. 39A and 39B are a flowchart showing a flow of processing at the pairing preparation phase.
(Steps S3901 and S3902)

Processing the same as in Steps S801 and S802 in Embodiment 1 is performed.
(Step S3903)

Processing the same as in Step S804 in Embodiment 1 is performed.
(Step S3904)

The phase management unit 306 of the transmitting terminal 301 transmits a pairing start response message to the transmitting mobile phone 319. Here, a specific example of the pairing start response message is described.

Figure 40:
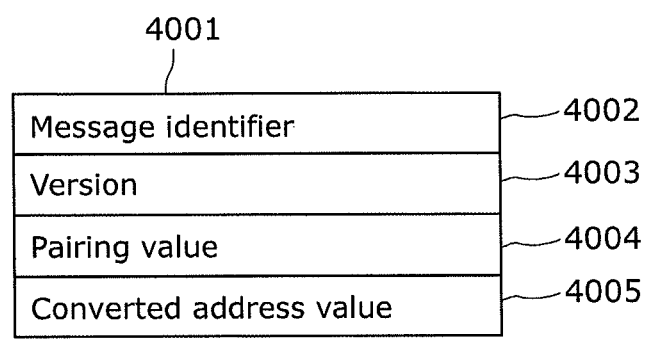
FIG. 40 shows an example of message data included in a pairing start response message in Embodiment 4.

FIG. 40 shows an example of message data included in the pairing start response message. A pairing start response message 4001 includes, as the message data, a message identifier 4002, a version 4003, a pairing value 4004, and a converted address value 4005.

The message identifier 4002 is message data for identifying the message which is exchanged between the transmitting mobile phone 319 and the transmitting terminal 301. The version 4003 is message data for identifying a version number of the pairing start response message. The pairing value 4004 is message data indicating the pairing value generated in Step S3902. The converted address value 4005 is a converted value of target recipient address generated in Step S3903.

The phase management unit 316 generates such pairing start response message 4001. In generating the pairing start response message 4001, the phase management unit 316 sets, for example, "1002" indicating the pairing start response message, "0100" indicating a default version, the pairing value "123456789ABCDEF0" generated in Step S3902, and the converted address value generated in Step S3903, for the message identifier 4002, the version 4003, the pairing value 4004, and the converted address value 4005, respectively.

The transmission of the pairing start response message 4001 to the transmitting mobile phone 319 is performed through the device connection unit 304 of the transmitting terminal 301 and the device connection unit 320 of the transmitting mobile phone 319.

(Step S3905)

Processing the same as in Step S805 in Embodiment 1 is performed.

(Step S3906)

The phase management unit 306 of the transmitting terminal 301 transmits a pairing request message to the pairing server 314. Here, a specific example of the pairing request message is described.

Figure 41:
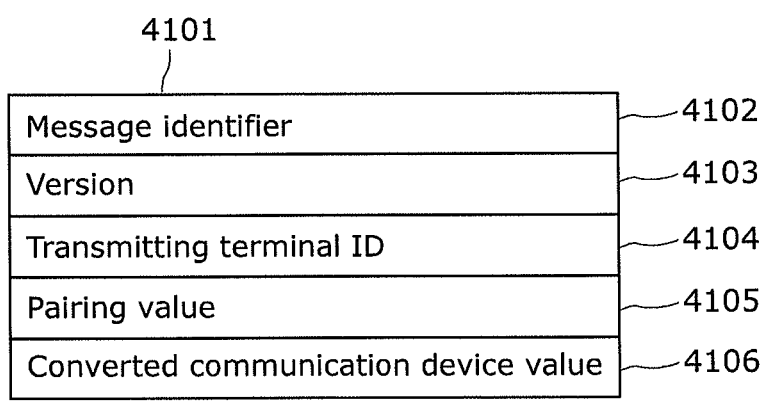
FIG. 41 shows an example of message data included in a pairing request message in Embodiment 4.

FIG. 41 shows an example of message data included in the pairing request message. A pairing request message 4101 includes, as the message data, a message identifier 4102, a version 4103, transmitting terminal ID 4104, a pairing value 4105, and a converted communication device value 4106.

The message identifier 4102 is message data for identifying the message which is exchanged between the transmitting terminal 301 and the pairing server 314. The version 4103 is message data for identifying a version number of the pairing request message. The transmitting terminal ID 4104 is message data indicating the terminal ID of the transmitting terminal 301 that is a terminal which transmits the pairing request message. The pairing value 4105 is message data indicating the pairing value generated in Step S3902. The converted communication device value 4106 is message data indicating the converted communication device value generated in Step S3905.

The phase management unit 306 generates such pairing request message 4101. In generating the pairing request message 4101, the phase management unit 306 sets, for example, "0001" indicating the pairing request message, "0100" indicating a default version, the terminal ID to be held in the terminal ID holding unit 307, the pairing value generated in Step S3902, and the converted communication device value generated in Step S3905, for the message identifier 4102, the version 4103, the transmitting terminal ID 4104, the pairing value 4105, and the converted communication device value 4106, respectively. Afterward, the phase management unit 306 transmits the generated pairing request message 4101 to the pairing server 314 via the communication unit 305.

(Step S3907)

Processing the same as in Step S807 in Embodiment 1 is performed.

(Step S3908)

When receiving the pairing request message 4101 from the transmitting terminal 301 via the communication unit 317, the second storing unit 316b of the pairing server 314 stores, into the pairing management table 315a, the phase number, the transmitting terminal ID included in the received pairing request message 4101, and the pairing value in association with one another. The second storing unit 316b stores, for the phase number, "1" indicating the pairing preparation phase.

FIG. 42 shows an example of the pairing management table 315a at the end of Step S3908. In FIG. 42, since the converted address value is not used in the pairing server 314, the column for the receiving terminal ID is blank as no value has been set yet.

(Step S3909)

After receiving the pairing start response message 4001 from the transmitting terminal 301 in Step S3904, the transmitting mobile phone 319 displays a send screen for an MMS message which is directed to the target recipient designated by the sender on the menu "sharing setting (send)" in Step S3901, and accepts a message input from the sender. FIG. 14 shows a screen example which appears after the message input.

After completion of the message input from the sender, the transmitting mobile phone 319 transmits an MMS message to the target recipient designated in Step S3901 by the sender. At this time, the pairing value and the converted address value which are included in the pairing start response message received from the transmitting terminal 301 in Step S3904 are attached to the MMS message to be transmitted.

The description on processing at the pairing preparation phase ends here.

Subsequently, processing at the pairing finalization phase is described with reference to FIGS. 43A and 43B.

Figure 43A:
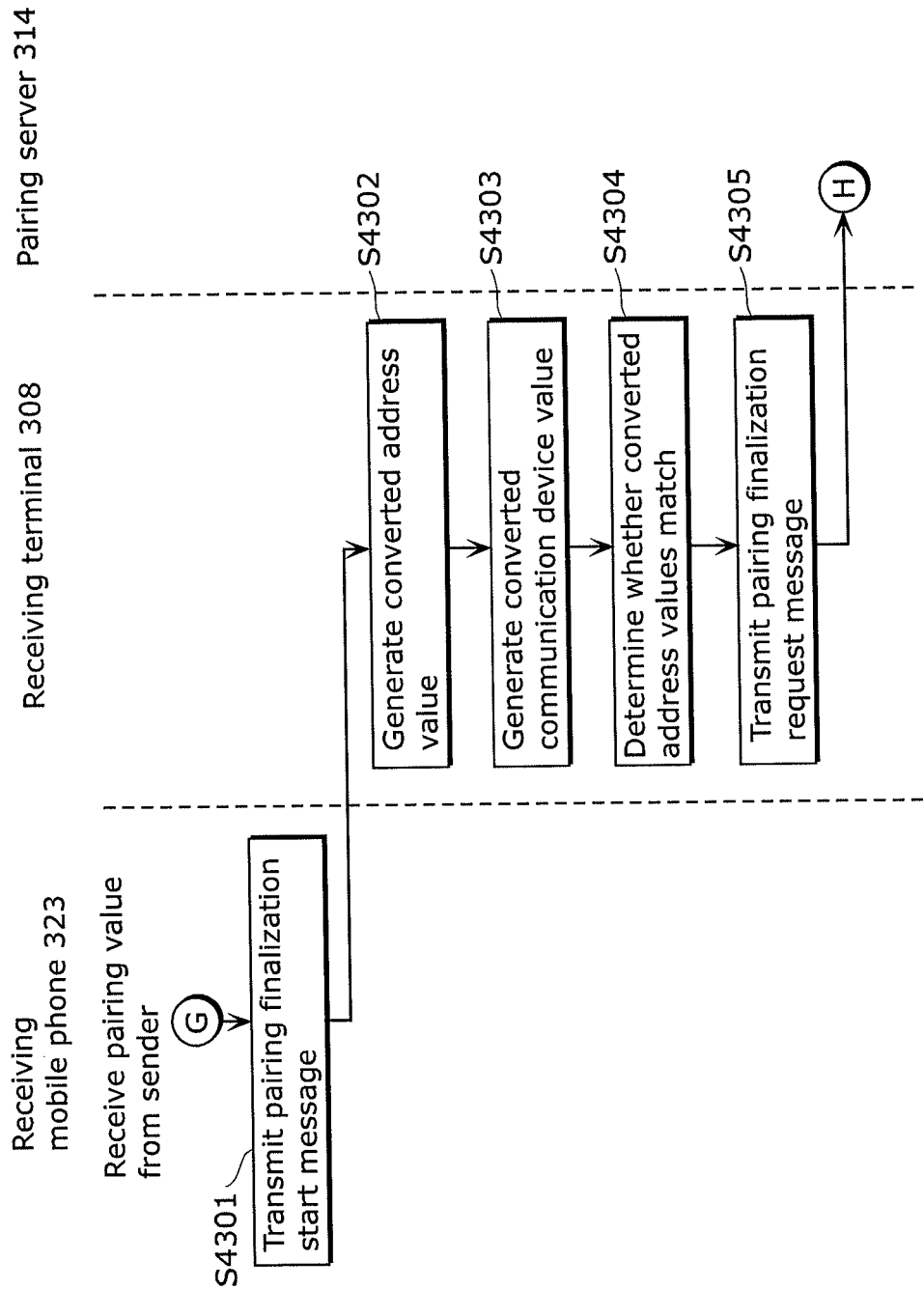
FIG. 43A is a flowchart showing a flow of processing at a pairing finalization phase in Embodiment 4.
Figure 43B:
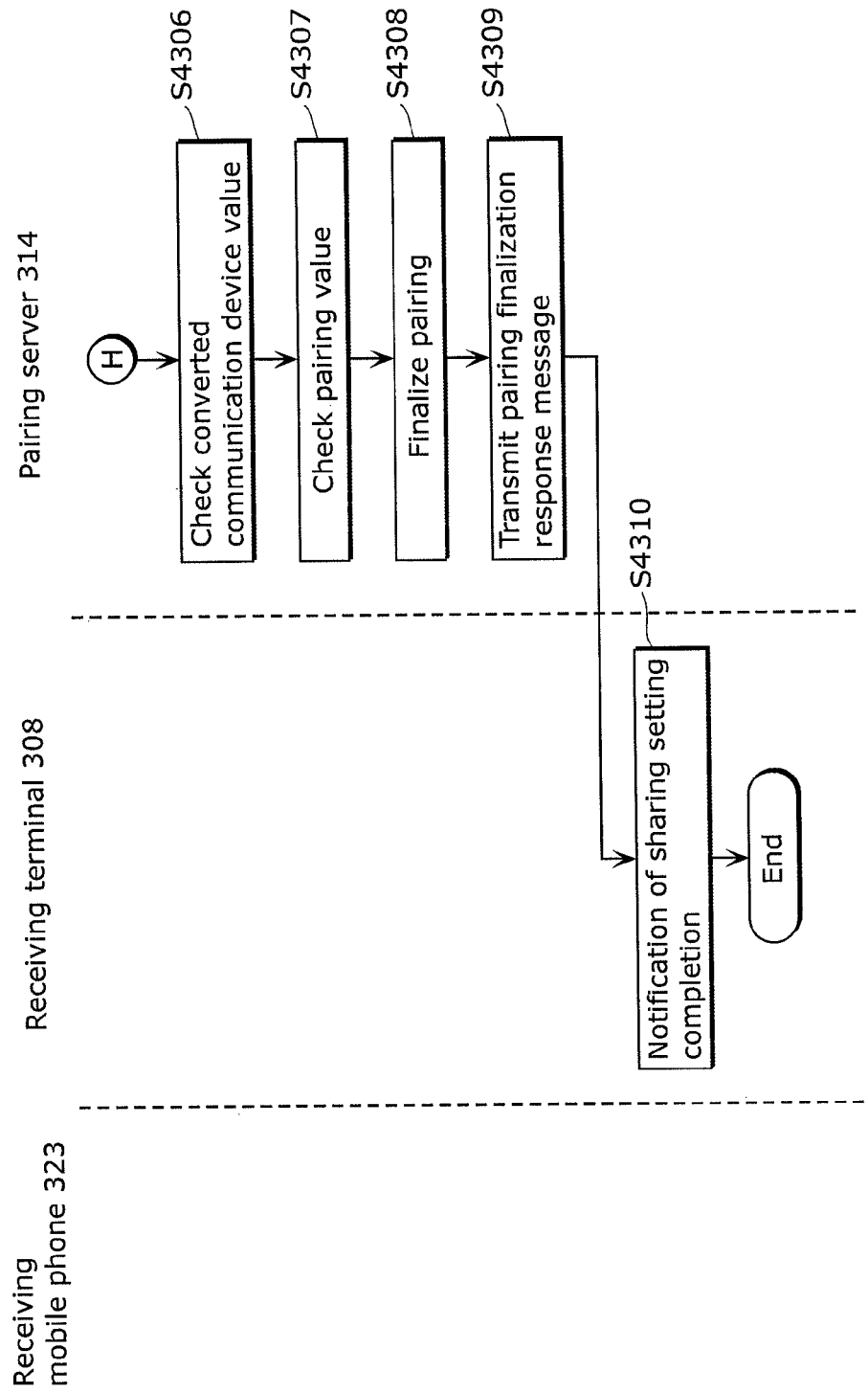
FIG. 43B is a flowchart showing a flow of processing at a pairing finalization phase in Embodiment 4.

FIGS. 43A and 43B are a flowchart showing a flow of processing at the pairing finalization phase.

(Step S4301)

The recipient receives the MMS message from the sender. Afterward, the receiving mobile phone 323 transmits a pairing finalization start message to the receiving terminal 308 according to an instruction of the recipient. Here, a specific example of the pairing finalization start message is described.

Figure 44:
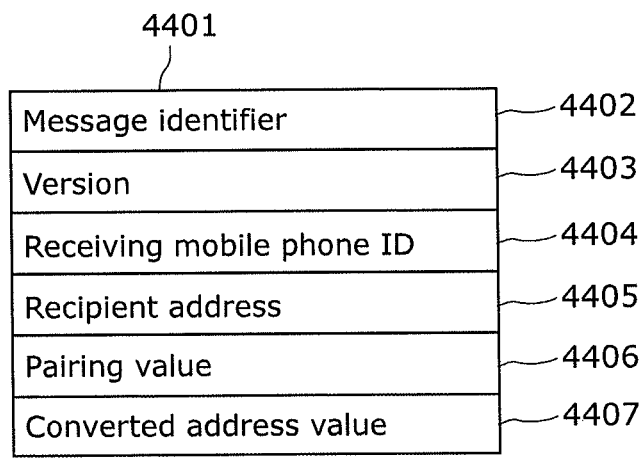
FIG. 44 shows an example of message data included in a pairing finalization start message in Embodiment 4.

FIG. 44 shows an example of message data included in the pairing finalization start message. A pairing finalization start message 4401 includes, as the message data, a message identifier 4402, a version 4403, receiving mobile phone ID 4404, a sender address 4405, a pairing value 4406, and a converted address value 4407.

The message identifier 4402 is message data for identifying the message which is exchanged between the receiving mobile phone 323 and the receiving terminal 308.

The version 4403 is message data for identifying a version number of the pairing finalization start message.

The receiving mobile phone ID 4404 is message data indicating the terminal ID of the receiving mobile phone 323 which transmits the pairing finalization start message. The terminal ID of the mobile phone is a unique identifier assigned by a mobile-phone operator.

The recipient address 4405 is address data which the recipient uses in SMS, MMS, or the like, and is stored in the address management unit 324 of the receiving mobile phone 323.

The pairing value 4406 is message data indicating the pairing value received from the transmitting mobile phone 319.

The converted address value 4407 is message data indicating the converted address value received from the transmitting mobile phone 319.

The receiving mobile phone 323 generates the pairing finalization start message 4401 according to an instruction of the recipient. The receiving mobile phone 323 sets, for example, "1003" indicating the pairing finalization start message, "0100" indicating a default version, unique ID "EEDDCCBBAA99..." assigned by an operator, an MMS address of the recipient "yamamoto@xxx.ne.jp", the pairing value attached to the MMS message received from the sender, and the converted address value received from the transmitting mobile phone 319, for the message identifier 4402, the version 4403, the receiving mobile phone ID 4404, the recipient address 4405, the pairing value 4406, and the converted address value 4407, respectively. Afterward, the receiving mobile phone 323 transmits the generated pairing finalization start message 4401 to the receiving terminal 308.

The transmission of the pairing finalization start message 4401 to the receiving terminal 308 is performed through the device connection unit 326 of the receiving mobile phone 323 and the device connection unit 312 of the receiving terminal 308.

(Steps S4302 and S4303)

Processing the same as in Steps S1502 and S1503 in Embodiment 1 is performed.

(Step S4304)

The determination unit 3701 of the receiving terminal 308 compares the converted address value included in the pairing finalization start message 4401 received from the receiving mobile phone 323 in Step S4301 with the converted address value generated in Step S4302. Specifically, the determination unit 3701 determines whether or not there is matching of two converted address values: the converted address value generated by converting the address held in the transmitting mobile phone 319; and the converted address value generated by converting the address previously held in the receiving mobile phone 323. As a result of the comparison, when the two converted address values match, processing in Step S4305 is performed. On the other hand, when the two converted address values do not match, the receiving terminal 308 displays an error message, thereby ending the processing. In other words, when the two converted address values do not match, the processing in Step S4305 is not performed.

(Step S4305)

The phase management unit 306 of the receiving terminal 308 stores, in association with the phase number, the pairing value included in the received pairing finalization start message 4401. The phase management unit 306 stores, for the phase number, "1" indicating the pairing preparation phase. Afterward, the communication unit 309 transmits a pairing finalization request message to the pairing server 314. Here, a specific example of the pairing finalization request message is described.

Figure 45:
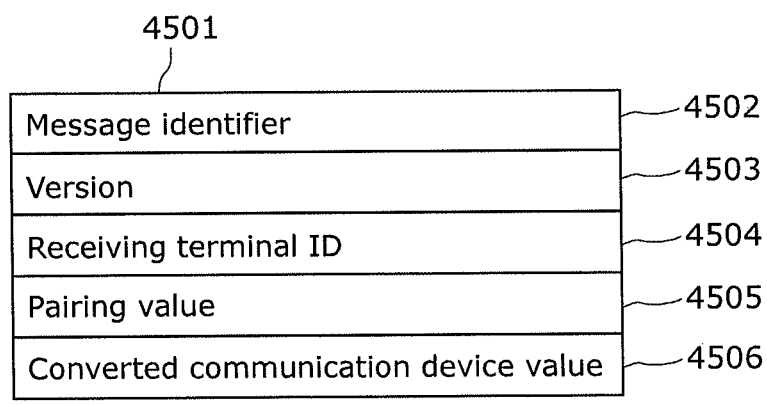
FIG. 45 shows an example of message data included in a pairing finalization request message in Embodiment 4.

FIG. 45 shows an example of message data included in the pairing finalization request message. A pairing finalization request message 4501 includes, as the message data, a message identifier 4502, a version 4503, receiving terminal ID 4504, a pairing value 4505, and a converted communication device value 4506.

The message identifier 4502 is message data for identifying the message which is exchanged between the receiving terminal 308 and the pairing server 314. The version 4503 is message data for identifying a version number of the pairing finalization request message. The receiving terminal ID 4504 is message data indicating the terminal ID of the receiving terminal 308 that is a terminal which transmits the pairing finalization request message. The pairing value 4505 is message data indicating the pairing value received from the receiving mobile phone 323. The converted communication device value 4506 is message data indicating the converted communication device value generated in Step S4303.

The phase management unit 310 generates such pairing finalization request message 4501. In generating the pairing finalization request message 4501, the phase management unit 310 sets, for example, "0003" indicating the pairing finalization request message, "0100" indicating a default version, the terminal ID to be held in the terminal ID holding unit 313, the pairing value received from the receiving mobile phone 323, and the converted communication device value generated in Step S4303, for the message identifier 4502, the version 4503, the receiving terminal ID 4504, the pairing value 4505, and the converted communication device value 4506, respectively. Afterward, the phase management unit 310 transmits the generated pairing finalization request message 4501 to the pairing server 314 via the communication unit 309.

(Step S4306)

Processing the same as in Step S1505 in Embodiment 1 is performed.

(Step S4307)

When receiving the pairing finalization request message 4501 from the receiving terminal 308 via the communication unit 317, the second determination unit 316d of the pairing server 314 determines whether or not the pairing value included in the received pairing finalization request message 4501 has been stored in the pairing management table 315a. Here, when the pairing value has been stored, the processing in Step S4308 is performed next. When the pairing value has not been stored, the pairing server 314 transmits an error message to the receiving terminal 308, thereby ending the processing.

(Step S4308)

The second storing unit 316b of the pairing server 314 stores, into the pairing management table 315a, the receiving terminal ID included in the received pairing finalization request message 4501, in association with the pairing value on which the determination in Step S4307 has been performed. The second storing unit 316b stores, for the phase number, "2" indicating the pairing finalization phase.

FIG. 46 shows an example of the pairing management table 315a at the end of Step S4308. FIG. 46 represents that the transmitting terminal 301 having the transmitting terminal ID "445566CCDD" and the receiving terminal 308 having the receiving terminal ID "778899EEFF" have been paired.

(Steps S4309 and S4310)

Processing the same as in Steps S1508 and S1509 in Embodiment 1 is performed.

The description on processing in the pairing finalization phase ends here.

Through the above processing, the transmitting terminal 301 and the receiving terminal 308 are paired. In this embodiment, the receiving terminal 308 is capable of obtaining the terminal ID of the transmitting terminal 301 (the transmitting terminal ID). Thus, afterward, using the transmitting terminal ID, the receiving terminal 308 is allowed to share, with the transmitting terminal 301, content such as photos and video held by the transmitting terminal 301.

It is to be noted that the transmitting terminal 301 and the receiving terminal 308 may share content in any way as long as they use the result of pairing. For example, the pairing server 314 may control the communication between the transmitting terminal 301 and the receiving terminal 308 by referring to the pairing management table 315a so as to transfer, to the receiving terminal 308, content such as photos received from the transmitting terminal 301. Furthermore, the pairing server 314 may control the communication between the transmitting terminal 301 and the receiving terminal 308 by referring to the pairing management table 315a so that content such as photos uploaded by the transmitting terminal 301 is downloadable by the receiving terminal 308.

As above, in the communication control system 3700 according to this embodiment, the transmitting terminal 301 and the receiving terminal 308 are paired when the pairing value transmitted from the transmitting terminal 301 to the pairing server 314 matches, in the pairing server 314, the pairing value transmitted from the receiving terminal 308 to the pairing server 314. Since a sufficiently large random number is used as the pairing value, it will not happen that the transmitting terminal is paired with another receiving terminal which performs different pairing processing. In other words, the data transmitted from the transmitting terminal will not be received by a receiving terminal which is not supposed to receive the data.

Furthermore, in the communication control system 3700 according to this embodiment, the receiving terminal 308 determines whether or not the converted address values match, and therefore, it will not happen that when a malicious recipient who receives the shared ID from the sender transfers the shared ID to another person, and the other person inputs the transferred shared ID into the receiving terminal, the photo associated with the shared ID can be received.

Furthermore, in the communication control system 3700 according to this embodiment, since the pairing server 314 uses the communication device management table to manage the sets of the terminal and the mobile phone, it will not happen that when a malicious recipient inputs shared ID into a receiving terminal of another person, the photo associated with that shared ID can be received.

Embodiment 5

Next, Embodiment 5 is described.

A communication control system in this embodiment is different from the communication control system in Embodiment 4 in the device which determines whether or not the addresses match. Specifically, although the receiving terminal 308 determines whether or not the addresses match in Embodiment 4, the receiving mobile phone 323 determines whether or not the addresses match in this embodiment.

Figure 47A:
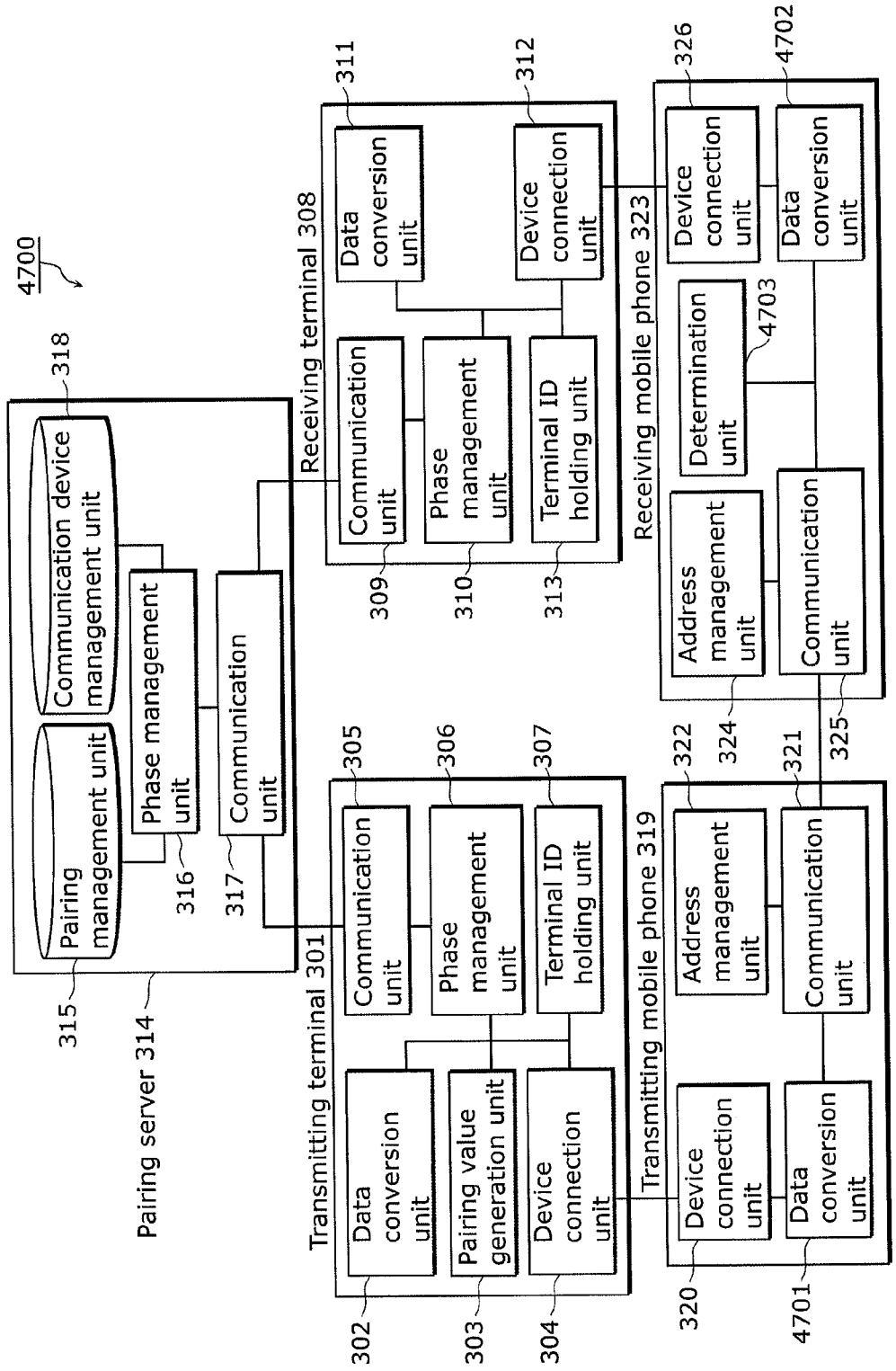
FIG. 47A is a block diagram showing a configuration of a communication control system in Embodiment 5.
Figure 47B:
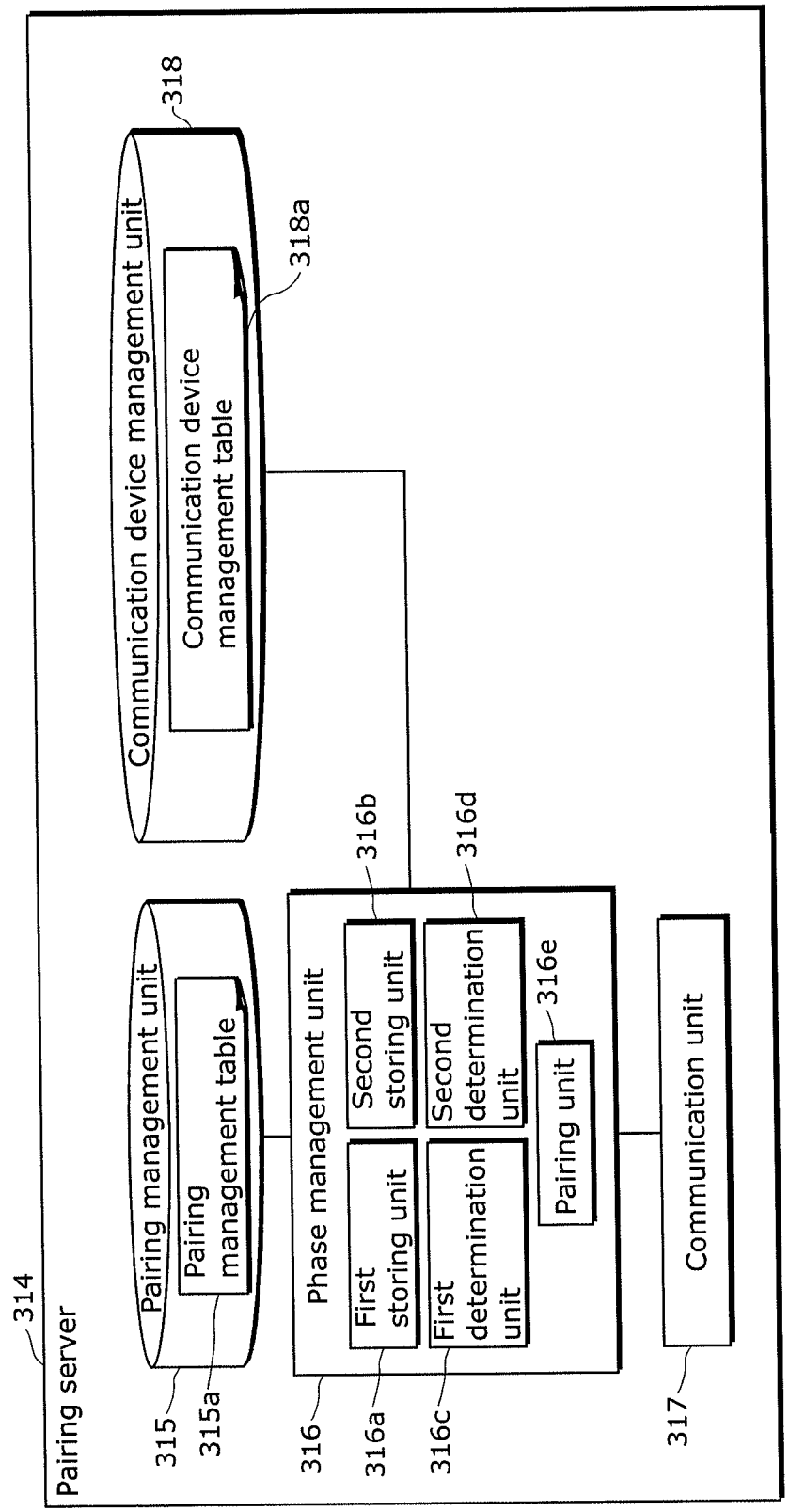
FIG. 47B is a block diagram showing a detailed configuration of a pairing server in Embodiment 5.

FIG. 47A is a block diagram showing a configuration of a communication control system 4700 in Embodiment 5. FIG. 47B is a block diagram showing a detailed configuration of the pairing server 314 in Embodiment 5. In FIGS. 47A and 47B, constituents the same as those shown in FIGS. 37A and 37B in Embodiment 4 are denoted by the same numerals and are not described. The block diagrams in FIGS. 47A and 47B are different from the block diagrams in Embodiment 4 in that the receiving mobile phone 323 includes a determination unit 4703 which performs comparison and determination on the converted address values.

Data conversion units 4701 and 4702 are each an operational circuit which converts data, such as addresses of mobile phone emails, using a one-way function. In this embodiment, the data conversion unit 4701 corresponds to the first conversion unit, and the data conversion unit 4702 corresponds to the second conversion unit.

The determination unit 4703 is an operational circuit which performs comparison and determination on the converted address values. In this embodiment, the determination unit 4703 corresponds to the first determination unit. Details will be described later.

In this embodiment, the pairing value generation unit 303 corresponds to the pairing identifier generation unit. The communication unit 305 corresponds to the first transmitting unit. The device connection unit 304 corresponds to the second transmitting unit. The address management unit 322 corresponds to the management unit. The communication unit 321 corresponds to the third transmitting unit. The device connection unit 326 corresponds to the fourth transmitting unit. The communication unit 309 corresponds to the fifth transmitting unit.

Next, various operations in the communication control system 4700 configured as above are specifically described.

Figure 48:
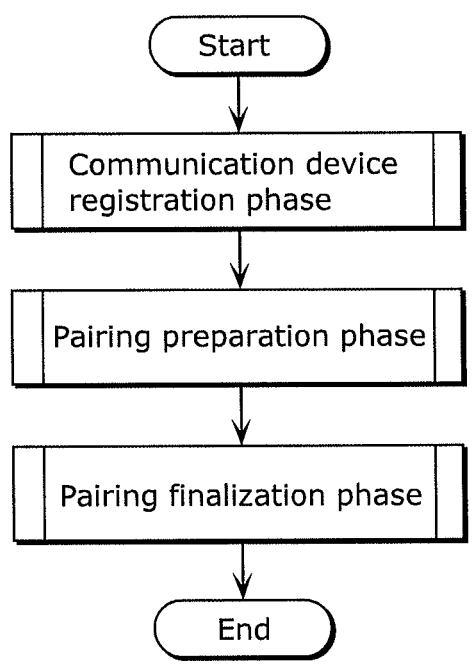
FIG. 48 is a flowchart for explaining an outline of processing of the communication control system in Embodiment 5.

FIG. 48 is a flowchart for explaining an outline of processing of the communication control system 4700 in Embodiment 5. The processing of the communication control system 4700 includes three phases: a communication device registration phase; a pairing preparation phase; and a pairing finalization phase. As the communication device registration phase, processing the same as that described in Embodiment 1 is performed. Therefore, the description is not repeated.

The pairing preparation phase is processing which is performed following the communication device registration phase. At this pairing preparation phase, a sender transmits information necessary for pairing to a recipient by using a communication means such as SMS or MMS.

The pairing finalization phase is processing which is performed following the pairing preparation phase. At this pairing finalization phase, pairing is finalized using the information necessary for pairing which the recipient received from the sender.

Although the receiving terminal performs comparison and determination on the converted address value resulting from conversion in the transmitting terminal and the converted address value resulting from conversion in the receiving mobile phone in Embodiment 4, the receiving mobile phone performs comparison and determination on the converted address value resulting from conversion in the transmitting mobile phone and the converted address value resulting from conversion in the receiving mobile phone in this embodiment. With this, it is possible to produce the effects described in Embodiment 4 and reduce the processing load on the receiving terminal.

The following describes the pairing preparation phase and the pairing finalization phase in this order with reference to the drawings.

FIGS. 49A and 49B are a flowchart showing a flow of processing at the pairing preparation phase.

(Step S4901)

According to an instruction of a sender, the transmitting mobile phone 319 transmits a pairing start message to the transmitting terminal 301. Here, a specific example of the pairing start message is described.

Figure 50:
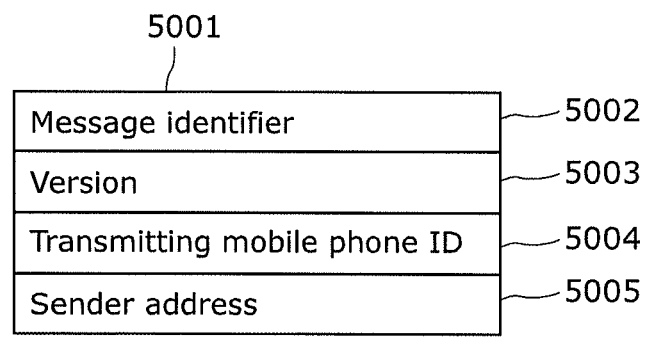
FIG. 50 shows an example of message data included in a pairing start message in Embodiment 5.

FIG. 50 shows an example of message data included in the pairing start message. A pairing start message 5001 includes, as the message data, a message identifier 5002, a version 5003, transmitting mobile phone ID 5004, and a sender address 5005.

The message identifier 5002 is message data for identifying the message which is exchanged between the transmitting mobile phone 319 and the transmitting terminal 301.

The version 5003 is message data for identifying a version number of the pairing start message. When the message data included in the message have any change such as addition or deletion due to system expansion, the version number is increased. Each of the mobile phone and the terminal compares a value of the version number included in the message with the version number which the device itself supports, to thereby determine whether to be able to handle the message.

The transmitting mobile phone ID 5004 is message data indicating the terminal ID of the transmitting mobile phone 319 which transmits the pairing start message. The terminal ID of the mobile phone is a unique identifier assigned by a mobile-phone operator.

The sender address 5005 is address data which the sender uses in SMS, MMS, or the like, and is stored in the address management unit 322 of the transmitting mobile phone 319.

The sender selects a menu "sharing setting (send)" on the menu screen of the transmitting mobile phone 319. Upon selection of the menu "sharing setting (send)", the transmitting mobile phone 319 displays, on the screen, the address data stored in the address management unit 322. FIG. 10 shows a display example of the address data. The sender selects the target recipient with whom the sender wishes to share photos, etc., from among the addresses displayed on the screen.

Upon selection of the target recipient, the transmitting mobile phone 319 generates the pairing start message 5001. The transmitting mobile phone 319 sets, for example, "1001" indicating the pairing start message, "0100" indicating a default version, unique ID "FFEEDDCCBBAA . . . " assigned by an operator, and an MMS address of the sender "suzuki@xxx.ne.jp", for the message identifier 5002, the version 5003, the transmitting mobile phone ID 5004, and the sender address 5005, respectively. Afterward, the transmitting mobile phone 319 transmits the generated pairing start message 5001 to the transmitting terminal 301.

The transmission of the pairing start message 5001 to the transmitting terminal 301 is performed through the device connection unit 320 of the transmitting mobile phone 319 and the device connection unit 304 of the transmitting terminal 301.
(Step S4902)
Processing the same as in Step S3902 in Embodiment 4 (Step S802 in Embodiment 1) is performed.
(Step S4903)
The phase management unit 306 of the transmitting terminal 301 transmits a pairing start response message to the transmitting mobile phone 319. Here, a specific example of the pairing start response message is described.

Figure 51:
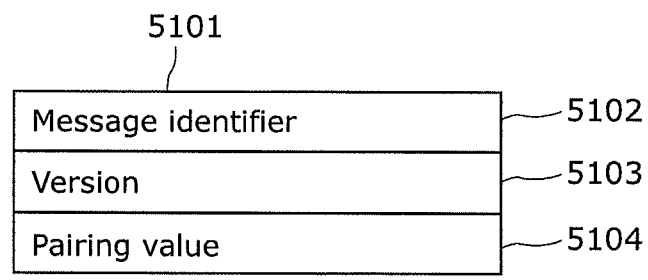
FIG. 51 shows an example of message data included in a pairing start response message in Embodiment 5.

FIG. 51 shows an example of message data included in the pairing start response message. A pairing start response message 5101 includes, as the message data, a message identifier 5102, a version 5103, and a pairing value 5104.

The message identifier 5102 is message data for identifying the message which is exchanged between the transmitting mobile phone 319 and the transmitting terminal 301. The version 5103 is message data for identifying a version number of the pairing start response message. The pairing value 5104 is message data indicating the pairing value generated in Step S4902.

The phase management unit 316 generates such pairing start response message 5101. In generating the pairing start response message 4001, the phase management unit 316 sets, for example, "1002" indicating the pairing start response message, "0100" indicating a default version, and the pairing value "123456789ABCDEF0" generated in Step S4902, for the message identifier 5102, the version 5103, and the pairing value 5104, respectively.

The transmission of the pairing start response message 5101 to the transmitting mobile phone 319 is performed through the device connection unit 304 of the transmitting terminal 301 and the device connection unit 320 of the transmitting mobile phone 319.
(Step S4904)
Processing the same as in Step S3905 in Embodiment 4 (Step S805 in Embodiment 1) is performed.
(Step S4905)
Processing the same as in Step S3906 in Embodiment 4 is performed.
(Step S4906)
Processing the same as in Step S3907 in Embodiment 4 (Step S807 in Embodiment 1) is performed.
(Step S4907)
Processing the same as in Step S3908 in Embodiment 4 is performed.
(Step S4908)
The data conversion unit 4701 of the transmitting mobile phone 319 generates the converted address value based on the address of target recipient (an MMS address of the target recipient) selected in Step S4901 by the sender. In this embodiment, the converted address value is an output value which results from input of the address of target recipient to an SHA-256 operational circuit in the data conversion unit 4701.
(Step S4909)
After receiving the pairing start response message 5101 from the transmitting terminal 301 in Step S4903, the transmitting mobile phone 319 displays a send screen for an MMS message which is directed to the target recipient designated by the sender on the menu "sharing setting (send)" in Step S4901, and accepts a message input from the sender. FIG. 14 shows a screen example which appears after the message input.

After completion of the message input from the sender, the transmitting mobile phone 319 transmits an MMS message to the target recipient designated in Step S4901 by the sender. At this time, the pairing value and the converted address value which are included in the pairing start response message received from the transmitting terminal 301 in Step S4903 are attached to the MMS message to be transmitted.

The description on processing at the pairing preparation phase ends here.

Subsequently, processing at the pairing finalization phase is described with reference to FIGS. 52A and 52B.

Figure 52B:
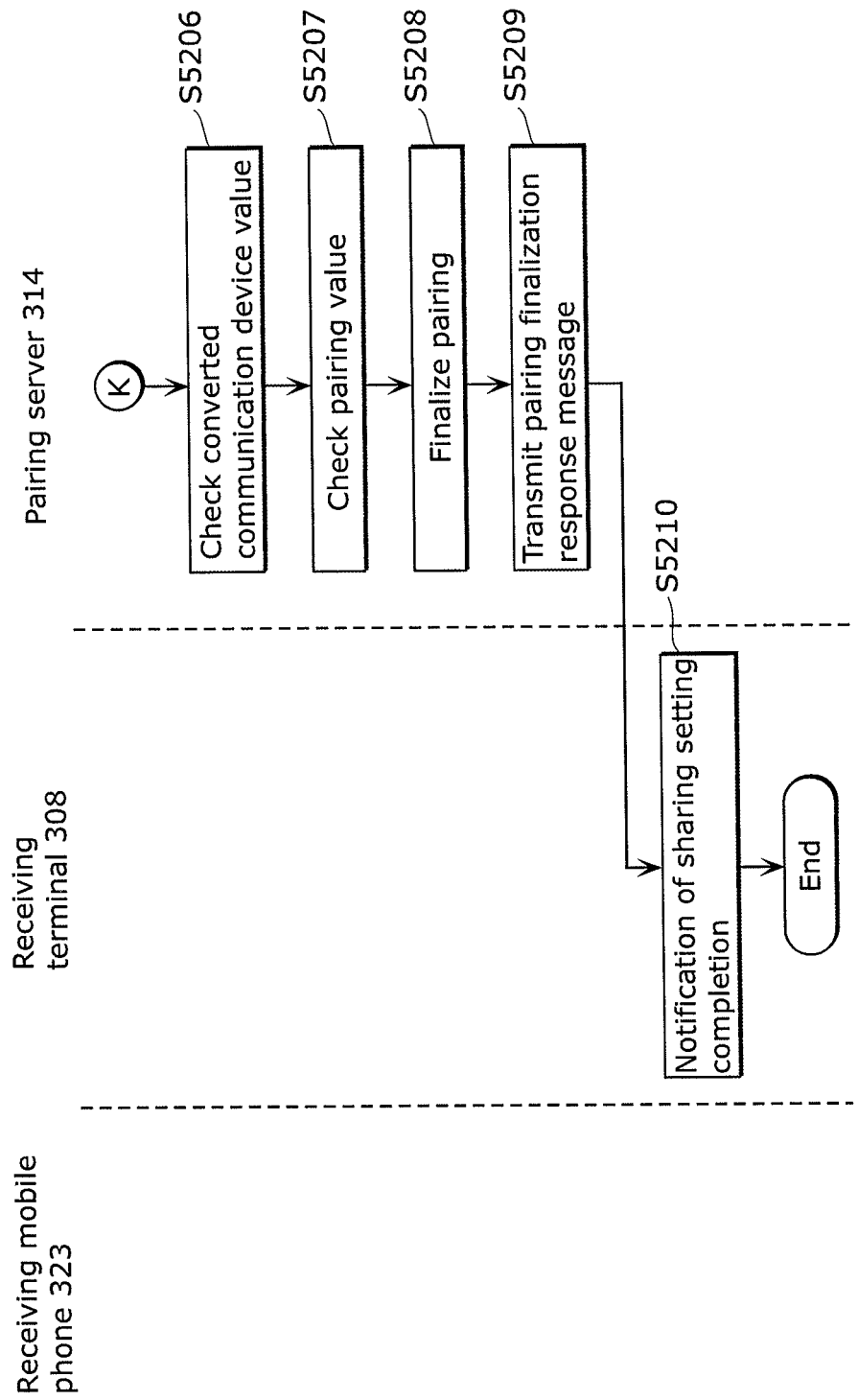
FIG. 52B is a flowchart showing a flow of processing at a pairing finalization phase in Embodiment 5.

FIGS. 52A and 52B are a flowchart showing a flow of processing at the pairing finalization phase.
(Step S5201)
The recipient receives the MMS message from the sender. Afterward, the data conversion unit 4702 of the receiving mobile phone 323 generates the converted address value based on the recipient email address held in the address management unit 324. In this embodiment, the converted address value is an output value which results from input of the recipient email address to an SHA-256 operational circuit in the data conversion unit 4702.
(Step S5202)
The determination unit 4703 of the receiving mobile phone 323 compares the converted address value included in the MMS message received from the sender in Step S5201 with the converted address value generated in Step S5201. As a result of the comparison, processing in Step S5203 is performed when the two converted address values match. On the other hand, when the two converted address values do not match, the receiving mobile phone 323 displays an error message, thereby ending the processing. In other words, when the two converted address values do not match, the processing in Step S5203 is not performed.
(Step S5203)
The receiving mobile phone 323 transmits a pairing finalization start message to the receiving terminal 308 according to an instruction of the recipient. Here, a specific example of the pairing finalization start message is described.

Figure 53:
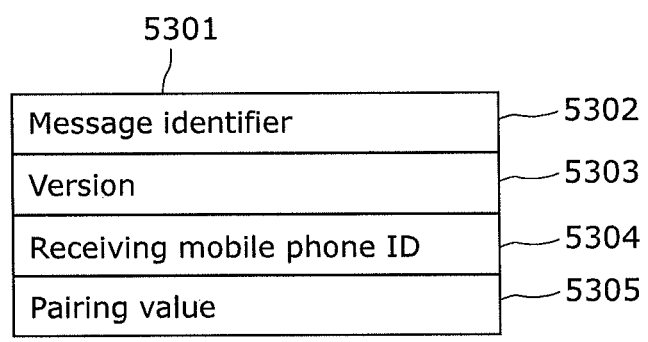
FIG. 53 shows an example of message data included in a pairing finalization start message in Embodiment 5.

FIG. 53 shows an example of message data included in the pairing finalization start message. A pairing finalization start message 5301 includes, as the message data, a message identifier 5302, a version 5303, receiving mobile phone ID 5304, and a pairing value 5305.

The message identifier 5302 is message data for identifying the message which is exchanged between the receiving mobile phone 323 and the receiving terminal 308.

The version 5303 is message data for identifying a version number of the pairing finalization start message.

The receiving mobile phone ID 5304 is message data indicating the terminal ID of the receiving mobile phone 323 which transmits the pairing finalization start message. The terminal ID of the mobile phone is a unique identifier assigned by a mobile-phone operator.

The pairing value 5305 is message data indicating the pairing value received from the transmitting mobile phone 319.

The receiving mobile phone 323 generates the pairing finalization start message 5301 according to an instruction of the recipient. The receiving mobile phone 323 sets, for example, "1003" indicating the pairing finalization start message, "0100" indicating a default version, unique ID "EEDDCCBBAA99 . . . " assigned by an operator, and the pairing value attached to the MMS message received from the sender, for the message identifier 5302, the version 5303, the receiving mobile phone ID 5304, and the pairing value 5305, respectively. Afterward, the receiving mobile phone 323 transmits the generated pairing finalization start message 5301 to the receiving terminal 308.

The transmission of the pairing finalization start message 5301 to the receiving terminal 308 is performed through the device connection unit 326 of the receiving mobile phone 323 and the device connection unit 312 of the receiving terminal 308.
(Step S5204)

Processing the same as in Step S4303 in Embodiment 4 (Step S1503 in Embodiment 1) is performed.
(Step S5205)

The phase management unit 306 of the receiving terminal 308 stores, in association with the phase number, the pairing value included in the received pairing finalization start message 5301. The phase management unit 306 stores, for the phase number, "1" indicating the pairing preparation phase. Afterward, the communication unit 309 transmits a pairing finalization request message to the pairing server 314.

Specific processing of transmitting the pairing finalization request message is the same as the processing in Step S4305 described in Embodiment 4.
(Step S5206)

Processing the same as in Step S4306 in Embodiment 4 (Step S1505 in Embodiment 1) is performed.
(Steps S5207 and S5208)

Processing the same as in Steps S4307 and S4308 in Embodiment 4 is performed.
(Steps S5209 and S5210)

Processing the same as in Steps S4309 and S4310 in Embodiment 4 (Steps S1508 and S1509 in Embodiment 1) is performed.

The description on processing in the pairing finalization phase ends here.

Through the above processing, the transmitting terminal 301 and the receiving terminal 308 are paired. In this embodiment, the receiving terminal 308 is capable of obtaining the terminal ID of the transmitting terminal 301 (the transmitting terminal ID). Thus, afterward, using the transmitting terminal ID, the receiving terminal 308 is allowed to share, with the transmitting terminal 301, content such as photos and video held by the transmitting terminal 301.

It is to be noted that the transmitting terminal 301 and the receiving terminal 308 may share content in any way as long as they use the result of pairing. For example, the pairing server 314 may control the communication between the transmitting terminal 301 and the receiving terminal 308 by referring to the pairing management table 315*a* so as to transfer, to the receiving terminal 308, content such as photos received from the transmitting terminal 301. Furthermore, the pairing server 314 may control the communication between the transmitting terminal 301 and the receiving terminal 308 by referring to the pairing management table 315*a* so that content such as photos uploaded by the transmitting terminal 301 is downloadable by the receiving terminal 308.

As above, in the communication control system 4700 according to this embodiment, the transmitting terminal 301 and the receiving terminal 308 are paired when the pairing value transmitted from the transmitting terminal 301 to the pairing server 314 matches, in the pairing server 314, the pairing value transmitted from the receiving terminal 308 to the pairing server 314. Since a sufficiently large random number is used as the pairing value, it will not happen that the transmitting terminal is paired with another receiving terminal which performs different pairing processing. In other words, the data transmitted from the transmitting terminal will not be received by a receiving terminal which is not supposed to receive the data.

Furthermore, in the communication control system 4700 according to this embodiment, the receiving mobile phone 323 determines whether or not the converted address values match, and therefore, it will not happen that when a malicious recipient who receives the shared ID from the sender transfers the shared ID to another person, and the other person inputs the transferred shared ID into the receiving terminal, the photo associated with the shared ID can be received.

Furthermore, in the communication control system 4700 according to this embodiment, since the pairing server 314 uses the communication device management table to manage the sets of the terminal and the mobile phone, it will not happen that when a malicious recipient inputs shared ID into a receiving terminal of another person, the photo associated with that shared ID can be received.

Although the communication control system according to an implementation of the present invention has been described above based on the embodiments, the present invention is not limited to these embodiments. Without departing from the scope of the present invention, the present invention includes an embodiment with some modifications on Embodiments that are conceived by a person skilled in the art, or an embodiment obtained through combinations of the constituents of different Embodiments.

For example, in each of the above embodiments described above, the communication between the transmitting terminal 301 and the pairing server 313 and the communication between the receiving terminal 308 and the pairing server 314 may each use a secure authenticated channel such as secure sockets layer (SSL). This leads to security improvement in the communication between the transmitting terminal 301 or the receiving terminal 308 and the pairing server 314 so that an identity theft of a terminal and a leakage of a pairing value in the communication path can be reduced.

Furthermore, it may be possible to apply digital signatures such as RSA to the pairing value and the converted address value in each of the above embodiments. By doing so, the occurrence of tampering with the pairing value and the converted address value can be reduced.

Furthermore, in each of the above embodiments, the pairing server 314 may return an error message when receiving no pairing finalization request messages within a predetermined period of time after transmitting a pairing request message. By doing so, the occurrence of mistaken pairing of the terminals due to, for example, an attack by a malicious user terminal can be reduced.

Furthermore, in each of the above embodiments, each of the pairing value and the converted address value may be assigned with its creation date and time. By doing so, when performing the determination on the pairing value and the converted address value, it is possible to compare the creation date and time with the current date and time to delete old data.

Furthermore, in each of the above embodiments, the pairing server 314 may restrict receiving of a message from a terminal when error messages have been transmitted to the terminal a predetermined number of times or more in response to the pairing request message or the pairing finalization request message. Specifically, the pairing server 314 may be set not to receive messages from that terminal at all or within a predetermined period of time. By doing so, an increase in the load of communication processing on the pairing server 314 due to, for example, a breakdown or a malfunction of the terminal and an attack by a malicious user terminal can be reduced.

Furthermore, the transmitting terminal 301 and the receiving terminal 308 transmit the converted communication device values to the pairing server 314 in each of the above embodiments, but, instead of the converted communication device values, terminal ID and mobile phone ID before converted may be transmitted to the pairing server 314. By so doing, in return for the transmission of a unique identifier of the mobile phone to the pairing server, it becomes possible to reduce the conversion-related burden on the terminal.

Furthermore, although the pairing server manages the set of the transmitting mobile phone and the transmitting terminal and the set of the receiving mobile phone and the receiving terminal in the process of the communication device registration phase in each of the above embodiments, it may be that the pairing server does not perform the management and instead, the transmitting terminal manages a set of the transmitting mobile phone and the transmitting terminal while the receiving terminal manages a set of the receiving mobile phone and the receiving terminal. In this case, the determination on a combination of the mobile phone and the terminal is performed by the terminal. By doing so, it is possible to reduce the processing load on the pairing server.

Furthermore, although the communication address is converted by the data conversion unit into the converted data in each of the above embodiment, the communication address does not always need to be converted into converted data. In this case, each device does not need to include the data conversion unit.

Furthermore, although there is the communication device registration phase in each of the above embodiments, it is not always necessary to provide the communication device registration phase. In this case, it is not necessary to determine whether or not the set of the mobile phone and the terminal to be used for pairing has been stored in the communication device management table.

Furthermore, part or all of the constituents of the pairing server 314, the transmitting terminal 301, or the receiving terminal 308 in each of the above embodiments may be provided in one system large scale integration (LSI). For example, the phase management unit 316 of the pairing server 314 may be provided in the system LSI.

The system LSI is a super multifunctional LSI manufactured by integrating plural components into one chip and is specifically a computer system which includes a microprocessor, a read only memory (ROM), a random access memory (RAM) and so on. On the RAM, a computer program has been stored. When the microprocessor operates according to the computer program, the system LSI implements its functions.

The name used here is system LSI, but it may also be called IC, LSI, super LSI, or ultra LSI depending on the degree of integration. Moreover, ways to achieve integration are not limited to the LSI, and a dedicated circuit or a general purpose processor can also achieve the integration. A field programmable gate array (FPGA) that can be programmed after manufacturing LSIs or a reconfigurable processor that allows re-configuration of the connection or setting of a circuit cell within an LSI can be used.

In the future, with advancement in semiconductor technology, a brand-new or derivative technology may replace LSI and using such technology, the functional blocks can be integrated. This includes, as a possibility, an application of biotechnology.

Furthermore, the present invention may be implemented in one or more embodiments as the pairing server 314, the transmitting terminal 301, or the receiving terminal 308 which includes such a characteristic processing unit. Furthermore, the present invention may be implemented in one or more embodiments as a communication control method which includes, as a step, a characteristic processing unit included in the pairing server 314, the transmitting terminal 301, or the receiving terminal 308. Furthermore, the present invention may be implemented in one or more embodiments as a computer program which causes a computer to execute each characteristic step included in the communication control method. In addition, the present invention may be implemented in one or more embodiments as a computer-readable non-transitory recording medium such as compact disc read only memory (CD-ROM) on which such a computer program has been recorded.

It is to be noted that, in each of the above embodiments, each constituent may be composed of dedicated hardware or implemented by executing a software program suited to the constituent. Each constituent may be implemented by reading and executing, by means of a program execution unit such as a CPU or a processor, a software program recorded on a recording medium such as hard disk or semiconductor memory. Here, the software which implements the server device or the like in each of the above embodiments is a program as follows.

Specifically, this program causes a computer to: determine, when a first request which requests pairing is received from the first communication device and a second request which requests pairing is received from the second communication device, whether or not a pairing identifier included in the first request and a pairing identifier included in the second request match and whether or not communication device information included in the first request and communication device information included in the second request match, the communication device information being information on a device capable of communicating with the second communication device; and pair the first communication device and the second communication device using the first device identifier included in the first request and the second device identifier included in the second request when it is determined that the pairing identifier included in the first request and the pairing identifier included in the second request match and that the communication device information included in the first request and the communication device information included in the second request match.

INDUSTRIAL APPLICABILITY

The communication control system according to an implementation of the present invention is useful as a content sharing system in which content such as photos and video can be shared by acquaintances.

REFERENCE SIGNS LIST

100 Photo sharing system
101 Transmitting terminal
102 Receiving terminal
103 Photo sharing server
300, 2700, 3300, 3700, 4700 Communication control system
301 Transmitting terminal
302, 311, 4701, 4702 Data conversion unit
303, 2701, 3301 Pairing value generation unit
304, 312, 320, 326 Device connection unit
305, 309, 317, 321, 325 Communication unit
306, 310, 316 Phase management unit
307, 313 Terminal ID holding unit 308 Receiving terminal
314 Pairing server
315 Pairing management unit
315a Pairing management table
316a First storing unit
316a Second storing unit
316c First determination unit
316d Second determination unit
316e Pairing unit
318 Communication device management unit
318a Communication device management table
319 Transmitting mobile phone
322, 324 Address management unit
323 Receiving mobile phone
3701, 4703 Determination unit

The invention claimed is:

1. A communication control system comprising:
a first communication device;
a second communication device;
a third communication device capable of communicating with the first communication device;
a fourth communication device capable of communicating with the second communication device and the third communication device; and
a server device connected to each of the first communication device and the second communication device via a network,
wherein the communication control system pairs the first communication device and the second communication device to control communication between the first communication device and the second communication device,
the third communication device includes:
a management unit configured to hold communication device information that is information on the fourth communication device; and
a first transmitting unit configured to transmit the held communication device information to the first communication device,
the first communication device includes:
a pairing identifier generation unit configured to generate a pairing identifier when the communication device information is received from the third communication device;
a second transmitting unit configured to transmit, to the server device, a first request including a first device identifier of the first communication device, the communication device information, and the generated pairing identifier; and
a third transmitting unit configured to transmit the generated pairing identifier to the third communication device,
the third communication device further includes
a fourth transmitting unit configured to, when the pairing identifier is received from the first communication device, transmit the received pairing identifier to the fourth communication device,
the fourth communication device includes
a fifth transmitting unit configured to, when the pairing identifier is received from the third communication device, transmit communication device information and the received pairing identifier to the second communication device, the communication device information being information on the fourth communication device which is previously held in the fourth communication device,
the second communication device includes
a sixth transmitting unit configured to transmit a second request to the server device when the communication device information and the pairing identifier are received from the fourth communication device, the second request including a second device identifier of the second communication device, the received communication device information, and the received pairing identifier, and
the server device includes:
a determination unit configured to, when the first request is received from the first communication device and the second request is received from the second communication device, determine whether or not the pairing identifier included in the first request and the pairing identifier included in the second request match and whether or not the communication device information included in the first request and the communication device information included in the second request match; and
a pairing unit configured to pair the first communication device and the second communication device using the first device identifier included in the first request and the second device identifier included in the second request when it is determined that the pairing identifier included in the first request and the pairing identifier included in the second request match and that the communication device information included in the first request and the communication device information included in the second request match.

2. The communication control system according to claim 1,
wherein the communication device information indicates a communication address of the fourth communication device, and
the fourth transmitting unit is configured to transmit the pairing identifier to the fourth communication device using the communication address indicated in the communication device information.

3. The communication control system according to claim 1,
wherein the first communication device further includes
a first data conversion unit configured to convert the communication device information using a one-way function,
the first request includes the communication device information resulting from the conversion,
the second communication device further includes
a second data conversion unit configured to convert the communication device information using the one-way function, and
the second request includes the communication device information resulting from the conversion.

4. The communication control system according to claim 1,
wherein the first transmitting unit is configured to transmit the communication device information to the first communication device using near field communication, and
the third transmitting unit is configured to transmit the pairing identifier to the third communication device using the near field communication.

5. A communication control system comprising:
a first communication device;
a second communication device;
a third communication device capable of communicating with the first communication device;

a fourth communication device capable of communicating with the second communication device and the third communication device; and a server device connected to each of the first communication device and the second communication device via a network, wherein the communication control system pairs the first communication device and the second communication device to control communication between the first communication device and the second communication device, the third communication device includes:

a management unit configured to hold communication device information that is information on the fourth communication device; and a first transmitting unit configured to transmit the held communication device information to the first communication device, the first communication device includes a second transmitting unit configured to transmit, to the server device, a first request including a first device identifier of the first communication device, and the communication device information received from the third communication device, the server device includes:

a pairing identifier generation unit configured to generate a pairing identifier; and a third transmitting unit configured to transmit the generated pairing identifier to the first communication device, the first communication device further includes a fourth transmitting unit configured to transmit, to the third communication device, the pairing identifier received from the server device, the third communication device further includes a fifth transmitting unit configured to, when the pairing identifier is received from the first communication device, transmit the received pairing identifier to the fourth communication device, the fourth communication device includes a sixth transmitting unit configured to, when the pairing identifier is received from the third communication device, transmit communication device information and the received pairing identifier to the second communication device, the communication device information being information on the fourth communication device which is previously held in the fourth communication device, the second communication device includes a seventh transmitting unit configured to transmit a second request to the server device when the communication device information and the pairing identifier are received from the fourth communication device, the second request including a second device identifier of the second communication device, the received communication device information, and the received pairing identifier, the server device further includes:

a determination unit configured to, when the first request is received from the first communication device and the second request is received from the second communication device, determine whether or not the pairing identifier generated by the pairing identifier generation unit and the pairing identifier included in the second request match and whether or not the communication device information included in the first request and the communication device information included in the second request match; and a pairing unit configured to pair the first communication device and the second communication device using the first device identifier included in the first request and the second device identifier included in the second request when it is determined that the pairing identifier generated by the pairing identifier generation unit and the pairing identifier included in the second request match and that the communication device information included in the first request and the communication device information included in the second request match.

6. A communication control system comprising:

a first communication device;

a second communication device;

a third communication device capable of communicating with the first communication device;

a fourth communication device capable of communicating with the second communication device and the third communication device; and a server device connected to each of the first communication device and the second communication device via a network, wherein the communication control system pairs the first communication device and the second communication device to control communication between the first communication device and the second communication device, the third communication device includes:

a pairing identifier generation unit configured to generate a pairing identifier;

a management unit configured to hold communication device information that is information on the fourth communication device; and a first transmitting unit configured to transmit, to the first communication device, the pairing identifier generated by the pairing identifier generation unit and the held communication device information, the first communication device includes:

a second transmitting unit configured to transmit, to the server device, a first request including a first device identifier of the first communication device, and the communication device information and the pairing identifier received from the third communication device; and a third transmitting unit configured to transmit the pairing identifier to the third communication device, the third communication device further includes a fourth transmitting unit configured to transmit, to the fourth communication device, the pairing identifier generated by the pairing identifier generation unit, the fourth communication device includes a fifth transmitting unit configured to, when the pairing identifier is received from the third communication device, transmit communication device information and the received pairing identifier to the second communication device, the communication device information being information on the fourth communication device which is previously held in the fourth communication device, the second communication device includes a sixth transmitting unit configured to transmit a second request to the server device when the communication device information and the pairing identifier are received from the fourth communication device, the second request including a second device identifier of the second communication device, the received communication device information, and the received pairing identifier, the server device includes:
a determination unit configured to, when the first request is received from the first communication device and the second request is received from the second communication device, determine whether or not the pairing identifier included in the first request and the pairing identifier included in the second request match and whether or not the communication device information included in the first request and the communication device information included in the second request match; and
a pairing unit configured to pair the first communication device and the second communication device using the first device identifier included in the first request and the second device identifier included in the second request when it is determined that the pairing identifier included in the first request and the pairing identifier included in the second request match and that the communication device information included in the first request and the communication device information included in the second request match.

7. A communication control system comprising:
a first communication device;
a second communication device;
a third communication device capable of communicating with the first communication device;
a fourth communication device capable of communicating with the second communication device and the third communication device; and
a server device connected to each of the first communication device and the second communication device via a network,
wherein the communication control system pairs the first communication device and the second communication device to control communication between the first communication device and the second communication device,
the third communication device includes:
a management unit configured to hold communication device information that is information on the fourth communication device; and
a first transmitting unit configured to transmit the held communication device information to the first communication device,
the first communication device includes:
a pairing identifier generation unit configured to generate a pairing identifier when the communication device information is received from the third communication device;
a first conversion unit configured to convert, using a predetermined conversion method, the communication device information received from the third communication device, to generate first converted data;
a second transmitting unit configured to transmit, to the server device, a first request including a first device identifier of the first communication device and the generated pairing identifier; and
a third transmitting unit configured to transmit the pairing identifier and the first converted data to the third communication device,
the third communication device further includes
a fourth transmitting unit configured to, when the pairing identifier and the first converted data are received from the first communication device, transmit the received pairing identifier and the received first converted data to the fourth communication device,
the fourth communication device includes
a fifth transmitting unit configured to, when the pairing identifier and the first converted data are received from the third communication device, transmit communication device information, the received pairing identifier, and the received first converted data to the second communication device, the communication device information being information on the fourth communication device which is previously held in the fourth communication device,
the second communication device includes:
a second conversion unit configured to, when the communication device information, the pairing identifier, and the first converted data are received from the fourth communication device, convert the communication device information using the predetermined conversion method, to generate second converted data;
a first determination unit configured to determine whether or not the first converted data and the second converted data match; and
a sixth transmitting unit configured to transmit a second request to the server device when it is determined that the first converted data and the second converted data match, the second request including a second device identifier of the second communication device and the pairing identifier, and
the server device includes:
a second determination unit configured to, when the first request is received from the first communication device and the second request is received from the second communication device, determine whether or not the pairing identifier included in the first request and the pairing identifier included in the second request match; and
a pairing unit configured to pair the first communication device and the second communication device using the first device identifier included in the first request and the second device identifier included in the second request when it is determined that the pairing identifier included in the first request and the pairing identifier included in the second request match.

8. A communication control system comprising:
a first communication device;
a second communication device;
a third communication device capable of communicating with the first communication device;
a fourth communication device capable of communicating with the second communication device and the third communication device; and
a server device connected to each of the first communication device and the second communication device via a network,
wherein the communication control system pairs the first communication device and the second communication device to control communication between the first communication device and the second communication device,
the first communication device includes:
a pairing identifier generation unit configured to generate a pairing identifier;
a first transmitting unit configured to transmit, to the server device, a first request including a first device identifier of the first communication device and the generated pairing identifier; and
a second transmitting unit configured to transmit the pairing identifier to the third communication device,
the third communication device includes:
a management unit configured to hold communication device information that is information on the fourth communication device;

a first conversion unit configured to convert the held communication device information using a predetermined conversion method, to generate first converted data; and a third transmitting unit configured to, when the pairing identifier is received from the first communication device, transmit the received pairing identifier and the first converted data to the fourth communication device, the fourth communication device includes:

a second conversion unit configured to convert communication device information using the predetermined conversion method, to generate second converted data, when the pairing identifier and the first converted data are received from the third communication device, the communication device information being information on the fourth communication device which is previously held in the fourth communication device;

a first determination unit configured to determine whether or not the first converted data and the second converted data match; and a fourth transmitting unit configured to transmit the received pairing identifier to the second communication device when it is determined that the first converted data and the second converted data match, the second communication device includes a fifth transmitting unit configured to transmit a second request to the server device when the pairing identifier is received from the fourth communication device, the second request including a second device identifier of the second communication device and the received pairing identifier, and the server device includes:

a second determination unit configured to, when the first request is received from the first communication device and the second request is received from the second communication device, determine whether or not the pairing identifier included in the first request and the pairing identifier included in the second request match; and a pairing unit configured to pair the first communication device and the second communication device using the first device identifier included in the first request and the second device identifier included in the second request when it is determined that the pairing identifier included in the first request and the pairing identifier included in the second request match.

9. A communication control method which is performed in communication control system including: a first communication device; a second communication device; a third communication device capable of communicating with the first communication device; a fourth communication device capable of communicating with the second communication device and the third communication device; and a server device connected to each of the first communication device and the second communication device via a network, the communication control system pairing the first communication device and the second communication device to control communication between the first communication device and the second communication device, and the communication control method comprising:

transmitting communication device information from the third communication device to the first communication device, the communication device information being information on the fourth communication device;

generating a pairing identifier in the first communication device when the communication device information is received from the third communication device;

transmitting a first request from the first communication device to the server device, the first request including a first device identifier of the first communication device, the received communication device information, and the generated pairing identifier;

transmitting the generated pairing identifier from the first communication device to the third communication device;

transmitting, when the pairing identifier is received from the first communication device, the received pairing identifier from the third communication device to the fourth communication device;

transmitting, when the pairing identifier is received from the third communication device, communication device information and the received pairing identifier from the fourth communication device to the second communication device, the communication device information being information on the fourth communication device which is previously held in the fourth communication device;

transmitting a second request from the second communication device to the server device when the communication device information and the pairing identifier are received from the fourth communication device, the second request including a second device identifier of the second communication device, the received communication device information, and the received pairing identifier;

determining, in the server device when the first request is received from the first communication device and the second request is received from the second communication device, whether or not the pairing identifier included in the first request and the pairing identifier included in the second request match and whether or not the communication device information included in the first request and the communication device information included in the second request match; and pairing, in the server device, the first communication device and the second communication device using the first device identifier included in the first request and the second device identifier included in the second request when it is determined that the pairing identifier included in the first request and the pairing identifier included in the second request match and that the communication device information included in the first request and the communication device information included in the second request match.

10. A server device connected to each of a first communication device and a second communication device via a network, for pairing the first communication device and the second communication device to control communication between the first communication device and the second communication device, the server device comprising:

a determination unit configured to, when a first request which requests pairing is received from the first communication device and a second request which requests pairing is received from the second communication device, determine whether or not a pairing identifier included in the first request and a pairing identifier included in the second request match and whether or not communication device information included in the first request and communication device information included in the second request match, the communication device information being information on a device capable of communicating with the second communication device; and a pairing unit configured to pair the first communication device and the second communication device using the first device identifier included in the first request and the second device identifier included in the second request when it is determined that the pairing identifier included in the first request and the pairing identifier included in the second request match and that the communication device information included in the first request and the communication device information included in the second request match.

11. The server device according to claim 10, wherein the server device is provided as an integrated circuit.

12. A communication control method for pairing a first communication device and a second communication device which are connected via a network, to control communication between the first communication device and the second communication device, the communication control method comprising:

determining, when a first request which requests pairing is received from the first communication device and a second request which requests pairing is received from the second communication device, whether or not a pairing identifier included in the first request and a pairing identifier included in the second request match and whether or not communication device information included in the first request and communication device information included in the second request match, the communication device information being information on a device capable of communicating with the second communication device; and pairing the first communication device and the second communication device using the first device identifier included in the first request and the second device identifier included in the second request when it is determined that the pairing identifier included in the first request and the pairing identifier included in the second request match and that the communication device information included in the first request and the communication device information included in the second request match.

13. A computer-readably non-transitory recording medium having recorded thereon a program for causing a computer to execute the communication control method according to claim 12.

\* \* \* \* \*